(12) United States Patent
Yamamoto et al.

(10) Patent No.: US 6,713,756 B2
(45) Date of Patent: Mar. 30, 2004

(54) OPTICAL ENCODER AND OPTICAL ROTARY ENCODER

(75) Inventors: Eiji Yamamoto, Ome (JP); Takeshi Ito, Hino (JP); Jun Hane, Hachioji (JP)

(73) Assignee: Olympus Corporation, Tokyo (JP)

( * ) Notice: Subject to any disclaimer, the term of this patent is extended or adjusted under 35 U.S.C. 154(b) by 11 days.

(21) Appl. No.: 09/850,499

(22) Filed: May 7, 2001

(65) Prior Publication Data

US 2002/0014581 A1 Feb. 7, 2002

(30) Foreign Application Priority Data

| May 9, 2000 | (JP) | 2000-136088 |
| Aug. 1, 2000 | (JP) | 2000-233351 |
| Nov. 6, 2000 | (JP) | 2000-337966 |

(51) Int. Cl.[7] ............................................. G01D 5/34
(52) U.S. Cl. .................... 250/231.13; 250/231.18; 250/237 R; 356/615; 356/616
(58) Field of Search ................ 250/231.13, 231.14, 250/231.15, 231.16, 231.17, 231.18, 237 R, 237 G; 356/615, 616, 617, 618, 619

(56) References Cited

U.S. PATENT DOCUMENTS

| 4,477,189 A |   | 10/1984 | Ernst |
| 5,438,193 A | * | 8/1995 | Takagi et al. |
| 5,498,870 A | * | 3/1996 | Ishizuka |
| 5,621,527 A | * | 4/1997 | Kaneda et al. |
| 5,671,052 A | * | 9/1997 | Kawakubo et al. |
| 5,981,941 A | * | 11/1999 | Takata et al. |
| 6,188,062 B1 | * | 2/2001 | Lee |
| 6,392,224 B1 | * | 5/2002 | Holzapfel et al. |

FOREIGN PATENT DOCUMENTS

| EP | 0 292 151 A2 | 11/1988 |
| EP | 0 679 870 A2 | 11/1995 |
| EP | 0 729 013 A2 | 8/1996 |
| EP | 0 770 850 A2 | 5/1997 |
| JP | 8-254440 | 10/1996 |
| JP | P2000-205819 A | 7/2000 |

OTHER PUBLICATIONS

Miyajima et al. Optical Micro Encoder Using a Twin–Beam VCSEL With Integrated Microlenses, 1997 International Conference on Solid–State Sensors and Actuators. Chicago, Jun. 16–19 1997. pp. 1233–1234.*

Eiji Yamamoto, "Microencoder using Surface Emitting Semiconductor Laser", Optics vol. 27 No. 6, 1988.

Copal: Rotary Encoder Catalog.

* cited by examiner

*Primary Examiner*—David Porta
*Assistant Examiner*—David C Meyer
(74) *Attorney, Agent, or Firm*—Scully, Scott, Murphy & Presser

(57) ABSTRACT

There is disclosed an optical encoder in which a scale can be displaced to cross a first light beam emitted from a first light source, and has a first light modulation region formed of a predetermined-period optical pattern irradiated with the first light beam to generate a diffraction pattern. First photodetector has a light receiving surface for receiving the first light beam transmitted through the first light modulation region of the scale, and has a single or a plurality of light receiving element group formed at a predetermined interval corresponding to the diffraction pattern. A second light modulation region modulates optical properties of the second light beam emitted from a second light source. Second photodetector receives the second light beam whose optical properties are modulated by the second light modulation region. The first and second light modulation regions are positioned in series in a moving direction of the scale, and the second light modulation region moves integrally with the first light modulation region with movement of the scale.

71 Claims, 39 Drawing Sheets

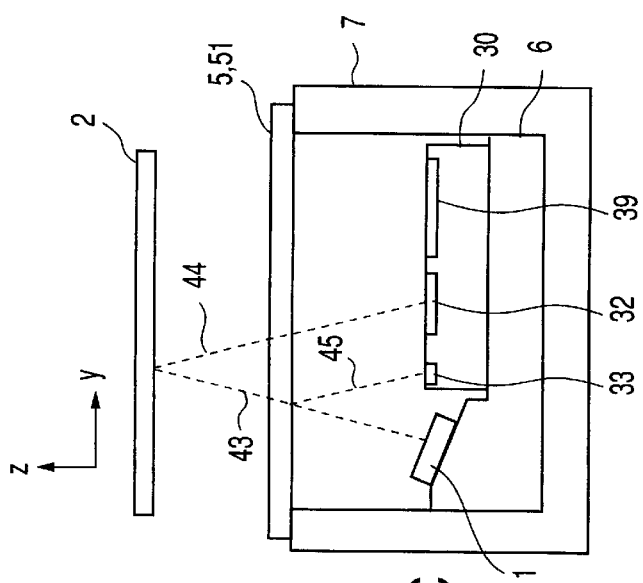
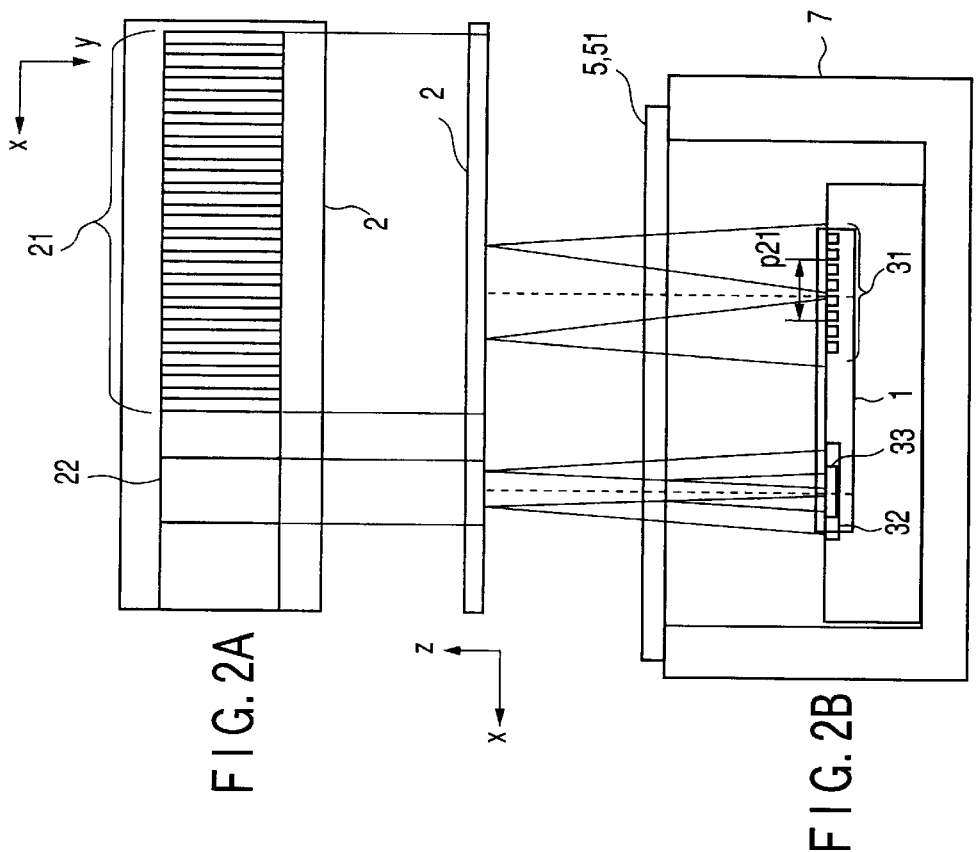
FIG. 2A
FIG. 2B
FIG. 2C

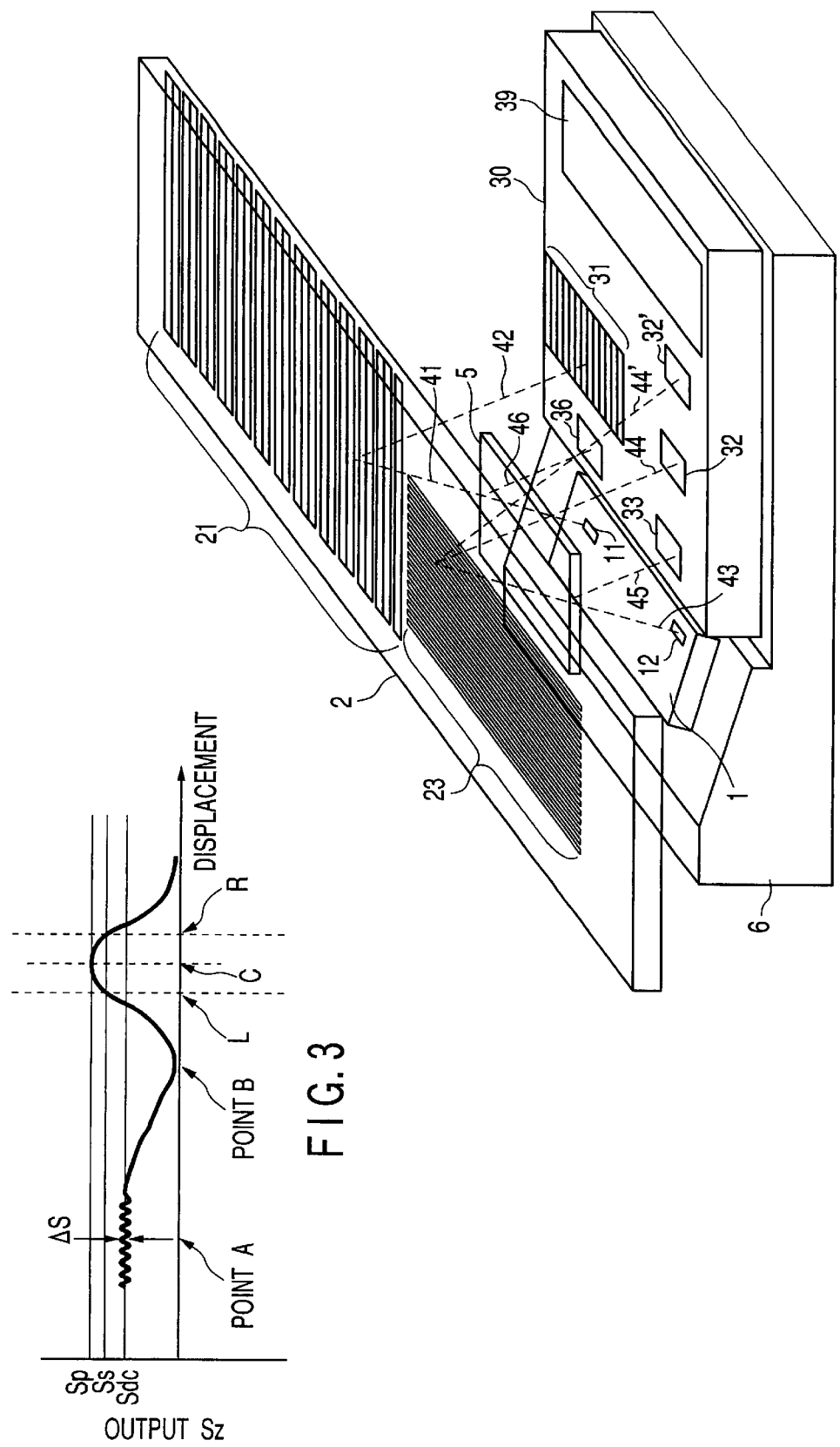

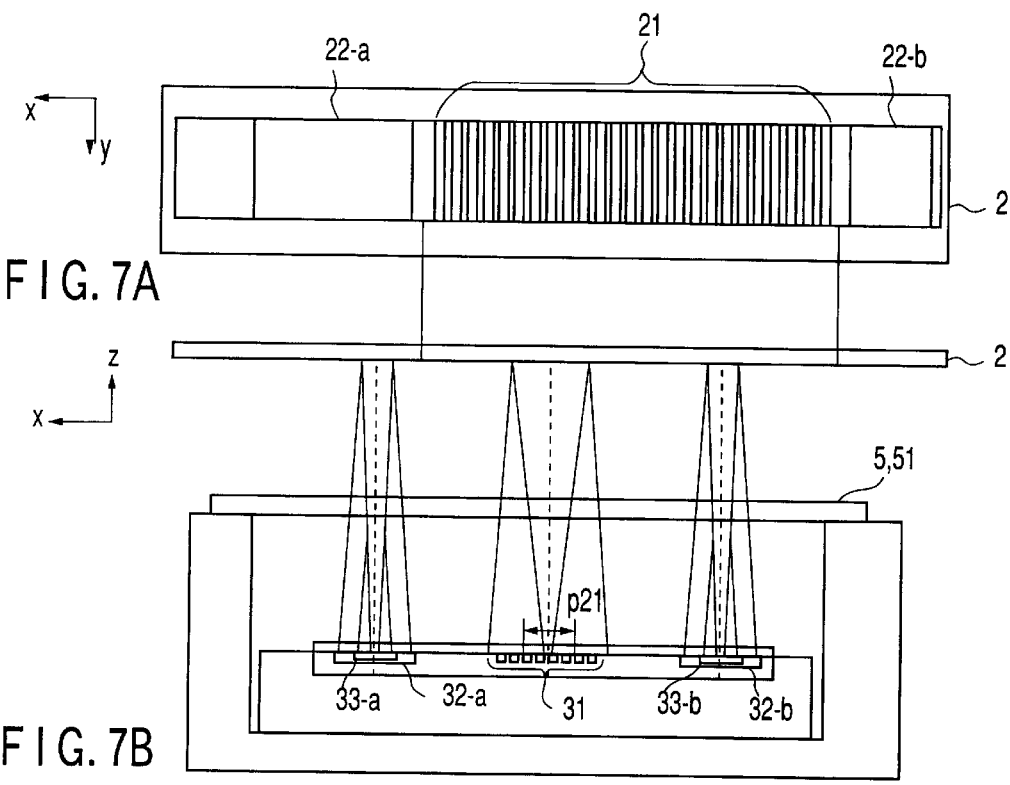
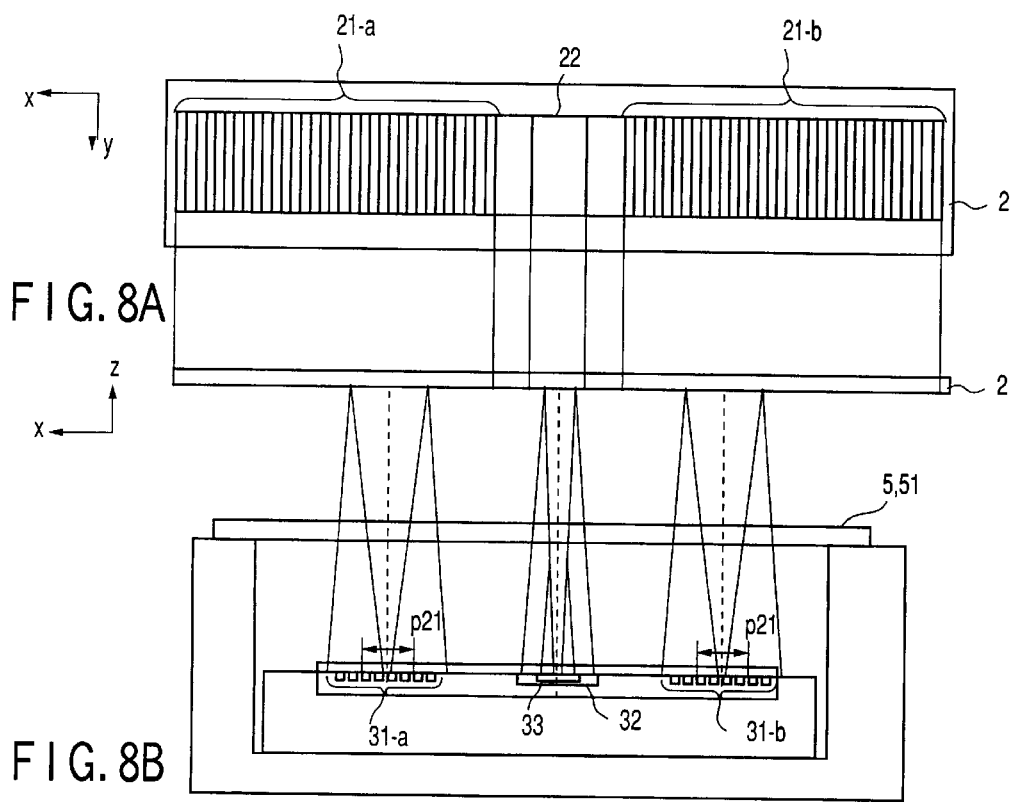

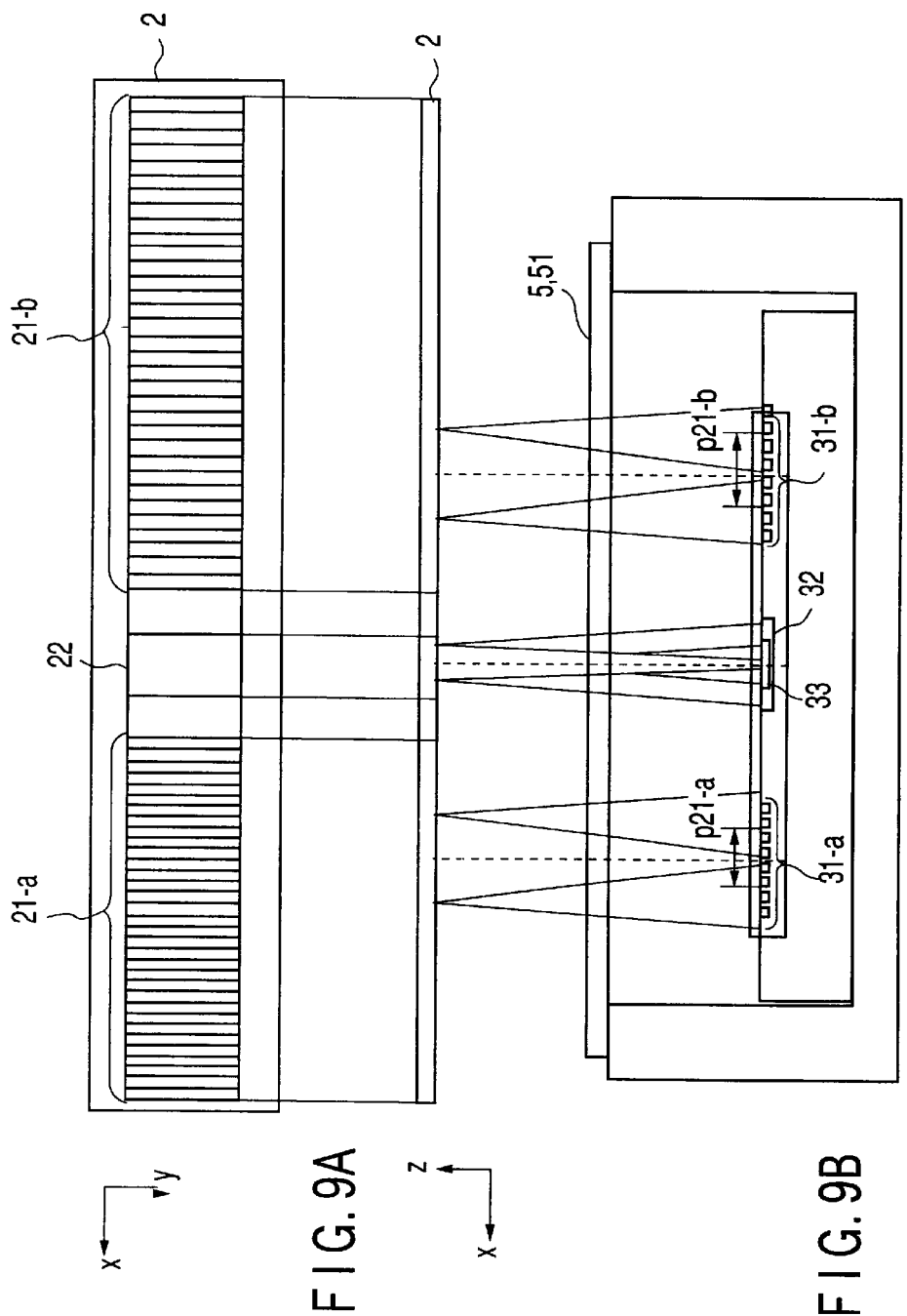

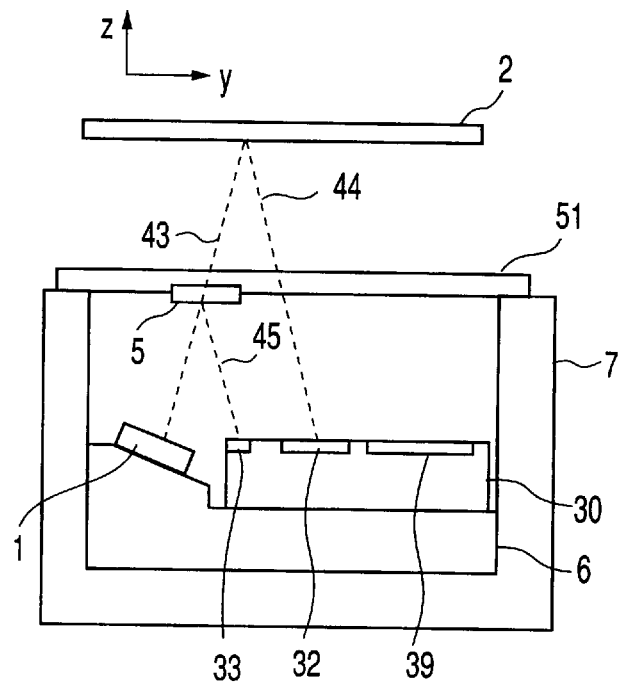
F I G. 10A
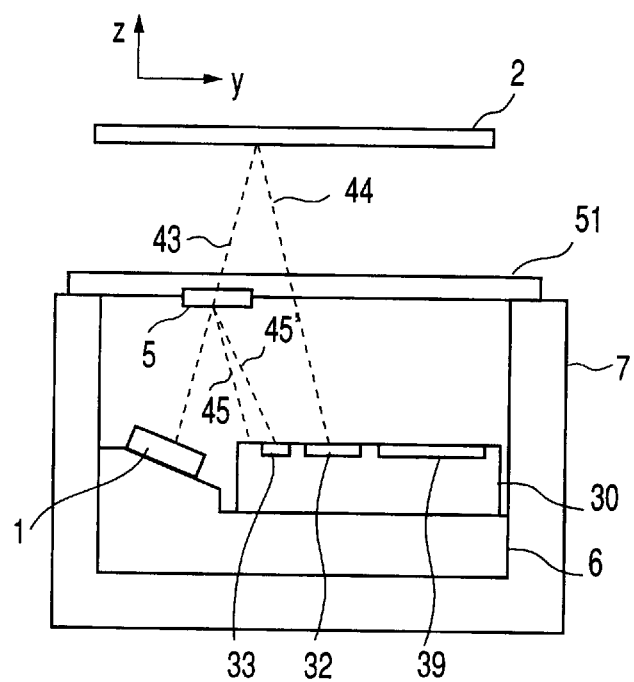
F I G. 10B

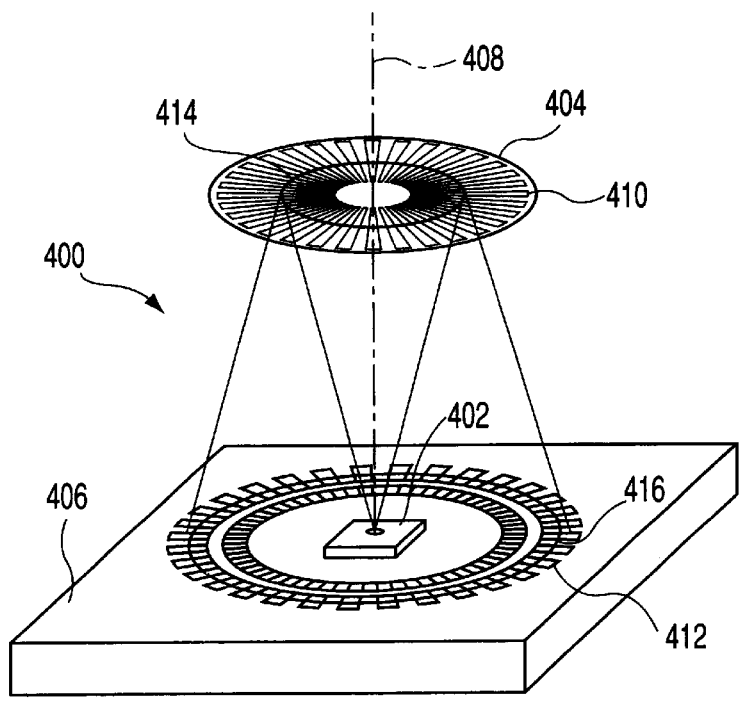
F I G. 44A
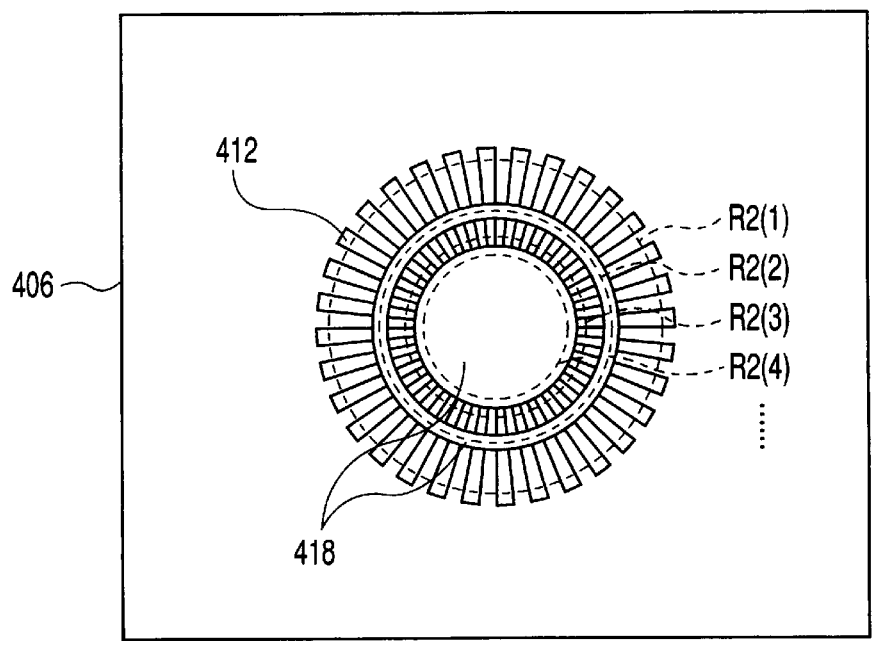
F I G. 44B

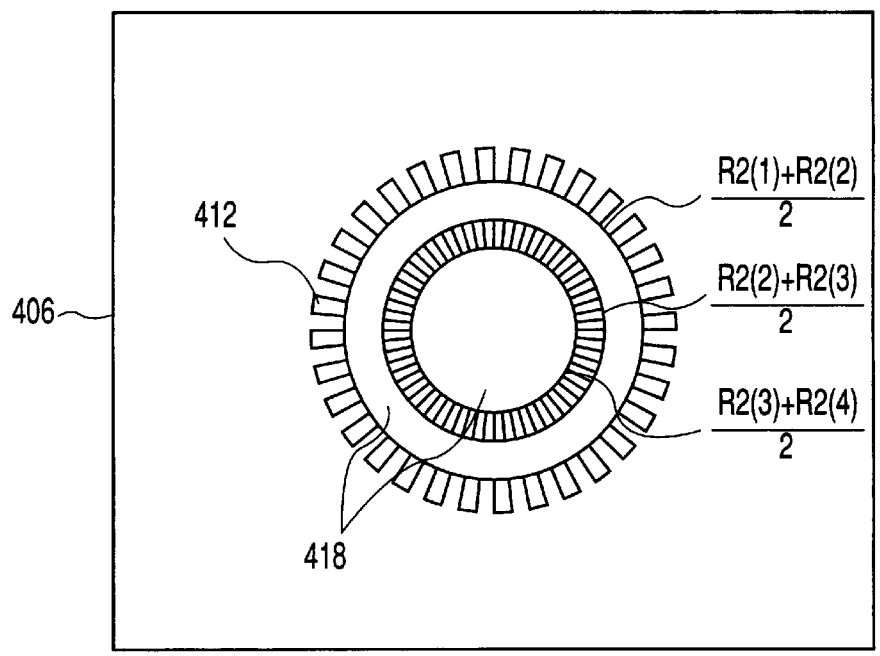
F I G. 45A
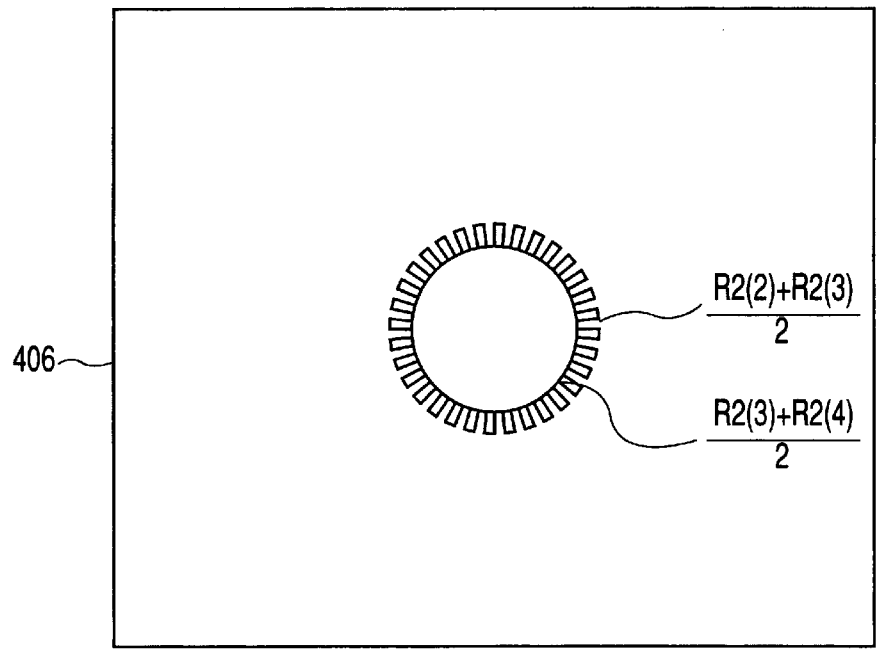
F I G. 45B

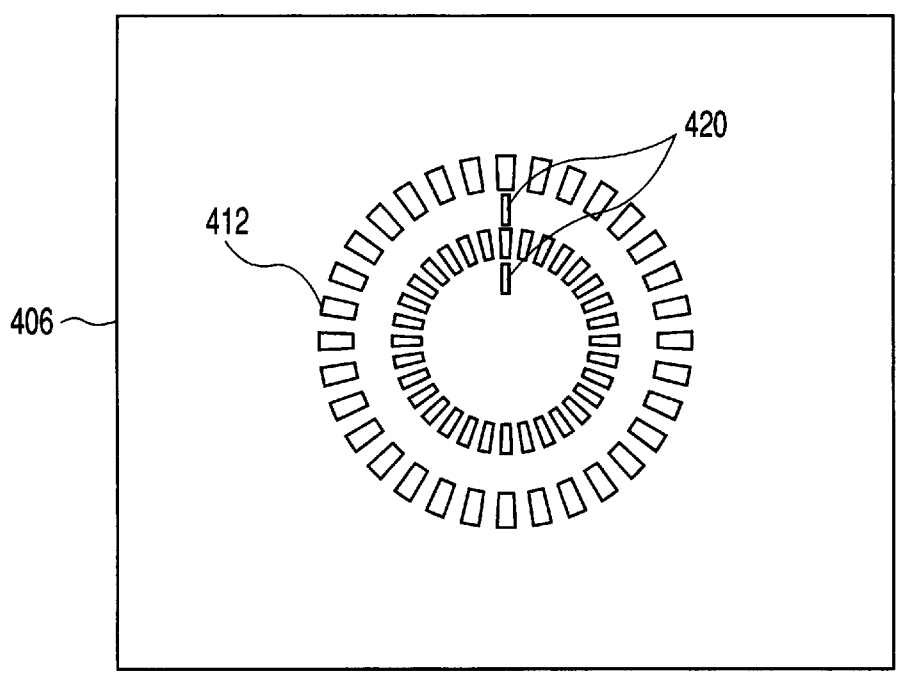
F I G. 46A
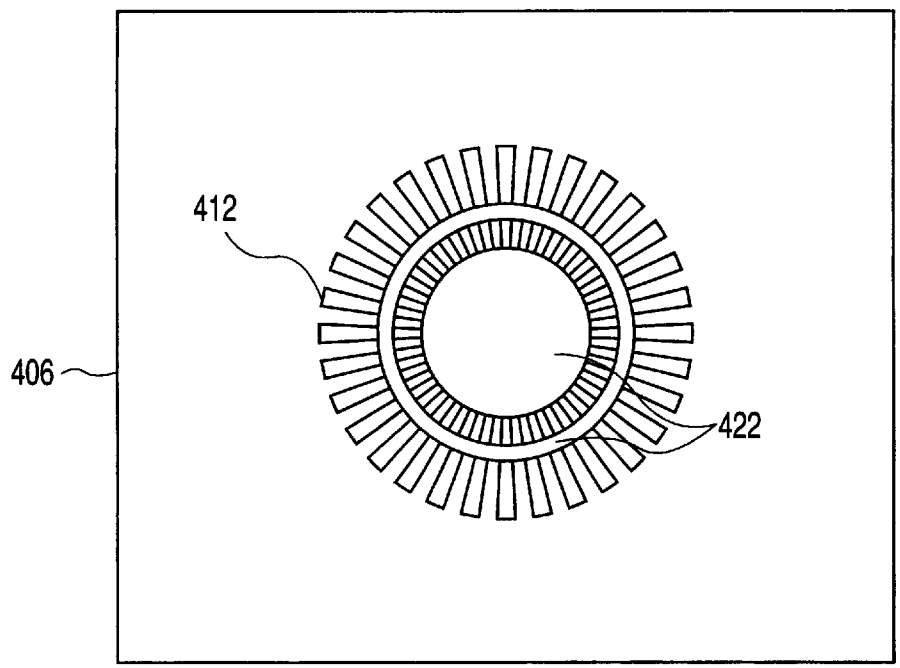
F I G. 46B

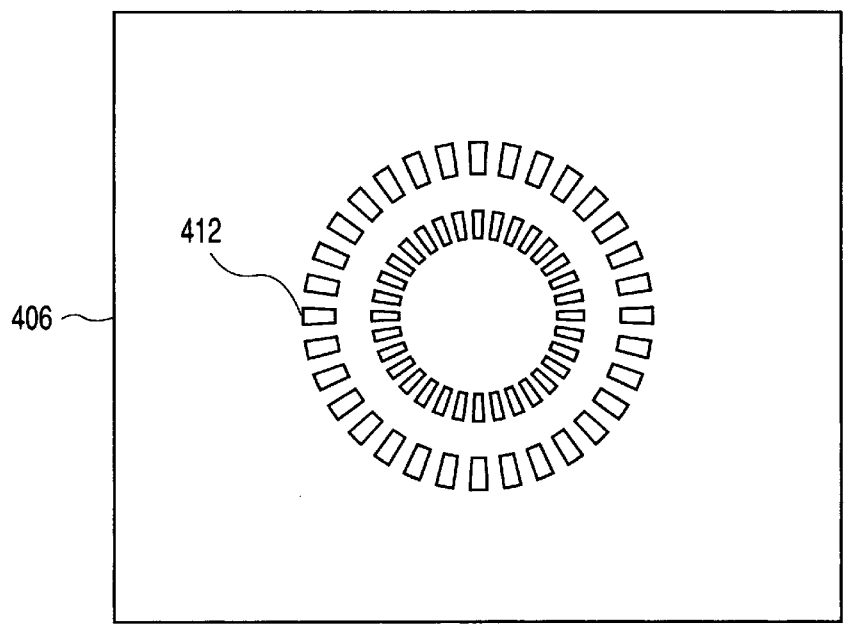
F I G. 47A
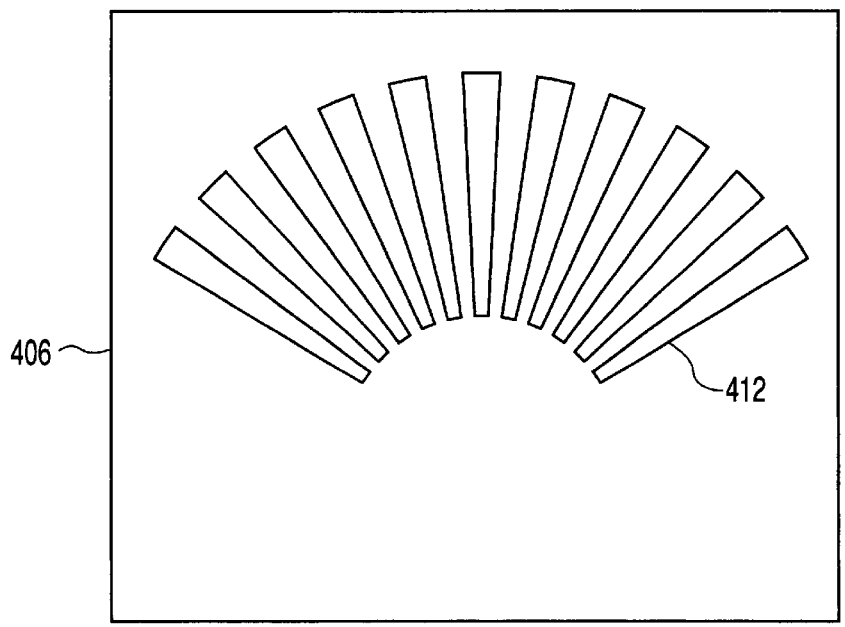
F I G. 47B

RECEIVE PHASES DIFFERENT BY 180 DEGREES

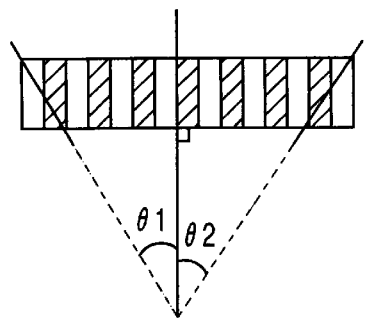
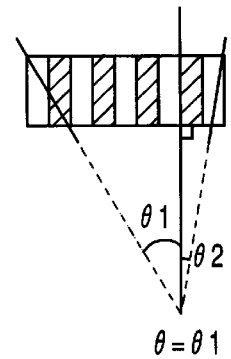
F I G. 55A    F I G. 55B
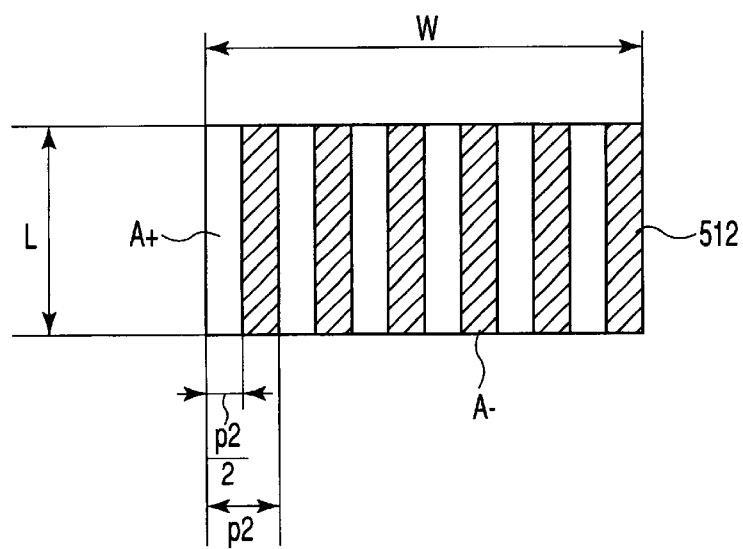
F I G. 55C

OPTICAL ENCODER AND OPTICAL ROTARY ENCODER

CROSS-REFERENCE TO RELATED APPLICATIONS

This application is based upon and claims the benefit of priority from the prior Japanese Patent Applications No. 2000-136088, filed May 9, 2000; and No. 2000-233351, filed Aug. 1, 2000; and No. 2000-337966, filed Nov. 6, 2000, the entire contents of all of which are incorporated herein by reference.

BACKGROUND OF THE INVENTION

The present invention relates to an optical encoder, particularly to an optical encoder as an optical displacement sensor which uses optical means for detecting a displacement amount of a precision mechanism.

Moreover, the present invention relates to an optical rotary encoder which uses optical means to detect a rotary angle.

As described in the beginning, as a prior art concerning a constitution of an optical encoder, first Jpn. Pat. Appln. KOKAI Publication No. 2000-205819 by the present inventor et al. will be described as a first prior example.

FIGS. 59A, 59B show constitution diagrams.

A scale 2 in which a first optical modulation region formed of a predetermined-period optical pattern generating a diffraction pattern (a transmission or reflective diffraction lattice scale in FIGS. 59A, 59B) is formed is irradiated with a laser mean emanating from a semiconductor laser 1 (or a surface emitting laser 10) as a coherence light source.

Moreover, the encoder is constituted such that a specific portion of the generated diffraction pattern is detected by either a photodetector 3 or a photodetector 3'.

Additionally, the coherence light source will also be referred to simply as a light source.

Additionally, when the coherence light source and photodetector 3 are disposed on the same side with respect to the scale 2, as shown in FIG. 59A, main axes 41, 42 of the light beam emitted from the semiconductor laser 1 (or the surface emitting laser 10) are inclined/arranged by angle $\phi$ with respect to a perpendicular line of a scale surface.

Operation of the sensor will next be described.

As shown in FIG. 59A, various constituting parameters will be defined as follows:

z1: length obtained by measuring a distance between the light source and the surface of the scale with a first light modulation region formed thereon on the light beam main axis;

z2: length obtained by measuring a distance between the surface of the scale with the first light modulation region formed thereon and a light receiving surface of the photodetector on the light beam main axis;

p1: pitch of the optical pattern in the first light modulation region on the scale;

p2: pitch of the diffraction pattern on the light receiving surface of the photodetector;

θx: spread angle of the light beam of the light source with respect to a pitch direction of a diffraction lattice on the scale; and θy: spread angle of the light beam of the light source in a vertical direction with respect to the above θx.

Additionally, the light beam spread angle means an angle formed by a pair of boundary lines 9 each having a direction in which a light beam intensity becomes ½ of a peak intensity.

Moreover, "the pitch of the optical pattern in the light modulation region on the scale" means a space period of the pattern formed on the scale and having optical properties modulated.

Furthermore, "the pitch of the diffraction pattern on the light receiving surface of the photodetector" means a space period of an intensity distribution of the diffraction pattern generated on the light receiving surface.

According to a light diffraction theory, when z1 and z2 are in a specific relation satisfying the following equation (1), an intensity pattern substantially analogous to the scale diffraction lattice pattern is generated on the light receiving surface of the photodetector.

$$(1/z1)+(1/z2)=\lambda/\{k(p1)^2\} \tag{1}$$

In the equation, $\lambda$ denotes a light wavelength from the light source, and k denotes an integer.

In this case, the pitch p2 of the diffraction pattern on the light receiving surface can be represented using other constituting parameters as follows.

$$p2=p1(z1+z2)/z1 \tag{2}$$

When the scale 2 is displaced in the pitch direction of the diffraction lattice with respect to the light source, the diffraction pattern intensity distribution moves in a displacement direction of the scale 2 with the same space period being kept.

Therefore, a space period p21 of a light receiving area of the photodetector is set to the same value as that of p2. Every time the scale 2 moves by p1 in the pitch direction, a periodic strength signal is obtained from the photodetector. Therefore, the displacement amount of the scale 2 in the pitch direction can be detected.

Additionally, the above has been described on an assumption that the light beam extending to the scale from the light source has a constant spread angle (hereinafter referred to as "a case of a spread beam").

Therefore, when the emanating beam from the light source is collimated to a parallel light by a lens, and the scale is irradiated with the light (hereinafter referred to as "a case of a parallel beam"), in the above equations (1) and (2), z1→∞ is assumed.

In this case, the equation (2) results in the following.

$$p2=p1 \tag{2)'}$$

Here, it is unnecessary to consider "the case of the parallel beam", but in "the case of the spread beam", as shown in FIGS. 59A, 59B, the light source and photodetector are disposed on the same side with respect to the scale 2 (hereinafter referred to as "a reflective arrangement") such that z1=z2. In this case, even when a space gap between the scale 2 and the light source fluctuates, the pitch of the diffraction pattern on the light receiving surface does not change from the equation (2).

Moreover, in FIGS. 59A, 59B, the surface with the first light modulation region formed thereon is disposed substantially in parallel with the light receiving surface of the first photodetector. Additionally, the main axis of the first light beam is inclined/arranged with respect to the surface with the first light modulation region formed thereon only in a plane vertical to a predetermined period direction of the first light modulation region.

The diffraction pattern is regarded as a so-called shadow picture pattern. Therefore, even when the space gap between the scale 2 and the light source fluctuates because of the arrangement limiting a light beam inclined surface, a diffraction pattern intensity distribution curve is obtained as shown by curves 103, 104. Moreover, since the distribution does not move in a scale pitch direction, a displacement sensing is possible without being substantially influenced by the aforementioned gap fluctuation.

As described above, in both "the case of the parallel beam" and "the case of spread beam" it is an important point for the displacement sensing hardly influenced by the gap fluctuation to "dispose the light beam main axis such that the axis is inclined with respect to the surface with the light modulation region formed thereon only in the plane vertical to the predetermined period direction of the light modulation region".

Furthermore, in practical use, a light receiving group of the photodetector with a space period p20 is displaced at an interval of p21/4, four alternately arranged light receiving groups are formed, outputs Va, Vb, Va', Vb' are obtained from light receiving elements of each group, and Va-Va', Vb-Vb are utilized as so-called A phase (sine wave) and B phase (cosine wave) outputs of the encoder, respectively.

Moreover, in the Jpn. Pat. Appln. KOKAI Publication No. 2000-205819, a laser beam intensity can be monitored by obtaining an operation sum of the respective outputs Va, Vb, Va', Vb'. Therefore, it is possible to correct an influence of a laser beam intensity change by an environment change and change with time to some degrees by feeding back a laser beam intensity change by the environment change and change with time so as to set the change to be constant, or by appropriately calculating A and B phase output signals and a signal of the operation sum of the respective outputs Va, Vb, Va', Vb'.

Therefore, in the first prior example, since there is hardly influence of the gap fluctuation between the scale and the head, the displacement of the scale in X direction can correctly be detected.

A second prior example similarly disclosed in the Jpn. Pat. Appln. KOKAI Publication No. 2000-205819 is next shown in FIG. 60, FIG. 61.

In this example, a second track is formed in parallel with the pitch direction of a diffraction lattice track 21 on the scale.

In FIG. 60 the second track is a pattern 22 for detecting a reference position, and in FIG. 61 the second track is a diffraction lattice pattern 21' having a period different from that of the other track.

These respective track patterns are irradiated with light beams from a surface emitting laser source, and a reflection or diffraction pattern is detected by optical detection means in the constitution.

In FIG. 60, the diffraction pattern formed by the diffraction lattice track 21 is detected by a light receiving element array group 32, and the A and B phase signals are outputted similarly as described above.

On the other hand, the light reflected by the pattern 22 for detecting the reference position is detected by a light receiving element 32 for detecting a light intensity.

For example, when a region shown by the pattern 22 has a reflectance larger than that of a peripheral portion, and only when the pattern 22 for detecting the reference position is irradiated with a second light beam, an output of the light receiving element 32 exceeds a predetermined value. Therefore, the reference position can be detected.

On the other hand, in FIG. 61, the diffraction patterns formed by the diffraction lattice tracks 21, 21' are detected by light receiving element array groups 32, 32', and two sets of A and B phase signals are outputted similarly as described above.

When the diffraction lattice pitches of the diffraction lattice tracks 21, 21' are different from each other, an absolute position can be detected in a specific displacement range determined by a least common multiple of the respective pitches according to a vernier encoder principle in accordance with a difference.

Additionally, in the second prior example, as shown in FIG. 60, FIG. 61, the surface with the first light modulation region (diffraction lattice) formed thereon is disposed in parallel with the light receiving surface of the first optical detection means. However, the main axis of the first light beam is disposed to be inclined with respect to the surface with the first light modulation region formed thereon in a plane parallel to the predetermined period direction of the first light modulation region.

Therefore, in the aforementioned first prior example, since only the so-called A and B phase encoder outputs are obtained, it is possible to detect a relative displacement amount, but the absolute position cannot be detected.

On the other hand, in the aforementioned second prior example, a constitution in which a plurality of tracks different in the scale pattern are irradiated with the respective laser beams enables reference point detection and absolute position detection.

However, as shown in FIG. 60, FIG. 61, the main axis of the first light beam is disposed to be inclined with respect to the surface with the first light modulation region formed thereon in the plane parallel to the predetermined period direction of the first light modulation region.

Therefore, for the diffraction pattern, when the space gap between the scale 2 and the light source fluctuates, and the intensity distribution of the diffraction pattern moves in the scale pitch direction, outputs from the light receiving element arrays 32, 32' and light receiving element 31 are outputted with the signal change by the displacement of the scale in an x direction and the influence by the gap fluctuation between the scale and the light source added thereto.

As a result, in the aforementioned second prior example, it is difficult to correctly detect only the displacement of the x direction.

Moreover, in the constitution of FIG. 60, when the light beam outputted from a second light beam emitting window 12 fluctuates by changes of ambient environments such as temperature and pressure, a signal level detected by the light receiving element 31 changes, and this hinders the correct reference position detection.

Furthermore, at present, utilized is a so-called encoder of an optical or magnetic type for detecting a linear displacement amount in a machine tool stage, three-dimensional measuring instrument, and the like, or for detecting a rotary angle in a servo motor, and the like.

The optical encoder is generally provided with a scale fixed to a member for detecting the displacement of the stage or the like, and a sensor head for detecting the displacement of the scale.

Here, a sensor head has the light source for irradiating the scale with the light beam, and the photodetector for detecting a diffraction light transmitted through the scale or reflected by the scale. A scale movement is detected in accordance with a change of a received light signal.

A typical optical encoder will be described as a third prior example.

FIG. 62 is a constitution diagram of an encoder using a surface emitting laser and reflective scale as one example of a small-sized low-cost laser encoder which requires no optical components such as a lens.

This laser encoder using the surface emitting laser and reflective scale is described, for example, in an article "Microencoder using Surface Emitting Semiconductor Laser" (Eiji Yamamoto, Optics Vol. 27 No. 6 (1998)).

As shown in FIG. 62, an encoder 600 is constituted of a reflective scale 612 and a sensor head 614.

The sensor head 614 includes a surface emitting laser 616 and photodetector 618, both components are fixed to a base material 620, and a relative positional relation of the surface emitting laser 616 and photodetector 618 is maintained to be constant.

The scale 612 has a pattern in which a reflectance periodically changes in a direction vertical to a sheet surface.

This pattern is formed, for example, by patterning a high-reflectance material such as aluminum on the surface of a transparent substrate of glass or the like.

The scale 612 is interlocked with a stage (not shown) to reciprocate/move with respect to the sensor head 614 in the direction vertical to the sheet surface of FIG. 62, and the sensor head 614 detects this movement from a strength change of the light reflected from the scale 612.

The light beam emitted from the surface emitting laser 616 is reflected by the scale 612, and the reflected light is received by the photodetector 618.

For the pattern on the scale 612, since the reflectance of the pattern periodically changes in the direction vertical to the sheet surface, the displacement amount of the scale can be detected from the strength change of the received reflective light by the photodetector 618.

A laser encoder using a coherence light source and diffraction lattice scale will next be described as a fourth prior example.

FIG. 63 is a constitution diagram of the laser encoder using the coherence light source and diffraction lattice scale as one example of a small-sized low-cost encoder which requires no optical components such as the lens.

The laser encoder using the coherence light source and diffraction lattice scale is described, for example, in "Copal: Rotary Encoder Catalog".

In a laser encoder 630, as shown in FIG. 63, a transmission type diffraction lattice scale 634 is irradiated with laser beams emitted from a semiconductor laser 632 as the coherence light source, and this generates a diffraction pattern 636 on a light receiving surface of a photodetector 640.

Definition of respective constituting parameters shown in FIG. 63 is the same as that of the aforementioned first prior example.

Moreover, as described above, according to a light diffraction theory, when z1, z2 defined as described above are in a specific relation satisfying the relation shown in the above equation (1), an intensity pattern analogous to the diffraction lattice pattern of the scale 634 is generated on the light receiving surface of the photodetector 640.

In this case, the pitch p2 of the diffraction pattern on the light receiving surface can be represented using the other constituting parameters as in the above equation (2).

Moreover, as described above, when the scale is displaced in the pitch direction of the diffraction lattice with respect to the light source, the diffraction pattern intensity distribution moves in the scale displacement direction with the same space period being kept.

Here, the photodetector 640 has a plurality of light receiving areas 642, the light receiving areas 642 are arranged in parallel with a moving direction of the scale 634 at the space period p20, and the space period p20 is equal to the diffraction lattice scale pitch p2.

Therefore, every time the scale 634 moves by p1 in the pitch direction, a strength signal periodically changing at the period p2 is obtained from the photodetector 640, and the displacement amount of the scale 634 in the pitch direction is detected.

Additionally, this type of optical encoder is of a high-precision, high-resolution, non-contact type, is superior in resistance to electromagnetic wave trouble, and has other characteristics.

Therefore, this type of optical encoder is utilized in various fields, and especially the encoder requiring high precision and high resolution is mainly of an optical type.

However, the aforementioned optical encoders according to the third and fourth prior examples have the following problems.

First, in the third prior example, an exclusive fixing base needs to be used to incline/dispose the light source with respect to the scale, assembling therefore becomes difficult, and this causes a cost rise.

Moreover, in the third prior example, a distance, that is, a so-called gap between the light source and the scale needs to be strictly adjusted. Otherwise, the reflected light from the scale is not incident upon a specific portion of the photodetector, and the signal strength and precision are adversely affected.

Furthermore, in the third prior example, when the light source is disposed in the vicinity of the light receiving area of the photodetector to miniaturize the sensor head, the reflected light beam from the scale is obstructed by a chip end of the surface emitting laser as the light source, and does not reach the light receiving area.

Moreover, in the third prior example, it is further necessary to further enlarge an attachment angle of the light source in order to avoid this situation. Therefore, miniaturization and cost reduction are difficult.

Furthermore, in the constitution as shown in the fourth prior example, expensive optical components such as a slit are used. Additionally, since these optical components need to be assembled with a high precision, the miniaturization and cost reduction are remarkably difficult.

Additionally, in both the third and fourth prior examples, when information is read from the scale with a plurality of optical patterns formed thereon, it is necessary to use the same number of light sources as that of optical patterns, and to split the beam using a beam splitter, and the like. The miniaturization and cost reduction are further difficult.

BRIEF SUMMARY OF THE INVENTION

An object of the present invention is to provide a reference point detection function and absolute position detection function, and to provide an optical encoder which can correctly detect a displacement of a scale in an x direction with little influence of a fluctuation of a gap between the scale and a head, and an optical encoder which enables a stable reference point detection and absolute position detection even with a change of ambient environment.

Another object of the present invention is to provide an optical encoder in which a light source does not have to be inclined with respect to the scale, no strict precision is required for adjustment of the gap between the scale and the head, and miniaturization and cost reduction are therefore realized.

Further object of the present invention is to provide an optical rotary encoder which does not cause an output drop.

To achieve the aforementioned objects, according to a first aspect of the present invention, there is provided "an optical encoder comprising:

a first coherence light source for emitting a first light beam;

a scale which can be displaced to cross the first light beam emitted from the first light source, and which has a first light modulation region formed of a predetermined-period optical pattern irradiated with the first light beam to generate a diffraction pattern;

first photodetection means comprising a light receiving surface for receiving the first light beam transmitted via the first light modulation region of the scale, and a single light receiving element group or a plurality of light receiving element groups formed at a predetermined interval so as to detect a predetermined portion of the diffraction pattern generated by irradiating the first light modulation region of the scale with the first light beam in the light receiving surface;

a second light source for emitting a second light beam;

a second light modulation region for modulating optical properties of the second light beam emitted from the second light source; and second photodetection means for receiving the second light beam with the optical properties modulated by the second light modulation region, wherein the first light modulation region and the second light modulation region are positioned in series in a moving direction of the scale, and the second light modulation region moves integrally with the first light modulation region with movement of the scale".

Moreover, to achieve the aforementioned objects, according to a second aspect of the present invention, there is provided "an optical encoder comprising:

a movable scale with a predetermined-period optical pattern formed therein;

a coherence light source for substantially vertically irradiating an optical pattern surface of the movable scale with a light beam having a predetermined shape; and photodetection means for receiving the light beam emitted from the light source and reflected by the optical pattern, and detecting a diffraction pattern generated by the optical pattern on a light receiving surface".

Furthermore, to achieve the aforementioned object, according to a third aspect of the present invention, there is provided "an optical rotary encoder comprising:

a coherence light source;

a disc-shaped scale which rotates to cross a light beam emitted from the coherence light source, and in which a radial optical pattern with a predetermined angle period to be irradiated with the light beam is formed; and a photodetector having a plurality of light receiving areas, arranged in a radial form from a circle center, for receiving the light beam transmitted via the optical pattern and detecting a bright/dark pattern generated by the optical pattern, wherein for the bright/dark pattern, a plurality of patterns are formed such that a bright portion is formed at the same angle on a circumference having a different distance from the circle center, and the bright/dark pattern comprises a first bright/dark pattern group and a second bright/dark pattern group in which bright portions are formed at different angles in a circumferential direction, and for an effective detection sensitivity of each light receiving area of the photodetector, an effective light receiving sensitivity of a portion with the bright portion of either the first bright/dark pattern group or the second bright/dark pattern group formed therein is higher than the light receiving sensitivity of other portions of the light receiving area".

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a plan view of the scale of FIG. 1 as seen from an upper surface in a −z direction;

FIG. 2B is a sectional view of the sensor head and scale of FIG. 1 in an xz plane;

FIG. 2C is a sectional view in a zy plane with respect to a z0 section of FIG. 1;

FIG. 3 is an explanatory view of an output of second photodetection means of FIG. 1 and a reference position detecting method;

FIG. 4 is a perspective view of the sensor head and scale according to a second embodiment of the optical encoder (sensor) of the present invention;

FIG. 6A is a plan view of the scale seen from the −z direction, and FIG. 6B is a sectional view in an xz plane;

FIGS. 7A, 7B are views of the optical encoder (sensor) according to a fourth embodiment of the present invention, FIG. 7A is a plan view of the scale seen from the −z direction, and FIG. 7B is a sectional view in the xz plane;

FIGS. 8A, 8B are views of the optical encoder (sensor) according to a fifth embodiment of the present invention, FIG. 8A is a plan view of the scale seen from the −z direction, and FIG. 8B is a sectional view in the xz plane;

FIGS. 9A, 9B are views of the optical encoder (sensor) according to a sixth embodiment of the present invention, FIG. 9A is a plan view of the scale seen from the —z direction, and FIG. 9B is a sectional view in the xz plane;

FIG. 10A is a sectional view in the zy plane according to the first embodiment shown for comparison;

FIG. 10B is a sectional view in the zy plane according to a seventh embodiment of the optical encoder (sensor) of the present invention;

FIG. 12A is a plan view of the scale seen from the −z direction, and FIG. 12B is a sectional view in the xz plane;

FIG. 44A is a perspective view showing a constitution of the optical rotary encoder according to a sixteenth embodiment of the present invention;

FIG. 44B is a plan view of the photodetector in FIG. 44A;

FIG. 45A is an explanatory view of a size of a region in which a light receiving sensitivity in the photodetector is low or absent;

FIG. 45B is a plan view showing a modification example of the photodetector in FIG. 44A;

FIG. 46A is a plan view showing another modification example of the photodetector in FIG. 44A;

FIG. 46B is a plan view of the photodetector in which the region with low or no light receiving sensitivity is formed of a shielding portion by a metal;

FIG. 47A is a plan view of the photodetector in which the region with low or no light receiving sensitivity is formed by forming a light receiving area in a concentric shape;

FIG. 47B is a plan view showing still another modification example of the photodetector in FIG. 44A;

FIG. 48C is a plan view of the rotary scale in which a portion with no optical pattern formed therein is formed of a total reflection pattern by a metal, and the like or formed of a non-reflection pattern by a resin, or and the like;

FIG. 55A is an explanatory view of an inclination angle of the image projected from the rotary scale from a line parallel to the light receiving area at a light receiving area end;

FIG. 55B is an explanatory view of either one of two inclination angles of FIG. 55A to be employed;

FIG. 55C is an explanatory view of definition of the size of the light receiving area;

DETAILED DESCRIPTION OF THE INVENTION

Embodiments of the present invention will be described hereinafter with reference to the drawings.

(First Embodiment)

Figure 1:
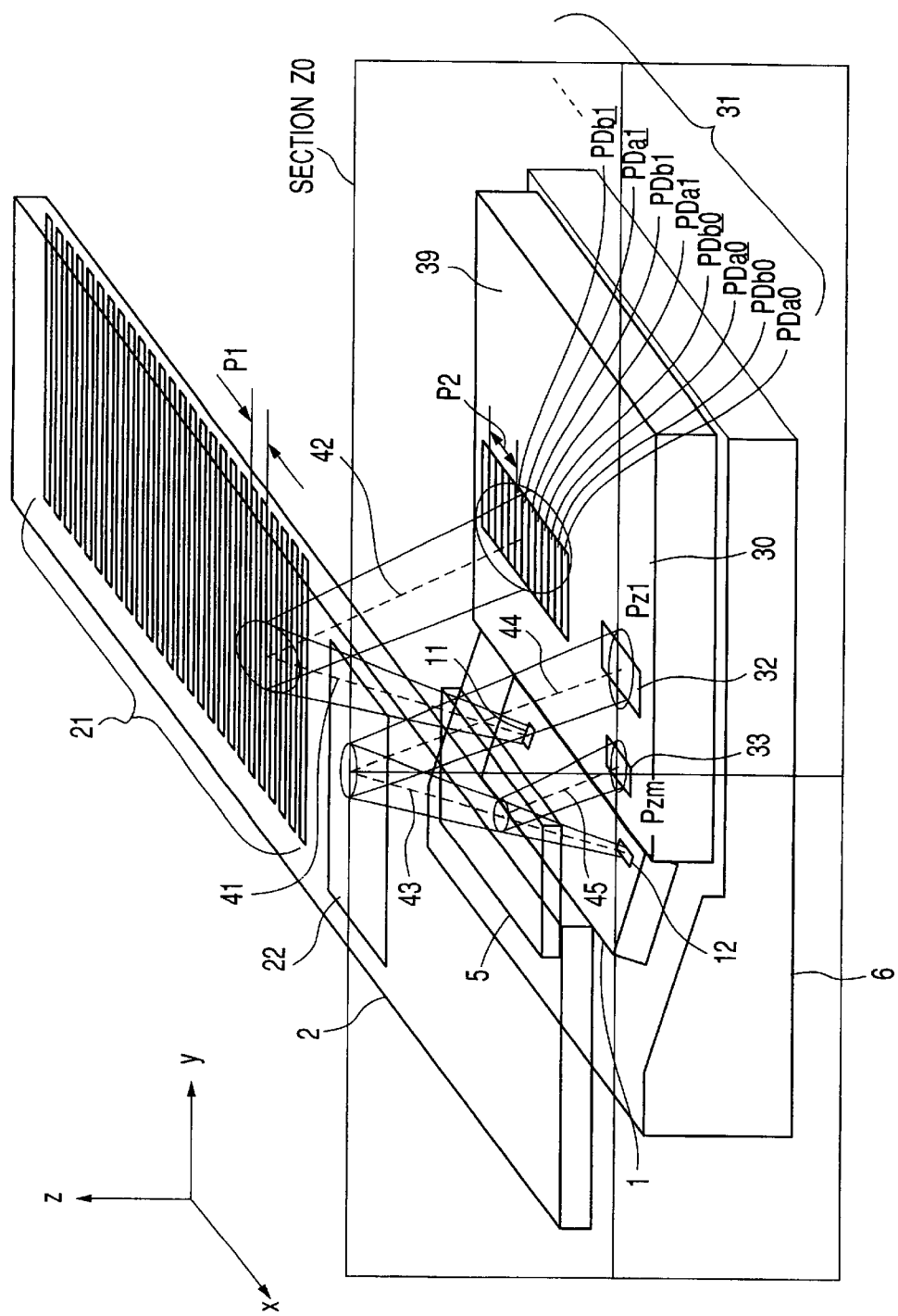
FIG. 1 is a perspective view of a sensor head and a scale according to a first embodiment of an optical encoder of the present invention.

FIG. 1 to FIG. 3 show a first embodiment of a first optical encoder according to the present invention.

Here, FIG. 1 is a perspective view of a sensor head and a scale.

FIG. 2A is a plan view of the scale seen from an upper surface in a −z direction, FIG. 2B is a sectional view of the sensor head and scale in an xz plane, and FIG. 2C is a sectional view in a zy plane with respect to a z0 section of FIG. 1.

FIG. 3 is an explanatory view of an output of second photodetection means of FIG. 1 and a reference position detecting method.

The first embodiment of the present invention is constituted as follows.

First, an outline of the optical encoder according to the first embodiment will be described with reference to FIG. 1.

Additionally, in the present specification, as shown in FIG. 1, a relative moving direction of a scale 2 to be detected is set to x-axis, a direction parallel to a scale surface and vertical to the x-axis is set to y-axis, and a direction vertical both to x and y axes is set to z-axis.

First and second light beams emitted from beam emitting windows 11, 12 of a surface emitting laser 1 advance along main axes 41, 43 of the respective light beams and, the respective light beams are irradiated on the scale surface, light axes are simultaneously bent. The respective light axes advance along main axes 42, 44 and reach light receiving regions of a light receiving element group 31 constituting first photodetection means, and second photodetection means 32.

Operation of the first embodiment of the present invention will next be described.

The first light beam 41 forms a diffraction pattern on a surface with the light receiving element group 31 constituting the first photodetection means formed thereon by the first light modulation region 21.

The first photodetection means is constituted of four light receiving element groups 31 formed by displacing the constituting light receiving element groups with a space period p20 at an interval of p20/4 and alternately arranging the elements. A light intensity corresponding to a specific space phase portion of the diffraction pattern generated by the first light modulation region 21 and first light beam 41 is outputted from the respective light receiving element groups 31. The outputs will be represented hereinafter as Va, Vb, Va', Vb'.

Here, Va-Va' and Vb-Vb' are utilized as so-called A phase (sine wave) and B phase (cosine wave) outputs of the encoder.

Moreover, a laser beam intensity can be monitored by obtaining a total sum of the respective outputs Va, Vb, Va', Vb'. Therefore, it is possible to correct an influence of a laser beam intensity change by an environment change and change with time to some degrees by feeding back a laser beam intensity change by the environment change and change with time so as to set the change to be constant, or by appropriately calculating the A and B phase output signals and a signal of the operation sum of the respective outputs Va, Vb, Va', Vb'.

Therefore, in the first embodiment, the displacement of the scale 2 in the x direction can correctly be detected with little influence of a fluctuation of a gap between the scale 2 and head and little influence of ambient environment.

On the other hand, the scale 2 relatively moves to obtain a positional relation between the scale 2 and the light source 1 in the vicinity of a predetermined reference position. In this case, optical properties of the second light beam 43 are modulated by the second light modulation region as a pattern for detecting the reference position. However, when the scale 2 is not in the vicinity of the reference position, the first light modulation region 21 or a region other than the first light modulation region is irradiated.

In the first embodiment, assuming that the second light modulation pattern is formed by a uniform high-reflection pattern, the output from the second photodetection means 32 has characteristics as shown in FIG. 3.

In FIG. 3, a state in which the first light modulation region 21 is irradiated with the second light beam 43 is shown in point A, a state in which a middle portion between the first and second light modulation regions 21 and 22 is irradiated with the second light beam 43 is shown in point B, and a state in which a middle portion of the second light modulation region 22 is irradiated with the second light beam 43 is shown in point C.

Now assumed is a displacement of the scale 2 from the state in which the first light modulation region 21 is irradiated with the second light beam 43 to the state in which the second light modulation region 22 is irradiated. Then, the output from the second photodetection means 32 changes as follows.

(1) In the vicinity of the point A, with the displacement of the scale 2, the output indicates a periodic change with a slight amplitude at a pitch of a space period p20 in an x direction.

In this case, an average output level is set to $S_{dc}$, and an amplitude is set to $\Delta S$.

(2) When the second light beam 43 is between an end of the first light modulation region 21 and a middle of the second light modulation region 22 (as shown by the point B in FIG. 3), the output is minimized.

(3) In the vicinity of the point C, since the strength of the light beam reflected by the high-reflection pattern of the second light modulation region 22 is maximized, the output is also maximized.

In this case, an output maximum level is set to $S_p$.

Therefore, a level $S_s$ is set such that $S_{dc}+\Delta S<S_s<S_p$. When the output from the second photodetection means 32 exceeds this level, it can be detected that the scale 2 is in the vicinity of the reference position.

Furthermore, a displacement point at which the output of the second photodetection means 32 meets the level $S_s$ is point L or point R of FIG. 3. Therefore, when the moving direction of the scale 2 is constant, the position of the point L or R can be detected with high precision.

Additionally, the light reflection pattern of the second light modulation region 22 is formed to be sufficiently long in the scale moving direction on a side opposite to a side with the first light modulation region 21 formed thereon. In this case, it is also possible to prevent the point R from being substantially detected.

Moreover, in FIG. 1 and FIG. 2A, 2B, 2C, a member 5 or 51 is a semi-transmission optical member which acts as light beam split means. The second light beam 43 reflected by the surface of the member is directly received by third photodetection means 33, and a function of a strength monitor of the second light beam 43 is realized.

Even when a sensor peripheral environment changes, the output of the second light beam 43 can be stabilized, for example, by feeding an output of the third photodetection means 33 back to light source drive means. Therefore, the reference position can steadily be detected against the environmental change.

Moreover, signal processing/calculation circuits of the respective photodetection means 31, 32, 33 and a drive circuit of the light source 1 are integrated in a region 39.

In FIG. 1, a member 30 is a semiconductor substrate with photodetection means and electronic circuit formed thereon, and a member 6 is a heat sink for fixing the light source to the semiconductor substrate and allowing generated heat to escape.

Additionally, in order to achieve the "reflective constitution", the surface emitting laser 1 is attached to an inclined surface of the member 6, that is, a surface inclined with respect to the scale in a predetermined direction to satisfy a light axis arrangement of the light beam defined as follows:

The first light source and the first photodetector are disposed on the same side with respect to the scale in which the first light modulation region is formed. The surface with the predetermined-period optical pattern formed therein in the first light modulation region is disposed in parallel with the light receiving surface of the second photodetector. The main axis of the first light beam is disposed to be inclined with respect to the surface with the predetermined-period optical pattern formed therein in the first light modulation region only in a plane vertical to a predetermined period direction of the first light modulation region.

The coherence light source and the first photodetector are disposed on the same space side with respect to said scale in which the first light modulation region is formed. The surface with the predetermined-period optical pattern formed therein in the first light modulation region is disposed in parallel with the light receiving surface of the first photodetector, and the main axis of the first light beam is disposed to be inclined with respect to the surface with the predetermined-period optical pattern formed therein in the first light modulation region only in a plane vertical to a predetermined period direction of the first light modulation region.

Moreover, in FIGS. 2B, 2C, a member 7 is a package base of a sensor head, and the member 51 is a seal glass which also serves as a beam emitting window.

Additionally, for respective constitutions of the first embodiment of the present invention, of course, various modifications and alterations are possible.

In the present embodiment, the so-called "reflective constitution" in which the light source 1 and photodetection means 31, 32 are disposed on the same side with respect to the scale 2 has been described. However, a so-called "transmission type constitution" may be used in which the light source and photodetection means are disposed on an opposite side with respect to the scale.

An example of the surface emitting laser has been described as the coherence light source, but a usual edge-emitting semiconductor laser, or another light source able to generate the diffraction pattern may be used.

Moreover, the aforementioned "case of the spread beam" has been described in the present embodiment, but the present invention can similarly be applied to the "case of the parallel beam".

For the first photodetection means 31, a deviating interval of the light receiving element group with the space period p20 constituting the means, or the number of light receiving element groups is not necessarily limited to that of the aforementioned example.

Moreover, when a plurality of light receiving element groups with the space period p20 are disposed, the constitution for alternately disposing the respective light receiving elements is not limited. Also included is a case in which all or some of the light receiving elements in each group are disposed together in another spatial place.

Moreover, a detection algorithm of the reference position by the output from the second photodetection means 32 is not limited to the aforementioned example.

Furthermore, it is unnecessary to form the first and second light modulation regions 21 and 22 on the same scale. Even when the first and second light modulation regions are formed separately from each other, the regions may be constituted to move together in a connected manner.

(Second Embodiment)

FIG. 4 and FIG. 5A, 5B, 5C are diagrams showing a second embodiment of the optical encoder (sensor) of the present invention.

Additionally, in the present embodiment, description of a part similar to that of the first embodiment is omitted.

The second embodiment of the present invention is constituted as follows.

In FIG. 4, a second light modulation region 23 is formed of a diffraction lattice different in a pitch direction from that of the first light modulation region 21. A first light receiving element 32' constituting the second photodetection means is disposed such that the light receiving element 32' of FIG. 4 can detect a diffraction light of an order highest in a diffraction efficiency when the second light modulation region is irradiated with the second light beam 43.

Moreover, a second light receiving element 32 constituting the second photodetection means is disposed, so that the light reflected by the surface of the scale 2 can be detected when a region other than the first light modulation region 21 is irradiated with the second light beam 43.

Here, outputs from the light receiving elements 32, 32' are Sz, Sz, respectively.

Operation of the second embodiment of the present invention will next be described.

The second photodetection means can be constituted of either or both of the light receiving elements 32', 32, but an example in which both outputs are used will be described herein.

Figure 5A:
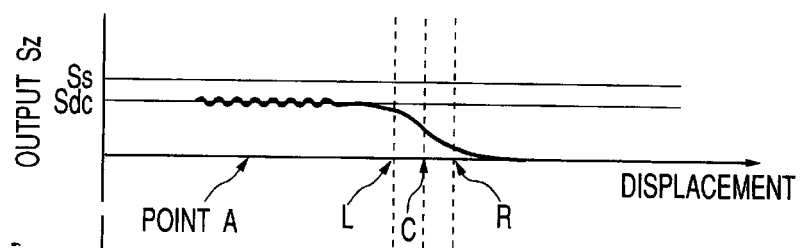
FIGS. 5A, 5B, 5C are characteristics diagrams showing changes of outputs Sz, Sz' from light receiving elements 32, 32' and a calculation result of Sz−Sz' when assuming a scale displacement from a state in which a first light modulation region is irradiated to a state in which a second light modulation region is irradiated with a second light beam.
Figure 5B:
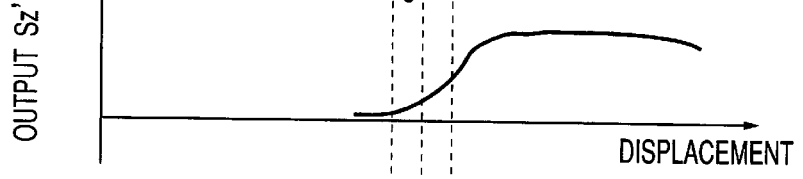

Now assumed is the displacement of the scale 2 from the state in which the first light modulation region 21 is irradiated with the second light beam 43 to the state in which the second light modulation region 23 is irradiated. Then, Sz, Sz' change as shown in FIGS. 5A, 5B.

That is:
(1) in the vicinity of the point A, with the displacement of the scale 2, Sz indicates a periodic change with a slight amplitude at the pitch of the space period p20 in the x direction, and
moreover, Sz' is a very small output; and
(2) when the position of the scale 2 changes to the point C from the point A, Sz decreases, and Sz' increases.

Figure 5C:
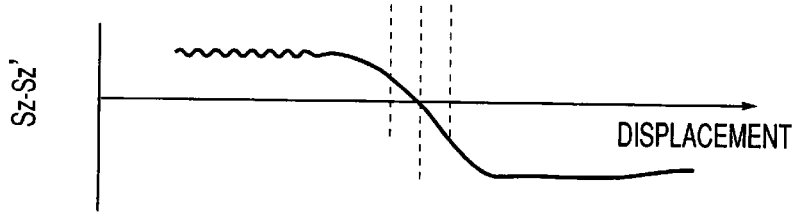

Therefore, for example, when calculation of Sz-Sz' is performed as shown in FIG. 5C, Sz-Sz' indicates zero or a specific value in the vicinity of point C, and therefore this can be utilized to detect the reference position.

Additionally, for the respective constitutions of the second embodiment of the present invention, of course, various modifications and alterations are possible.

Algorithm of handling or calculating of Sz, Sz' for detecting the reference point is not limited to the aforementioned example.

The second light modulation region 23 is not limited to the diffraction lattice as long as the region is a member for bending the light beam, and can be replaced, for example, with a reflecting or scattering member, hologram, prism, and the like.

Moreover, for the beam bending direction of the light beam bending means constituting the second light modulation region 23 (the beam bending direction of the diffraction lattice in the present embodiment), the direction does not have to be necessarily disposed to be vertical to or different from the pitch direction of the first light modulation region 21 as in the present embodiment.

(Third Embodiment)

Figure 6A:
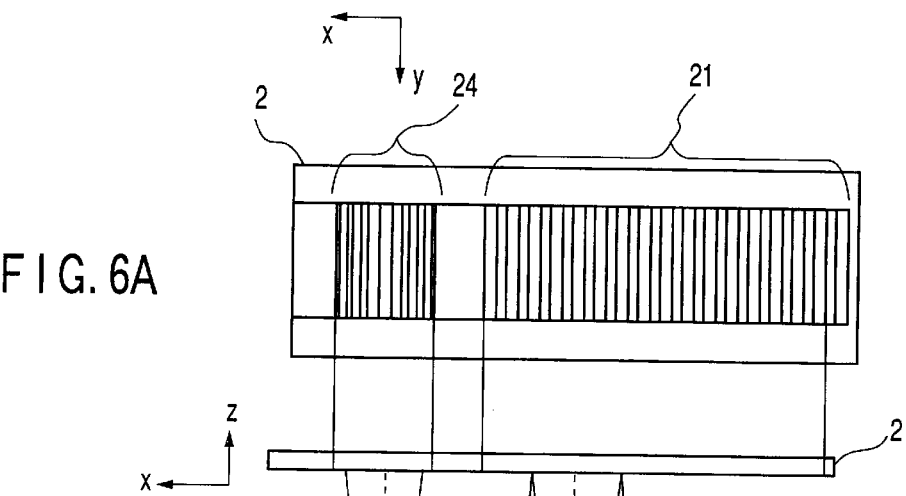
FIGS. 6A, 6B are views of the optical encoder (sensor) according to a third embodiment of the present invention.
Figure 6B:
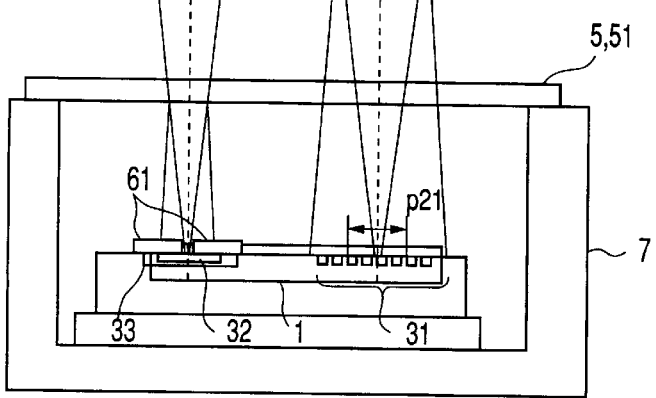

FIGS. 6A, 6B are diagrams showing a third embodiment of the optical encoder (sensor) of the present invention.

Here, FIG. 6A is a plan view of the scale seen from the $-z$ direction, and FIG. 6B is a sectional view in an xz plane.

Additionally, in the present embodiment, the description of a part similar to that of the first embodiment is omitted.

The third embodiment of the present invention is constituted as follows.

A second light modulation region 24 is constituted of a hologram which has a light converging property with respect to the moving direction of the scale 2. For the second light beam emitted from the light source 1, when the scale is displaced in the vicinity of the reference position, as shown in FIG. 6B the light beam is converged in the vicinity of the light receiving surface of the second light receiving means 32.

Shielding means 61 are formed in the light receiving surface of the second light receiving means 32, and an opening width of the shielding means 61 is limited to $p1(z1+z2)/z1$ or less with respect to the displacement direction of the scale 2.

Operation of the third embodiment of the present invention will next be described.

When the scale 2 is displaced to the reference position, the second light beam is received by the second light receiving means 32 through an opening of the shielding means 61.

The opening width of the shielding means 61 is limited to $p1(z1+z2)/z1$ or less with respect to the displacement direction of the scale 2. Therefore, a reference position detection sensitivity can easily be obtained with substantially the same precision as or a precision higher than that of a pitch $p1(z1+z2)/z1$ of the diffraction pattern which is generated on the light receiving surface of the first photodetection means 31 by irradiating the first light modulation region 21 on the scale 2 with the first light beam.

Thereby, with respect to the displacement of the scale 2, the reference position detection sensitivity can easily be obtained with substantially the same precision as or a precision higher than that of a period of the optical pattern formed in the first light modulation region 21.

Additionally, for the respective constitutions of the third embodiment of the present invention, of course, various modifications and alterations are possible.

The hologram does not have to necessarily have a light converging property of a single spot with respect to the moving direction of the scale 2, and has a plurality of space light intensity peaks with respect to the scale moving direction as in the general diffraction pattern. The second photodetection means 32 having an effective light receiving sensitivity with respect to a specific portion of these light intensity peaks may be constituted of a single light receiving element or a plurality of light receiving elements.

Moreover, the hologram does not have to necessarily have the light converging property of the single spot with respect to the moving direction of the scale 2, and may have a function of preventing the light beam from spreading.
(Fourth Embodiment)

FIGS. 7A, 7B are diagrams showing a fourth embodiment of the optical encoder (sensor) of the present invention.

Here, FIG. 7A is a plan view of the scale seen from the −z direction, and FIG. 7B is a sectional view in the xz plane.

Additionally, in the present embodiment, the description of a part similar to that of the first embodiment is omitted.

The fourth embodiment of the present invention is constituted as follows.

Respective second, first, and third light modulation regions 22-*a*, 21, 22-*b* are arranged in series on the scale 2 as shown in FIG. 7A.

FIG. 7A shows that the second and third light modulation regions 22-*a*, 22-*b* are formed by a light reflectance pattern with a specific width.

Operation of the fourth embodiment of the present invention will next be described.

When the scale 2 is displaced to a first reference position, the second light modulation region 22-*a* is irradiated with the second light beam, and additionally a change of optical properties of the turned light beam (light intensity change in FIGS. 7A, 7B) is detected by second photodetection means 32-*a*.

When the scale 2 is displaced to a second reference position, the third light modulation region 22-*b* is irradiated with a third light beam, and additionally the change of optical properties of the turned light beam (light intensity change in FIGS. 7A, 7B) is detected by third photodetection means 32-*b*.

According to the present constitution, "predetermined reference positions" can be arranged in series with and adjacent to each other on opposite sides of the first light modulation region 21.

Therefore, the first and second predetermined reference positions may be utilized as the reference position for detecting an absolute scale position, or either or both of the reference positions can also be used as a limit signal with respect to scale movement.

Additionally, for the respective constitutions of the fourth embodiment of the present invention, of course, various modifications and alterations are possible.

It is unnecessary to form the first, second and third light modulation regions 21, 22-*a*, 22-*b* on the same scale 2. Even when the regions are separately formed, the first light modulation region 21 and second light modulation region 22-*a* may be constituted to move together.
(Fifth Embodiment)

FIGS. 8A, 8B are diagrams showing a fifth embodiment of the optical encoder (sensor) of the present invention.

Here, FIG. 8A is a plan view of the scale seen from the −z direction, and FIG. 8B is a sectional view in the xz plane.

Additionally, in the present embodiment, the description of the part similar to that of the first embodiment is omitted.

The fifth embodiment of the present invention is constituted as follows.

As shown in FIG. 8A, a first light modulation region 21-*a*, second light modulation region 22, and third light modulation region 21-*b* are arranged in series on the scale 2.

FIG. 8A shows a case in which the first and second light modulation regions 21-*a*, 21-*b* are formed by an optical pattern with an equal period, and the second light modulation region 22 is formed by a high-reflectance pattern with a specific width.

Operation of the fifth embodiment of the present invention will next be described.

FIG. 8B shows a state in which the scale 2 is displaced to the reference position. The first, second, and third light modulation regions 21-*a*, 22, 21-*b* are irradiated with first, second, and third beams, respectively, and modulated light beams are detected by first, second, and third photodetection means 31-*a*, 32, 31-*b*, respectively.

In FIG. 8B, the scale 2 further moves to the left, the second, third, and third light modulation regions 22, 21-*b*, 21-*b* are irradiated with the first, second, and third beams, respectively, and the modulated light beams are led to the first, second, and third photodetection means 31-*a*, 32, 31-*b*, respectively.

Then, even when the uniform reflectance pattern of the second light modulation region 22 is irradiated with the first beam, the periodic diffraction pattern is not generated on the light receiving surface of the first photodetection means 31-*a*. Therefore, the A and B phase signals of the encoder cannot be obtained with an output from the first photodetection means 31-*a*.

Therefore, the third light modulation region 21-*b* is still irradiated with the third beam, and the periodic diffraction pattern is generated on the light receiving surface of the third photodetection means 31-*b*. Therefore, the A and B phase signals of the encoder can be obtained with an output from the third photodetection means 31-*b*.

On the other hand, when the scale 2 is displaced in an opposite direction, and even when the A and B phase signals of the encoder cannot be obtained with the output from the third photodetection means 31-*b*, the A and B phase signals of the encoder can be obtained with the output from the first photodetection means 31-*a*.

Therefore, in the present constitution, even when the "predetermined reference position" is disposed in a middle of the first and third light modulation regions, the displacement can always be detected by the A and B phase signals of the encoder. The displacement detection is therefore always possible by so-called relaying of a position detection result by the encoder A and B phase signals obtained from the first and third photodetection means 31-*a* and 31-*b* when the scale is displaced in the vicinity of the predetermined reference position.

Additionally, for the respective constitutions of the fifth embodiment of the present invention, of course, various modifications and alterations are possible.

For example, a plurality of sets of the first and second light modulation regions 21-*a*, 22 and first and second photodetection means 31-*a*, 32 may be arranged at constant intervals, or at predetermined different intervals, and a plurality of reference positions can also be disposed.
(Sixth Embodiment)

FIGS. 9A, 9B are diagrams showing a sixth embodiment of the optical encoder (sensor) of the present invention.

Here, FIG. 9A is a plan view of the scale seen from the −z direction, and FIG. 9B is a sectional view in the xz plane.

Additionally, in the present embodiment, the description of the part similar to that of the fifth embodiment is omitted.

The sixth embodiment of the present invention is constituted as follows.

The present embodiment has a constitution basically similar to that of the fifth embodiment, except that periods p1, p3 of the optical patterns of the first and third light modulation regions 21-*a*, 21-*b* are different and pitches of the light receiving elements constituting the first and third photodetection means 31-*a*, 31-*b* are accordingly different.

Operation of the sixth embodiment of the present invention will next be described.

When the first and third light modulation regions 21-*a*, 21-*b* are irradiated with the first and third beams, respectively, the first and third light modulation regions 21-*a*, 21-*b* act as vernier encoder patterns. Therefore, the absolution position can be detected within a specific displacement range determined by a least common multiple of the respective pitches p1, p3.

For the function as the vernier encoder, it is necessary to maintain a state in which the first and third light modulation regions 21-*a*, 21-*b* are irradiated with the first and third beams, respectively. Therefore, it is preferable to set an interval of the first and third beams to be broad in the scale moving direction, and set a width of the second light modulation region 22 to be narrow.

Additionally, for the respective constitutions of the sixth embodiment of the present invention, of course, various modifications and alterations are possible.

A set of the second light modulation region and second photodetection means is not always necessary.

Moreover, the absolute position detection range determined by the least common multiple of the respective pitches can be enlarged by disposing sets of the first, second, third, fourth, . . . light modulation regions, and corresponding first, second, third, fourth, . . . photodetection means, and adding a plurality of reference position detection functions, or using three or more optical patterns with different pitches as the vernier encoder.

(Seventh Embodiment)

FIG. 10B is a diagram showing a seventh embodiment of the optical encoder (sensor) of the present invention.

Here, FIG. 10A is a sectional view in the xz plane according to the first embodiment shown for comparison, and FIG. 10B is a sectional view in the xz plane according to the seventh embodiment.

Additionally, in the present embodiment, the description of the part similar to that of the first embodiment is omitted.

The seventh embodiment of the present invention is constituted as follows.

A beam split optical element 5 is disposed on the main axis of the second light beam 43, and the beam split optical element 5 is a diffraction lattice having a semi-transmission property.

The second light modulation region of the scale 2 is irradiated with the second light beam 43 transmitted through the diffraction lattice. Additionally, the scale 2 is not irradiated with the second light beam split by the diffraction lattice, and this beam is directly detected by the light receiving element 33 constituting fourth photodetection means.

Moreover, the diffraction lattice is formed in a light beam transmission window 51 of the sensor head, or attached to the window.

Operation of the seventh embodiment of the present invention will next be described.

An output of the fourth photodetection means 33 can realize a function of monitoring the strength of the second light beam output.

When the beam split optical element 5 is formed in the light beam transmission window of the sensor head, and when the beam split optical element 5 is a semi-transmission mirror, for the second light beam utilized in monitoring the light intensity, as shown by a main axis 45 of the light beam shown in FIGS. 10A, 10B, it is often necessary to dispose a light receiving portion of the fourth photodetection means on an edge of a semiconductor component forming the photodetection means. However, when the diffraction lattice or the hologram is used, the light axis can be bent. Therefore, the light receiving portion of the fourth photodetection means can freely be disposed.

Even when the peripheral environment of the sensor changes, the second light beam output can be stabilized, for example, by feeding the output of the fourth detector back to the drive means of the light source. Therefore, the reference position can steadily be detected against the environment change.

Additionally, for the respective constitutions of the seventh embodiment of the present invention, of course, various modifications and alterations are possible.

As the beam split optical element 5, in addition to the diffraction lattice, a prism, hologram, and the like may be used.

Moreover, the beam split optical element 5 may be disposed in any point on the light axis extending to the second light modulation region from a second light beam emitting portion.

(Eighth Embodiment)

Figure 11:
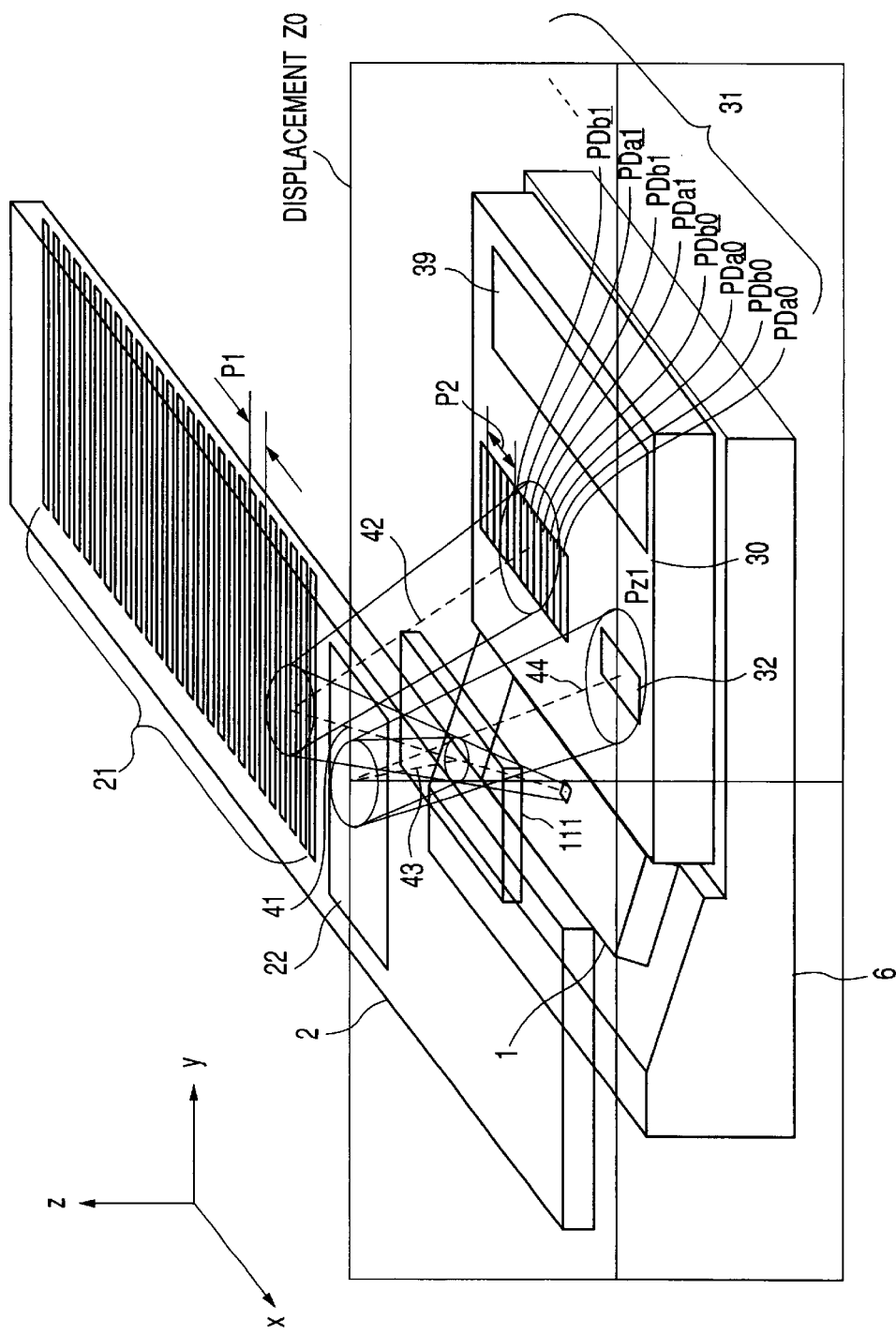
FIG. 11 is a perspective view of the sensor head and scale according to an eighth embodiment of the optical encoder (sensor) of the present invention.

FIG. 11 is a diagram showing an eighth embodiment of the optical encoder (sensor) of the present invention.

Additionally, in the present embodiment, the description of the part similar to that of the first embodiment is omitted.

The eighth embodiment of the present invention is constituted as follows.

A beam split optical element formed of a diffraction lattice 111 is disposed on the main axis of the light beam emitted from the light source.

In the optical encoder (sensor) as shown in FIG. 11, the beam split optical element of the diffraction lattice 111 is integrally formed in or attached to the beam emitting window of the sensor head.

Operation of the eighth embodiment of the present invention will next be described.

The light beam emitted from the light source 1 is split to at least first and second light beams 41, 43 by the beam split optical element of the diffraction lattice 111.

The main axes of these first and second light beams are shown by dotted lines 41, 43.

When the scale 2 is displaced in the vicinity of the reference position, as shown in FIG. 11, the first light modulation region 21 is irradiated with the first light beam 41, the second light modulation region 22 is irradiated with the second light beam 43, and respective reflected lights (or diffracted lights) are detected by the first and second photodetection means 31 and 32.

Since the coherence light source 1 may originally emit one light beam, light source portion miniaturization, and power consumption reduction are possible.

Furthermore, the light receiving element array group constituting the first photodetection means 31 is constituted of four groups, so that a phase difference is detected for each ¼ pitch of the generated diffraction pattern of the first light beam 41 on the light receiving surface of the first photodetection means 31 by the first light modulation region 21. In this case, a total sum of outputs of four light receiving element array groups having phase differences is in a proportional relation with the strength of the first light beam 41.

Moreover, since the first and second light beams 41, 43 are split at a constant ratio by the beam split optical element 111, the function of monitoring the strength of the second light beam can be realized simply by detecting the total sum of the outputs of the four light receiving array groups.

Even when the peripheral environment of the sensor changes, the second light beam output can be stabilized, for example, by feeding the output of the monitor function back to the drive means of the light source. Therefore, the reference position can steadily be detected against the environment change.

This function advantageously requires no monitoring photodetection means for exclusive use.

Additionally, for the main axis of the first light beam, as shown by the dotted line 41, a 0-dimensional diffraction light not bent by the diffraction lattice 111, that is, a transmission light is used. In this case, even when a gap between the scale 2 and the sensor head changes, the position of the first light modulation region 21 to be irradiated is not influenced. Therefore, a displacement sensing result advantageously becomes stable against the gap fluctuation between the scale and the sensor head.

Conversely, for the main axis 43 of the second light beam, the 0-dimensional diffraction light not bent by the diffraction lattice 111, that is, the transmission light is used. In this case, even when the gap between the scale and the sensor head changes, the position of the second light modulation region to be irradiated is not influenced. Therefore, the result of reference position detection advantageously becomes stable against the gap fluctuation between the scale and the sensor head.

Additionally, for the respective constitutions of the eighth embodiment of the present invention, of course, various modifications and alterations are possible.

The beam split optical element 111 may be an optical element having a beam split function, such as the diffraction lattice, hologram, and prism.

Moreover, when the beam split optical element 111 is a diffraction lattice, the first and second light beams are not limited to degrees of the 0-dimensional diffraction light, one-dimensional diffraction light, and the like.

(Ninth Embodiment)

Figure 12A:
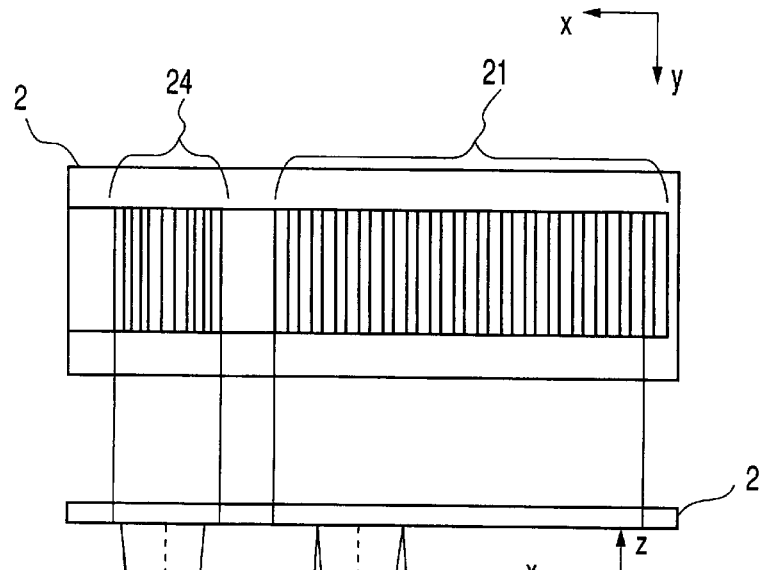
FIGS. 12A, 12B are views of the optical encoder (sensor) according to a ninth embodiment of the present invention.
Figure 12B:
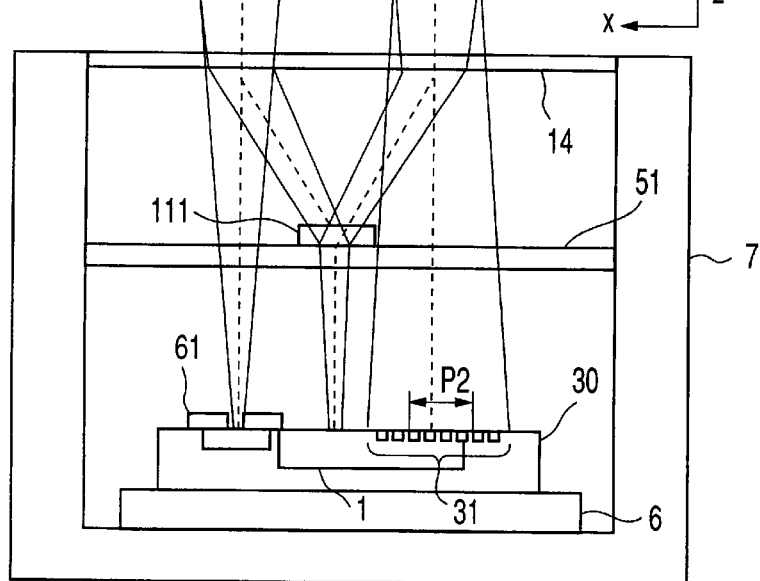

FIGS. 12A, 12B are diagrams showing a ninth embodiment of the optical encoder (sensor) of the present invention.

Here, FIG. 12A is a plan view of the scale seen from the −z direction, and FIG. 12B is a sectional view in the xz plane.

Additionally, in the present embodiment, the description of the part similar to that of the eighth embodiment is omitted.

The ninth embodiment of the present invention is constituted as follows.

The beam split optical element 111 is disposed on the main axis of the light beam emitted from the light source 1.

Furthermore, the present embodiment is constituted such that the first and second light beams split by the element are transmitted through a beam bending element 14 before the scale is irradiated with the beams.

Operation of the ninth embodiment of the present invention will next be described.

The light split into the first and second light beams by the beam split optical element 111 is further transmitted via the beam bending element 14, and bent to form the light axes vertical to the pitch direction of the scale 2. Then, the scale 2 is irradiated with the first and second light beams parallel to each other, respectively.

Therefore, even when the gap between the scale 2 and the sensor head changes, the positions of the first and second light modulation regions 21, 24 to be irradiated are not influenced. Therefore, the displacement sensing and reference position detection results advantageously become stable against the gap fluctuation between the scale 2 and the sensor head.

Additionally, for the respective constitutions of the ninth embodiment of the present invention, of course, various modifications and alterations are possible.

The beam split optical element 111 may be an optical element having a beam split function, such as the diffraction lattice, hologram, prism, and semi-transmission mirror.

Moreover, the beam bending element 14 may be an optical element having a beam bending function, such as the diffraction lattice, hologram, prism, and semi-transmission mirror.

When either one of the first and second light beams split by the beam split optical element 111 is the transmission light (or the 0-dimensional diffraction light), the transmission light beam is transmitted to the scale without being transmitted via the beam bending element 14. This case is also included.

The aforementioned first to ninth embodiments include the invention described later in claims 1 to 19.

Moreover, embodiments of the invention described later in claims 1 to 4 correspond to the first to ninth embodiments.

In these inventions, the aforementioned "case of the parallel beam" and "case of the spread beam" are included.

For the "coherence light source" among the aforementioned constituting factors, in these embodiments, the vertical resonator type surface emitting laser 1 has been mainly described. However, a general semiconductor laser, and other various light sources which can emit a light beam able to generate the diffraction pattern on the light receiving surface are also included.

Moreover, "the light modulation region formed of the optical pattern with the predetermined period to generate the diffraction pattern" means a region in which the optical pattern with a period modulation pattern of optical properties such as a transmission amplitude, reflection amplitude and phase formed therein is formed. The region includes all diffraction lattices such as a reflective diffraction lattice and transmission diffraction lattice for generating the diffraction pattern on the light receiving surface.

"The first photodetection means has a single or a plurality of light receiving element groups formed at a predetermined interval in a space period direction of the diffraction pattern and receives a predetermined portion of the diffraction pattern" means a light receiving element group constituted to add outputs of a plurality of light receiving elements formed at predetermined intervals in the pitch direction of the diffraction pattern on the light receiving surface and output the added outputs. Additionally, a case in which a plurality of light receiving element groups are formed deviating by predetermined distances on the light receiving surface is also included.

(Operation and Effect)

A first scale pattern is irradiated with the first light beam emitted from the coherence light source, and the diffraction pattern with the predetermined space period is generated on the light receiving surface of the first photodetection means.

The light receiving elements of the first photodetection means are formed at the predetermined interval corresponding to the space period of the diffraction pattern in the pitch direction of the diffraction lattice. Therefore, the respective light receiving elements detect only the same specific phase portion of the diffraction pattern on the light receiving surface.

When the scale is displaced in the pitch direction of the optical pattern on the scale, the diffraction pattern is accordingly displaced even on the light receiving surface. Therefore, every time the scale is displaced by one pitch in the pitch direction of the optical pattern, an output signal changing at a periodic strength is obtained from the first photodetection means.

On the other hand, the second light modulation region integrally displaced on the first light modulation region is disposed in series with the first light modulation region. When the scale moves to the predetermined reference position, the second light modulation region is irradiated with the second light beam, and the second photodetection means can detect the optical properties modulated by the second light modulation region. Therefore, for the scale position, the absolute position can be measured with respect to the reference position.

Moreover, the embodiment of the invention of claims 2 and 5 described later corresponds to the first to ninth embodiments.

In these inventions, the constitution for the "case of the divergent light beam" is defined.

In the constituting factors, "the first photodetection means has a single or a plurality of light receiving element groups formed substantially at an interval of $kp1(z1+z2)/z1$ in the space period direction of the diffraction pattern and receives the predetermined portion of the diffraction pattern". This means a light receiving element group constituted to add outputs of a plurality of light receiving areas formed substantially at the interval of $kp1(z1+z2)/z1$ in the pitch direction of the diffraction pattern on the light receiving surface and output the added outputs. Additionally, the case in which a plurality of light receiving element groups are formed deviating by the predetermined distance on the light receiving surface is also included.

Additionally, a value of k for determining each light receiving area interval does not have to be necessarily constant over a whole region.

Moreover, in "substantially at the interval of $kp1(z1+z2)/z1$", even if the value slightly deviates from a numerical value condition of $kp1(z1+z2)/z1$, the sensor functions. Therefore, even in the embodiments of the present invention, even when there is a deviation of about ±30% from the numerical value condition of $kp1(z1+z2)/z1$, the deviation is regarded as a range for carrying out the invention.

(Operation and Effect)

The first scale pattern is irradiated with the first light beam emitted from the coherence light source, and the diffraction pattern having a space period $p2=p1(z1+z2)/z1$ is generated on the light receiving surface of the first photodetection means.

Since the light receiving elements of the first photodetection means are formed at an interval $p20\ k \times p2 = k \times p1(z1+z2)/z1$ in the pitch direction of the diffraction lattice, these light receiving elements detect only the same specific phase portion of the diffraction pattern on the light receiving surface.

For simplicity, only a case of k=1 will be described hereinafter.

When the scale is displaced by xl in the pitch direction of the optical pattern on the scale, the diffraction pattern is displaced by $x2=x1(z1+z2)/z1$ in the same direction on the light receiving surface. Therefore, every time the scale is displaced by one pitch p1 in the pitch direction of the optical pattern, an output signal changing at the periodic strength is obtained from the first photodetection means.

On the other hand, the second light modulation region integrally displaced on the first light modulation region is disposed in series with the first light modulation region. When the scale moves to the predetermined reference position, the second light modulation region is irradiated with the second light beam, and the second photodetection means can detect the optical properties modulated by the second light modulation region. Therefore, for the scale position, the absolute position can be measured with respect to the reference position.

Moreover, the embodiment of the invention of claim 6 described later corresponds to the first to ninth embodiments.

(Operation and Effect)

Since the light source able to emit the first and second light beams is a surface emitting laser, a shape of the light beam can be set in a broad range by appropriately designing the emitting window and resonator of the surface emitting laser.

Therefore, for example, when the spread angle of the first light beam is appropriately designed, a beam irradiation region on the scale surface, and a spread region of the diffraction pattern on the light receiving surface can freely be set. Therefore, a degree of freedom of sensor layout design is high.

For example, when the sensor head is miniaturized, or an integrated circuit, and the like are integrally formed in the sensor head to obtain multiple functions under a limited sensor size condition, the beam spread angle of the surface emitting laser may be reduced.

Conversely, when the beam irradiation region on the scale surface, or the spread region of the diffraction pattern on the light receiving surface is expanded to enhance reliability against dust or the like, the spread angle of the first light beam may be set to be large.

As another effect, the surface emitting laser has a very small power consumption because of laser oscillation as compared with other lasers (the consumption can be set in a range of one over several tens to one over several thousands even as compared with a general striped semiconductor laser whose power consumption is relatively small). Additionally, a large number of light beams can easily be integrated two-dimensionally. Therefore, influence onto laser operation by heat generation can be avoided and a large number of light beams can be emitted close to one another. Moreover, a design burden on the drive circuit of the light source is small, and a low power consumption sensor can be realized.

Furthermore, according to the constitution in which a large number of light beams can be arranged two-dimensionally, an encoder constitution is also possible such that a large number of function blocks corresponding to sets of the first light beam, first light modulation region and first photodetection means are integrated. Therefore, the respective light modulation regions are formed of the optical patterns with different space periods, and the corresponding light receiving elements of the photodetection means are arranged. This can easily realize encoder function enhancement such as absolute positioning, and detection of a plurality of reference points.

Moreover, the embodiment of the invention of claims 3 and 7 described later correspond to the first to seventh embodiments.

(Operation and Effect)

As described in the second prior example, there is provided the so-called "reflective" constitution in which the beam emitted from the light source defines the inclined surface, and the light source and first photodetection means are disposed on the same space side with respect to the scale with the first light modulation region formed therein. Furthermore, the surface with the optical pattern of the predetermined period formed thereon in the first light modulation region is disposed substantially in parallel with the light receiving surface of the first photodetection means. Even when the gap between the scale and light source fluctuates, the signal outputted from the first detection means hardly changing, since the pitch of the diffraction pattern on the light receiving surface and the peak position are not changed, and therefore correct displacement amount sensing is possible.

Furthermore, in addition to the constitution and characteristics, the second light modulation region displace integrally with the first light modulation region is disposed in series with the first light modulation region. When the scale moves to the predetermined reference position, the second light modulation region is irradiated with the second light beam, the second photodetection means can detect the optical properties modulated by the second light modulation region. Therefore, for the scale position, the absolute position can be measured with respect to the reference position.

That is, there can be provided an encoder which has a reference point detection function and absolute position detection function, and which can correctly detect the scale displacement in the x direction without being much influenced by the fluctuation of the gap between the scale and the head.

Moreover, the embodiment of the invention of claim 8 described later corresponds to the first, fourth, fifth, sixth, seventh, and eighth embodiments.

(Operation and Effect)

When the scale with the second light modulation region formed therein approaches the predetermined reference position, the uniform reflection, scattering or transmission pattern formed in the light modulation region with a specific width is irradiated with the second light beam. The strength of the light received by the second photodetection means changes. Therefore, the reference position can be detected in accordance with an output change of the second photodetection means.

Moreover, the embodiment of the invention of claim 9 described later corresponds to the second embodiment.

Additionally, in a usual case in which the second light beam is not bent by the light beam bending means, that is, when the second light modulation region is not irradiated with the second light beam, the light receiving region of the second photodetection means may be disposed in a position for detecting the reflected or transmitted light from the scale (hereinafter referred to as a position Pz1). Conversely, when the second light beam is bent by the light beam bending means, the light receiving region may be disposed in a position for detecting the reflected or transmitted light from the scale (hereinafter referred to as a position Pz2).

(Operation and Effect)

When the scale with the second light modulation region formed therein approaches the predetermined reference position, the light beam bending means formed in the light modulation region is irradiated with the second light beam. The strength of the light received by the second photodetection means disposed in the predetermined position changes. Therefore, the reference position can be detected in accordance with the output change of the second photodetection means.

Moreover, the embodiment of the invention of claim 10 described later corresponds to the second embodiment.

(Operation and Effect)

A detector for reflecting or transmitting the second light beam not bent by the light beam bending means is disposed, so that a photodetector for detecting a bent light can detect the second light beam bent by the light beam bending means.

Here, it is assumed that outputs from these two photodetectors are Sz', Sz. When the first light modulation region is irradiated with the second light beam, and the scale is displaced, the output Sz from one of the photodetectors indicates a periodic change with a slight amplitude at a pitch of space period p20 in the x direction.

Moreover, when the first light modulation region is irradiated with the second light beam, and the scale is displaced, the output Sz from one photodetector decreases, and the output Sz' from the other photodetector increases.

This can be utilized to detect the reference position.

As "the predetermined calculation", various calculating methods can be considered. For example, there may be a constitution in which a subtraction result of Sz and Sz' is outputted from the second photodetection means.

Moreover, the embodiment of the invention of claim 11 described later corresponds to the second, third, and ninth embodiments.

(Operation and Effect)

When the scale with the second light modulation region formed therein approaches the predetermined reference position, the hologram formed in the light modulation region is irradiated with the second light beam, and a hologram pattern is generated on the light receiving surface of the second photodetection means disposed in the predetermined position.

A generated state of the hologram pattern, that is, intensity distribution is detected by the second photodetection means whose arrangement and shape are appropriately designed, so that the reference position can be detected.

Therefore, when the second light modulation region is a hologram, the arrangement and shape of the light receiving portion of the second photodetection means can freely be set, and sensor miniaturization, enhancement of reference position detection precision, and the like are possible.

Moreover, the embodiment of the invention of claim 12 described later corresponds to the third and ninth embodiments.

(Operation and Effect)

The hologram formed in the light modulation region is irradiated with the second light beam, and the hologram pattern is generated on the light receiving surface of the second photodetection means. The second photodetection means is an effective light receiving region limited to p1(z1+z2)/z1 or less with respect to the displacement direction of the scale. Thereby, the reference position detection sensitivity can easily be obtained with substantially the same precision as or a precision higher than that of the pitch p1(z1+z2)/z1 of the diffraction pattern which is generated on the light receiving surface of the first photodetection means by irradiating the first light modulation region on the scale with the first light beam.

Thereby, with respect to the displacement of the scale, the reference position detection sensitivity can easily be obtained with substantially the same precision as or the precision higher than that of the period of the optical pattern formed in the first light modulation region.

Moreover, the embodiment of the invention of claim 13 described later corresponds to the fourth embodiment.

(Operation and Effect)

According to the present constitution, "the predetermined reference positions" can be disposed in series with or adjacent to each other on opposite sides of the first light modulation region.

Moreover, the embodiment of the invention of claim 14 described later corresponds to the fifth and sixth embodiments.

(Operation and Effect)

In the present constitution, "the predetermined reference position" can be disposed in the middle of the first and third light modulation regions.

Moreover, when p1 is not equal to p3, the first and third light modulation regions serve as the vernier encoder. Therefore, the absolute position can be detected within the specific displacement range determined by the least common multiple of the respective pitches p1, p3.

Furthermore, the embodiment of the invention of claim 15 described later corresponds to the first to seventh embodiments.

(Operation and Effect)

Among the light beams split by the beam split optical element, the second light beam is not transmitted to the scale, and is detected directly by the fourth photodetection means.

Therefore, the function of monitoring the strength of the second light beam output can be realized.

Even when the peripheral environment of the sensor changes, the second light beam output can be stabilized, for example, by feeding the output of the fourth detector back to the drive means of the light source.

Therefore, the reference position can steadily be detected against the environment change.

Moreover, the embodiment of the invention of claim 16 described later corresponds to the first to sixth embodiments.
(Operation and Effect)

Since the beam split optical element can be disposed in a transmission window member itself, or in the vicinity of the member, the constitution is suitable for sensor head miniaturization, and cost reduction.

Moreover, the embodiment of the invention of claim 17 described later corresponds to the seventh embodiment.
(Operation and Effect)

When an element constituting the beam split optical element is a hologram, the shape and position of the hologram pattern on the light receiving surface of the fourth photodetection means can freely be designed by designing the hologram. Therefore, the shape and disposing point of the fourth photodetection means can freely be set.

When the element constituting the beam split optical element is a prism, a position for maximizing the monitor light intensity of the second light beam on the light receiving surface of the fourth photodetection means can freely be designed by designing the prism. Therefore, the disposing point of the fourth photodetection means can freely be set.

Moreover, the embodiment of the invention of claim 18 described later corresponds to the eighth and ninth embodiments.
(Operation and Effect)

Since the coherence light source may originally emit one light beam, the light source portion miniaturization and power consumption reduction are possible.

Furthermore, for example, the light receiving element array group constituting the first photodetection means is constituted of four groups, so that the phase difference is detected for each ¼ pitch of the generated diffraction pattern of the first light beam on the light receiving surface of the first photodetection means by the first light modulation region. In this case, the total sum of outputs of four light receiving element array groups having phase differences is in the proportional relation with the strength of the first light beam.

Moreover, since the first and second light beams are split at the constant ratio by the beam split optical element, the function of monitoring the strength of the second light beam can be realized simply by detecting the total sum of the outputs of the four light receiving array groups.

Even when the peripheral environment of the sensor changes, the second light beam output can be stabilized, for example, by feeding the output of the monitor function back to the drive means of the light source. Therefore, the reference position can steadily be detected against the environment change.

This function advantageously requires no monitoring photodetection means for exclusive use.

Moreover, the embodiment of the invention of claim 19 described later corresponds to the ninth embodiment.

Additionally, among the first and second light beams, when one of the light beams split by the beam split optical element is a transmission light (or the 0-dimensional diffraction light), the transmission light beam is not transmitted via the beam bending element 14 and the scale is irradiated with the beam. This case is also included.
(Operation and Effect)

The light axis of both or either of the first and second light beams is adjusted to be vertical with respect to the scale pitch direction, and is applied to the scale.

Therefore, even when the gap between the scale and the sensor head changes, the positions of the first and second light modulation regions to be irradiated with both or either of the first and second light beams are not influenced. Therefore, the displacement sensing and reference position detection results advantageously become stable against the gap fluctuation of the scale and sensor head.
(Tenth Embodiment)

FIG. 13 to FIGS. 16A, 16B show a tenth embodiment of a second optical encoder according to the present invention.

The tenth embodiment provides a reflective optical linear encoder. This will be described with reference to FIG. 13 to FIGS. 16A, 16B.

Figure 13:
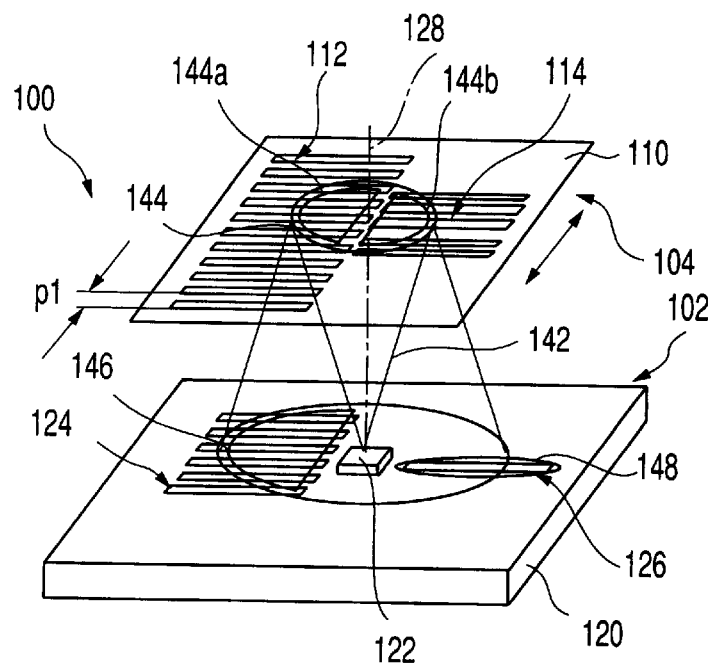
FIG. 13 is a perspective view showing a schematic constitution of an optical linear encoder according to a tenth embodiment of the present invention.

As shown in FIG. 13, an optical linear encoder 100 of the present embodiment is provided with an encoder head 102 including an optical system for detecting movement, and a movable scale 104 which can move in parallel with the encoder head 102.

The movable scale 104 is provided with a first optical pattern 112 for detecting the movement of the scale 104, and a second optical pattern 114 for detecting a reference position of the scale 104, which are formed on the surface of an optically transparent substrate, for example, a glass substrate 110.

The first optical pattern 112 extends substantially entirely in the scale 104 along a moving direction of the scale 104, and has a reflectance which changes at a constant period p1 along the moving direction of the scale 104.

Moreover, the first optical pattern 112 is formed, for example, by forming thin films of a metal having a high reflectance with the same width at a constant interval (e.g., p1/2) on the transparent substrate 110.

Moreover, the second optical pattern 114 exists only in a part of a region of the scale 104 with respect to the moving direction of the scale 104, and has a light converging action with respect to the moving direction of the scale 104.

The second optical pattern 114 is, for example, a holographic pattern, or a cylindrical hologram lens.

The encoder head 102 is provided with a light source for radiating a coherence light, that is, a coherence light source 122, first photodetection means or a photodetector 124 for detecting a reflected light from the first optical pattern 112, and second photodetection means or a photodetector 126 for detecting the reference position to detect the reflected light from the second optical pattern 114. These are held by a substrate 120.

The substrate 120 is, for example, a semiconductor substrate, and the first photodetector 124 and second photodetector 126 are both formed in the semiconductor substrate 120.

The coherence light source 122 is, for example, a single-unit surface emitting laser, and fixed to the flat substrate 120 by means such as adhesion.

That is, the light source 122 and photodetectors 124 and 126 are disposed on the substrate 120 in a hybrid manner.

Since the surface emitting laser 122 is fixed to the flat substrate 120, the laser can easily be attached.

The coherence light source 122 is preferably a surface emitting laser, but is not limited to the surface emitting laser, and an edge-emitting laser, a light emitting diode (LED), and the like may be used as light sources which have characteristics of the light coherency.

However, the surface emitting laser can emit a light beam with a predetermined shape without using optical components such as a lens. Therefore, the laser is especially preferable for the object of miniaturization.

The encoder head 102 and movable scale 104, in other words, the substrate 120 and transparent substrate 110 are disposed in parallel with each other at a constant interval.

Therefore, the surface of the scale 104 is substantially vertically irradiated with a light beam 142 emitted from the surface emitting laser 122.

That is, a main axis 128 of the light beam 142 directed to the movable scale 104 from the surface emitting laser 122 is substantially vertical to the movable scale 104.

Figure 14:
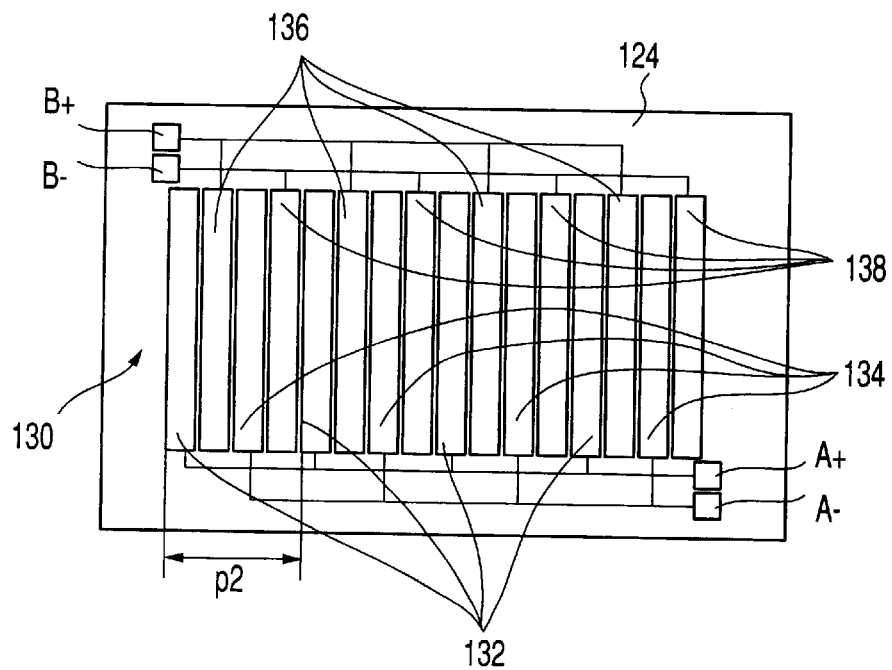
FIG. 14 is a plan view of a photodetector for detecting movement shown in FIG. 13.

As shown in FIG. 14, the first photodetector 124 is provided with a plurality of light receiving areas 130, in other words, light receiving elements such as photodiodes.

The plurality of light receiving areas 130 include a first light receiving area group 132, second light receiving area group 134, third light receiving area group 136, and fourth light receiving area group 138.

Light receiving areas belonging to the same light receiving area group are arranged at a pitch p2, and therefore two adjacent light receiving areas are arranged at a pitch p2/4.

More generally, the light receiving areas belonging to the same light receiving area group are arranged at a pitch p2×n (n=1, 2, 3, . . . ), and two adjacent light receiving areas are arranged at a pitch p2/4×m (m=1, 2, 3, . . . ).

The light receiving areas of the light receiving area group are arranged like comb teeth, and these are disposed to engage with the light receiving areas of the other light receiving area group.

The light receiving areas of the same light receiving area group are electrically connected to one another. The first light receiving area group 132 outputs an $A^+$ signal, the second light receiving area group 134 outputs an $A^-$ signal, the third light receiving area group 136 outputs a $B^+$ signal, and the fourth light receiving area group 138 outputs a $B^-$ signal.

Here, the $A^-$ signal indicates a reverse signal of the $A^+$ signal, that is, a signal with a phase deviating by 180 degrees.

This also applies to a relation between the $B^-$ signal and the $B^+$ signal.

These signals are processed by a signal processing circuit (not shown), A phase signal is generated by subtraction of the $A^+$ signal and $A^-$ signal, and B phase signal is generated by subtraction of the $B^+$ signal and $B^-$ signal.

The signal processing circuit may be formed in the semiconductor substrate 120, for example, similarly as the photodetectors 124 and 126.

Figure 15:
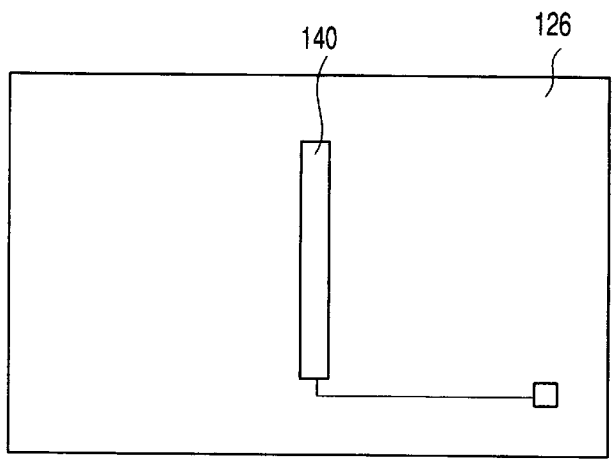
FIG. 15 is a plan view of a photodetector for detecting a reference position shown in FIG. 13.

As shown in FIG. 15, the second photodetector 126 is provided with a single light receiving area 140, in other words, a light receiving element such as the photodiode.

Operation of the linear encoder of the present embodiment will next be described turning back to FIG. 13.

The movable scale 104 is vertically irradiated with the light beam 142 emitted from the surface emitting laser 122, and a beam spot 144 is formed on the surface of the scale.

A portion 144a of the beam spot 144 is constantly irradiated to the first optical pattern 112, a reflected light beam from the portion lights the first photodetector 124, and a diffraction pattern 146 formed by the first optical pattern 112 is projected on the light receiving surface of the photodetector.

The diffraction pattern 146 is a bright/dark pattern having a period of pitch $p2=p1(z1+z2)/z1$.

The bright/dark pattern moves in parallel with the moving direction of the scale 104 on the light receiving area 130 of the photodetector 124 along with the movement of the scale 104.

Figure 16A:
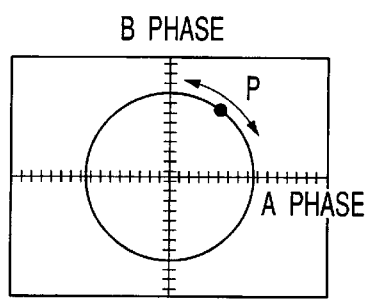
FIG. 16A shows A and B phase signals obtained by the movement detecting photodetector shown in FIG. 13.

As described above, the first photodetector 124 is provided with a plurality of light receiving areas 130 including the first to fourth light receiving area groups. As shown in FIG. 16A, the A and B phase signals are generated based on outputs of the respective light receiving area groups.

The A and B phase signals reflect the phase of the diffraction pattern 146 in a specific position. The signals deviate from each other by ¼ of a period p of the diffraction pattern 146, that is, 90 degrees in phase.

Figure 16B:
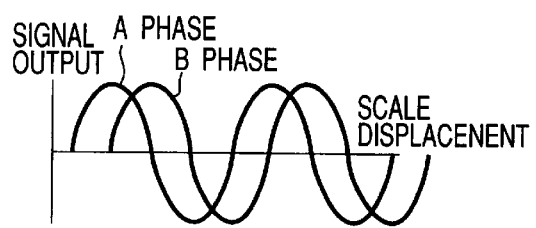
FIG. 16B is a diagram showing a Lissajous's figure obtained based on the A and B phase signals of FIG. 16A.

As shown in FIG. 16B, a Lissajous's figure is obtained from the A and B phase signals.

When the A and B phase signals approximate to sine waves, the Lissajous's figure becomes circular.

A point P of FIG. 16B indicates a relative position of the scale 104 with respect to the photodetector 124 at a certain time, and moves on a circumference of the Lissajous's figure with the movement of the scale 104.

Furthermore, speed and direction of movement of the point P depend on the speed and direction of movement of the scale 104.

Therefore, the movement speed and direction of the scale 104 can be detected based on the movement speed and direction of the point P on the Lissajous's figure.

When the scale 104 is in the reference position, the second optical pattern 114, for example, a cylindrical hologram lens is irradiated with another portion 144b of the beam spot 144.

A size of the reflected light beam from the portion in the moving direction of the scale 104 is restricted, and the beam forms a beam spot 148 which preferably lights the second photodetector 126.

As a result, the second photodetector 126 senses the light, and detects a reference position signal.

On the other hand, when the scale 104 deviates from the reference position, the portion 144b of the beam spot 144 deviates from the second optical pattern 114. Therefore, the second photodetector 126 senses no light, and detects no reference position signal.

Since the linear encoder 100 is provided with the second optical pattern 114 and second photodetector 126 in this manner, the reference point position of the scale 104 can be detected.

Furthermore, the cylindrical hologram lens can be utilized to detect the reference position of the scale 104 with high precision.

Especially, the light receiving area 140 more preferably has a width narrower than $p1(z1+z2)z1$.

Here, the width is a size along the moving direction of the scale 104, z1 is a length of the main axis of the light beam directed to the scale 104 from the light source 122, and z2 is a length of the main axis of the light beam directed to the light receiving area 140 from the second optical pattern 114.

In this case, the reference point position of the scale 104 can be detected with a sensitivity not more than the period p1 of the optical pattern 112 of the scale 104.

When a thickness of the surface emitting laser 122 is sufficiently small as compared with z1 and z2, a ratio of z1 to z2 becomes constant. Therefore, the period p2 of the diffraction pattern 146 projected onto the photodetector 124 does not change.

Moreover, with changes of z1 and z2, the diffraction pattern 146 projected onto the photodetector 124 moves in a direction crossing at right angles to the moving direction of the scale 104. Therefore, the precision of the detected position is not influenced.

As seen from the above description, the linear encoder of the present embodiment is superior in mass productivity because the surface emitting laser 122 is attached to the flat substrate 120.

Moreover, the linear encoder of the present embodiment is suitable for miniaturization because the scale 104 is substantially vertically irradiated with the light beam 142 from the light source 122.

Furthermore, the linear encoder of the present embodiment is small in size and high in performance because one light source 122 lights two different optical patterns 112 and 114 and different scale information is obtained.

In the present embodiment, various modifications are possible.

For example, the second optical pattern 114 for detecting the reference position is not limited to the cylindrical hologram lens, and may be any optical pattern as long as the optical properties of the pattern change in the reference position with respect to the moving direction of the scale 104.

Moreover, the photodetector 126 is not limited to the single light receiving area, and may be provided with a plurality of light receiving areas arranged in parallel.

Furthermore, there may be provided a light receiving area pattern corresponding to the second optical pattern 114.

Additionally, in order to set z1=z2, for example, the surface emitting laser 122 is allowed to sink and is disposed, so that the height of an emitting surface of the surface emitting laser 122 may be matched with that of the light receiving surface of the photodetector 124.

Moreover, in order to raise the effective height of the light receiving surface of the light receiving area, for example, a reflectance member for adjusting an optical distance may be disposed in an optical path.

Some modification examples will be described hereinafter with reference to the drawings.

Figure 17:
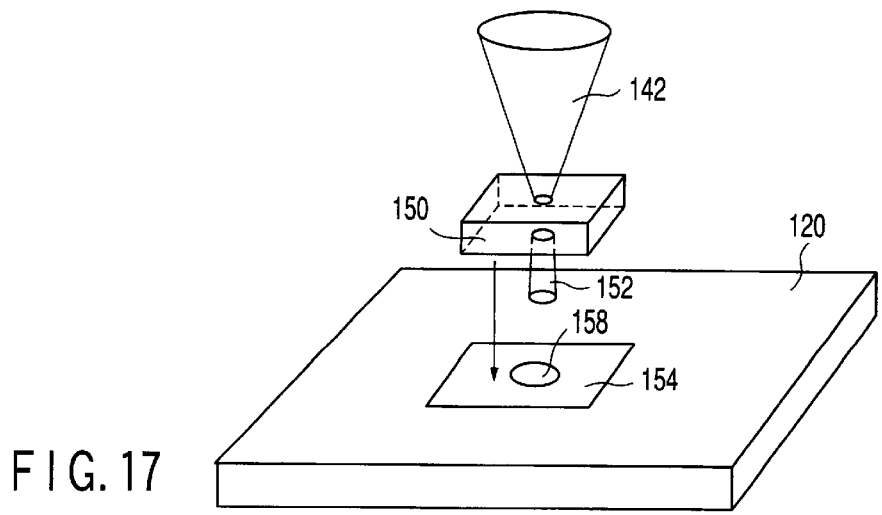
FIG. 17 is a diagram showing a light source and an attachment portion of the light source in a first modification example of the tenth embodiment.

A first modification example relates to an improvement of the light source. As shown in FIG. 17, there is provided a surface emitting laser 150 which emits lights via opposite surfaces.

For the surface emitting laser 150, the light beam 142 is emitted from an upper surface of the laser disposed opposite to the scale, while a light beam 152 is emitted from an opposite lower surface of the laser.

The substrate 120 is provided with a laser attachment portion 154, and the laser attachment portion 154 is formed of a metal pattern, and is electrically connected to an electrode of the lower surface of the surface emitting laser 150.

The laser attachment portion 154 has an opening for passing the light beam 152 emitted from the lower surface of the surface emitting laser 150 in a middle portion.

The substrate 120 is further provided with a light receiving portion 158 for detecting a strength of the light beam 152 transmitted through the opening of the laser attachment portion 154.

The light receiving portion 158 outputs a signal indicating the strength of the incident light beam 152.

In the surface emitting laser 150, a ratio of the light intensity of the light beam 142 emitted from the upper surface to that of the light beam 152 emitted from the lower surface is constant.

Therefore, for example, when driving of the surface emitting laser 150 is controlled by a processing circuit (not shown) in accordance with an output signal from the light receiving portion 158, the strength of the light beam 142 emitted from the upper surface of the surface emitting laser 150 can be adjusted to a desired strength.

Moreover, the strength of the light beam 142 can be controlled and kept to be constant against environment change such as temperature change.

Furthermore, the light beam can also be controlled such that the light beam with a strength exceeding a predetermined upper limit value is prevented from being emitted.

In this manner, for the linear encoder of the present modification example, the strength of the light beam 142 emitted from the surface emitting laser 150 can be controlled without adding any separate component element.

Figure 18:
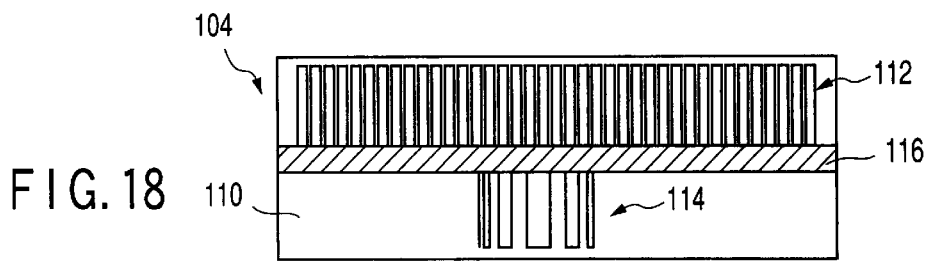
FIG. 18 is a diagram showing a constitution of a movable scale in a second modification example of the tenth embodiment.

A second modification example relates to an improvement of the scale. As shown in FIG. 18, the scale 104 is provided with an elongated low-reflection or non-reflection region 116 which extends along the moving direction of the scale 104 in a strip shape between the first optical pattern 112 and the second optical pattern 114.

In other words, the scale 104 has the low-reflectance strip-shaped elongated region or the region 116 whose reflectance is substantially equal to 0 in a portion irradiated with a portion of the light beam emitted from the light source in the vicinity of the main axis of the beam.

In the region 116, the light beam emitted from the light source is reflected mainly by the optical pattern 112, rarely by the optical pattern 114 of the scale 104. This prevents occurrence of an undesirable phenomenon in which the light beam reenters the light source and a light source output property becomes unstable.

In other words, a so-called composite resonator is prevented from being formed between the light source and the scale.

As a result, the light beam emitted from the light source is stabilized.

Figure 19:
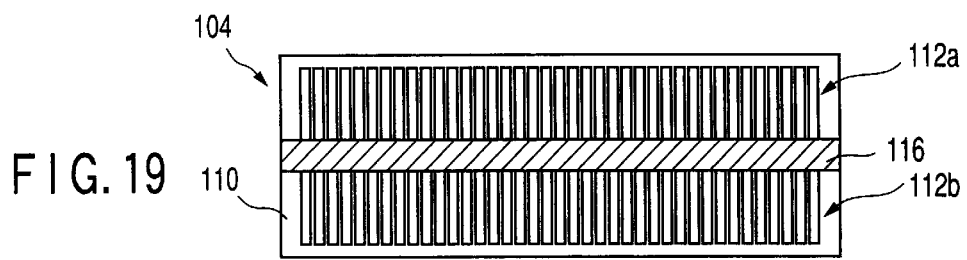
FIG. 19 is a diagram showing a constitution of the movable scale in a third modification example of the tenth embodiment.

A third modification example also relates to an improvement of the scale. As shown in FIG. 19, the scale 104 is provided with the strip-shaped low-reflection or non-reflection region 116 extending in a middle portion of the transparent substrate 110 in parallel with the moving direction of the scale 104, and a pair of optical patterns 112a, 112b, positioned on opposite sides of the region, for detecting movement.

The optical patterns 112a, 112b extend substantially entirely in the scale 104 along the moving direction of the scale 104, and have a reflectance which changes along the moving direction of the scale 104 at a constant period.

Figure 20:
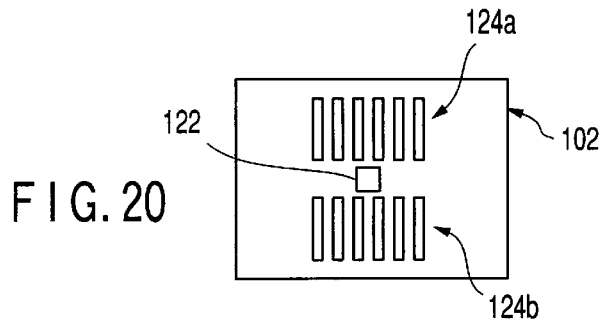
FIG. 20 is a diagram showing a constitution of an encoder head for use in accordance with the movable scale shown in FIG. 19.

Moreover, as shown in FIG. 20, for the scale 104, the encoder head 102 is provided with a pair of photodetectors 124a, 124b for detecting reflected lights from the respective optical patterns 112a, 112b.

Similarly as the photodetector 124 shown in FIG. 14, each of the photodetectors 124a, 124b is provided with a plurality of light receiving areas including the first to fourth light receiving area groups.

In the present modification example, since the scale 104 is provided with the low-reflection or non-reflection region 116, the composite resonator is prevented from being formed between the light source and the scale and, as a result, the light beam emitted from the light source is stabilized.

Moreover, as compared with the basic constitution of FIG. 13, since the diffraction pattern having about double light amount is detected, the constitution of the present example has a strong resistance to a scale scratch, defect, and the like.

Figure 21:
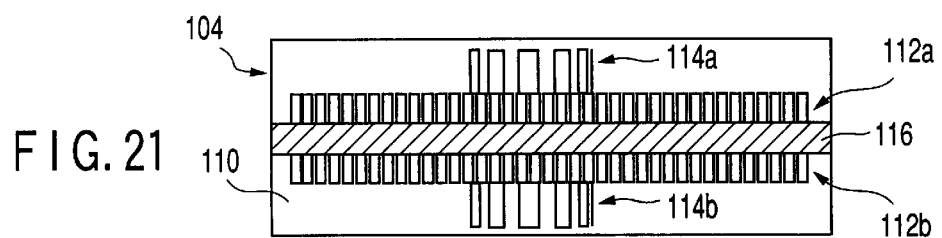
FIG. 21 is a diagram showing a constitution of the movable scale in a fourth modification example of the tenth embodiment.

A fourth modification example also relates to the improvement of the scale. As shown in FIG. 21, the scale 104 is also provided with: the strip-shaped low-reflection or non-reflection region 116 extending in the middle portion of the transparent substrate 110 in parallel with the moving direction of the scale 104; the pair of optical patterns 112a, 112b, positioned on opposite sides of the region, for detecting the movement; and further a pair of optical patterns 114a, 114b, positioned on opposite sides outside the movement detecting optical patterns, for detecting the reference position.

The optical patterns 112a, 112b extend substantially entirely in the scale 104 along the moving direction of the scale 104, and have a reflectance which changes along the moving direction of the scale 104 at the constant period.

Each of the optical patterns 114a, 114b exists only in a part of the region of the scale 104 with respect to the moving direction of the scale 104, and has a function of converging the light with respect to the moving direction of the scale 104.

Figure 22:
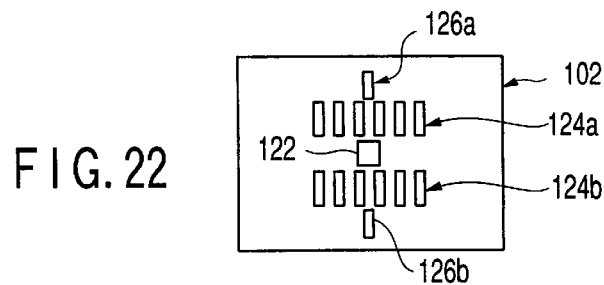
FIG. 22 is a diagram showing a constitution of the encoder head for use in accordance with the movable scale shown in FIG. 21.

Moreover, as shown in FIG. 22, for the scale 104, the encoder head 102 is provided with the pair of photodetectors 124a, 124b for detecting reflected lights from the respective optical patterns 112a, 112b, and a pair of photodetectors 126a, 126b for detecting the reflected lights from the respective optical patterns 114a, 114b.

Similarly as the photodetector 124 shown in FIG. 14, each of the photodetectors 124a, 124b is provided with a plurality of light receiving areas including the first to fourth light receiving area groups.

Moreover, similarly as the photodetector 126 shown in FIG. 13, each of the photodetectors 126a, 126b is provided with a single light receiving area.

In the present modification example, since the scale 104 is provided with the low-reflection or non-reflection region 116, the composite resonator is prevented from being formed between the light source and the scale and, as a result, the light beam emitted from the light source is stabilized.

Moreover, in the present modification example, since each of the optical patterns 112a, 112b for detecting the movement is preferably lit by a strong light, the pattern is irradiated with a relatively strong portion of the light beam. Since each of the optical patterns 114a, 114b for detecting the reference position does not especially have to be lit by the strong light, the pattern is irradiated with a relatively weak portion of the light beam. Therefore, high precision is compatible with high function.

Figure 23:
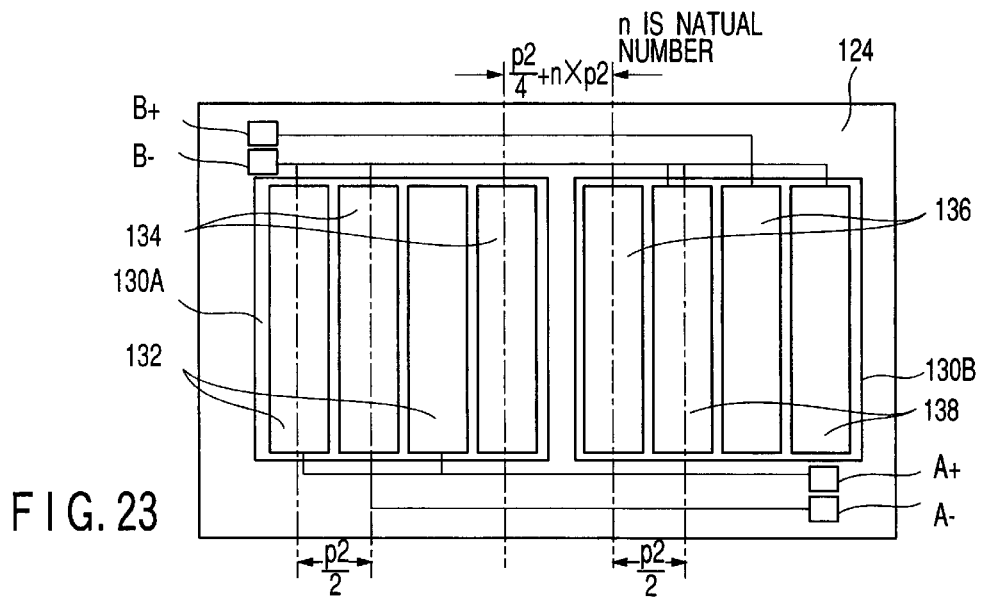
FIG. 23 is a diagram showing a constitution of the movement detecting photodetector in a fifth modification example of the tenth embodiment.

A fifth modification example relates to the photodetector. As shown in FIG. 23, the movement detecting photodetector 124 has a light receiving area group 130A including a first light receiving area group 132 and second light receiving area group 134, and a light receiving area group 130B including a third light receiving area group 136 and fourth light receiving area group 138.

The light receiving areas of the first and second light receiving area groups 132 and 134 are alternately arranged at a pitch of p2/2.

Similarly, the light receiving areas of the third and fourth light receiving area groups 136 and 138 are alternately arranged at the pitch of p2/2.

Two adjacent light receiving areas of the light receiving area groups 130A and 130B have an interval of p2/4+p2×n (n is a natural number).

Since the pitch of the adjacent light receiving areas is p2/2, the photodetector can easily be manufactured, as compared with the photodetector having the pitch of p2/4 as shown in FIG. 14

Moreover, since each light receiving area can be broad, a scale movement detection ratio S/N is enhanced.

Furthermore, for requirement of a very small pitch p2, it is expected in the photodetector shown in FIG. 14 that manufacture becomes difficult and cost considerably rises.

However, even for the same requirement, the photodetector shown in FIG. 23 can relatively easily be manufactured.

Figure 24:
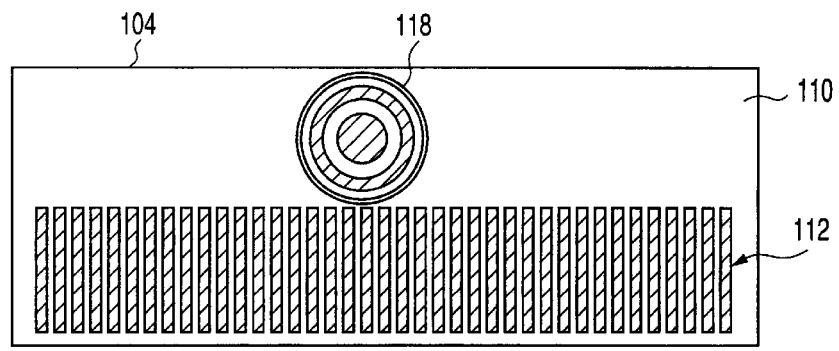
FIG. 24 is a diagram showing a constitution of the movable scale in a sixth modification example of the tenth embodiment.

A sixth modification example relates to the scale. As shown in FIG. 24, the scale 104 is provided with the movement detecting optical pattern 112 extending substantially entirely in the scale 104 along the moving direction of the scale 104, and a reference position detecting optical pattern 118 disposed in a part of the region with respect to the moving direction of the scale 104.

As described above, the optical pattern 112 has a reflectance which changes along the moving direction of the scale 104 at the constant period.

The optical pattern 118 has a function of reflecting an irradiation light and converging the light on one point, and is constituted, for example, of a holographic pattern or a hologram lens.

In the present modification example, the light beam reflected by the reference position detecting optical pattern 118 is converged on one point. Therefore, even when parallelism between the encoder head and the scale slightly drops, and when the scale is in the reference position, the photodetector for detecting the reference position is steadily irradiated with the light beam for detecting the reference position.

That is, when the scale is in the reference position, a small-diameter and substantially circular beam spot formed on the light receiving surface of the reference position detecting photodetector simply moves along a longitudinal direction on the elongated light receiving surface with the drop of parallelism between the encoder head and the scale. Therefore, the photodetector for detecting the reference position is constantly irradiated with a sufficient amount of light.

This moderates the parallelism required for the encoder head and scale, facilitates attachment and assembly of these components, or enlarges an application range of the components.

(Eleventh Embodiment)

Figure 25:
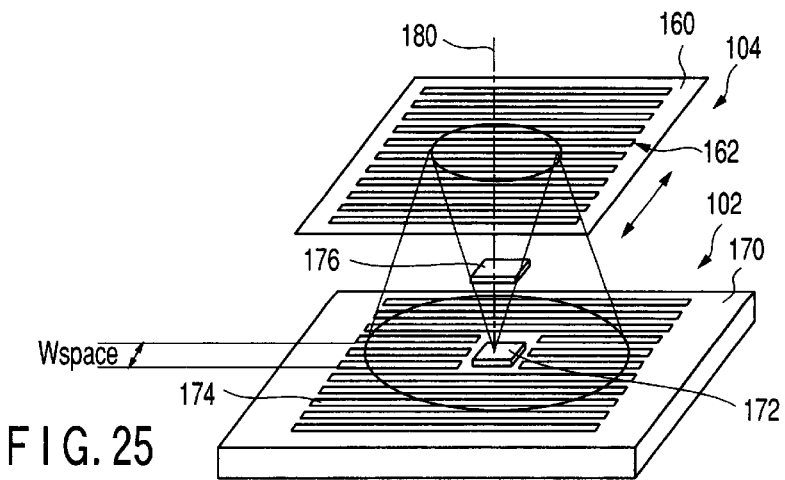
FIG. 25 is a perspective view showing a schematic constitution of an optical linear encoder according to an eleventh embodiment of the present invention.

As shown in FIG. 25, the optical linear encoder 100 of the eleventh embodiment is provided with the encoder head 102 including the optical system for detecting the movement, and the movable scale 104 which can move in parallel with the encoder head 102.

The movable scale 104 is provided with an optical pattern 162, formed on the surface of the optically transparent substrate, for example, the surface of a glass substrate 160, for detecting the movement of the scale 104.

The optical pattern 162 extends substantially entirely in the scale 104 along the moving direction of the scale 104, and has a reflectance which changes at the constant period along the moving direction of the scale 104.

The encoder head 102 is provided with a coherence light source 172 for radiating a coherence light, and the photodetection means for detecting the reflected light from the optical pattern 162 or a photodetector 174, and these are both held by a substrate 170.

The coherence light source 172 is, for example, a surface emitting laser, and is fixed to the substrate 170 by means such as adhesion.

The substrate 170 is, for example, a semiconductor substrate, and the photodetector 174 is formed in the semiconductor substrate 170.

The photodetector 174 has a plurality of light receiving areas which surround the surface emitting laser 172 and spread substantially over the whole surface of the substrate 170. The light receiving areas are arranged along the moving direction of the scale 104 at a constant pitch.

Additionally, a region in which the light receiving area around the light source is not formed preferably has a length of Wspace=p2×n (n=1, 2, 3, . . . ) along the moving direction of the scale.

As described above, the optical pattern 162 for detecting the movement is formed substantially on the whole surface of the scale 104. Moreover, the photodetector 174 for detecting the movement is also formed substantially on the whole surface of the encoder head 102, and detects the diffraction pattern formed by the scale 104 in a broad range. Therefore, the linear encoder 100 has a high resistance to attachment of rubbish and dust to the scale 104 and distortion and scratch of the optical pattern 162.

Furthermore, the linear encoder 100 includes a ¼ wavelength plate 176 for rotating a light beam deflection or polarization plane by 45 degrees on the main axis of the light beam emitted from the surface emitting laser 172.

The ¼ wavelength plate 176 may be disposed in any point on the main axis of the light beam emitted from the surface emitting laser 172.

For example, the ¼ wavelength plate 176 is attached to the emitting window of the surface emitting laser 172.

The light reentering the surface emitting laser 172, that is, the light emitted from the surface emitting laser 172, reflected by the optical pattern 162 of the scale 104 and returned to the surface emitting laser 172 is transmitted through the ¼ wavelength plate 176 twice. Therefore, the light has a deflection or polarization plane rotated by 90 degrees with respect to the deflection or polarization plane of the light which has just been emitted from the surface emitting laser 172.

Therefore, the reentering light does not interfere with the just emitted light, and the light emitted from the surface emitting laser 172 is not influenced.

Therefore, the surface emitting laser 172 emits a stable light beam.

The ¼ wavelength plate 176 may be disposed on the surface of the scale 104.

In this case, in the encoder in which no countermeasure against the returned light to the surface emitting laser 172 is made, the scale is replaced with a scale including the ¼ wavelength plate 176. In this case, while the encoder head is used as it is, the problem of the light returned to the surface emitting laser 172 can be solved.

(Twelfth Embodiment)

Figure 26:
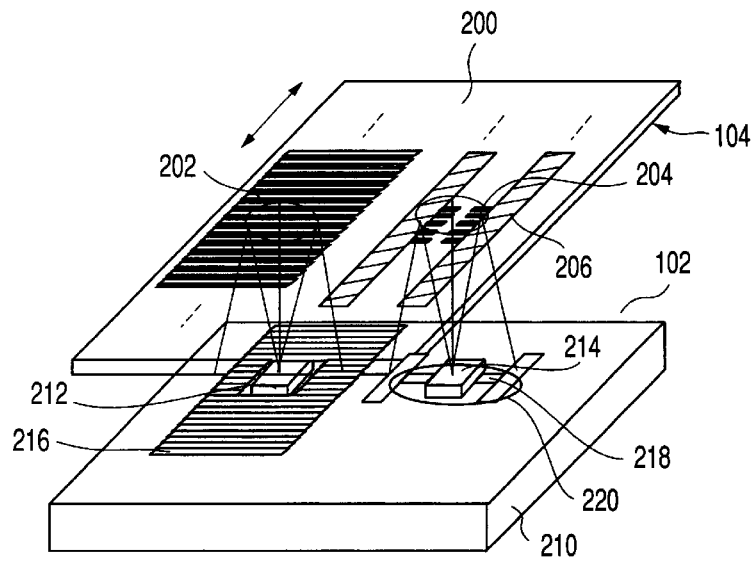
FIG. 26 is a perspective view showing a schematic constitution of the optical linear encoder according to a twelfth embodiment of the present invention.

As shown in FIG. 26, the optical linear encoder 100 of the twelfth embodiment is provided with the encoder head 102 including the optical system for detecting the movement, and the movable scale 104 which can move in parallel with the encoder head 102.

The movable scale 104 is provided with an optical pattern 202 for detecting the movement of the scale 104, a pair of optical patterns 204 for detecting the reference position of the scale 104, and a pair of optical patterns 206 for monitoring a light source output.

The pair of optical patterns 206 for monitoring the output are disposed on opposite sides outside the pair of optical patterns 204 for detecting the reference position.

The optical pattern 202 for detecting the movement extends along the moving direction of the scale 104, and has a reflectance which changes along the moving direction of the scale 104 at the constant period.

The optical pattern 204 for detecting the reference position exists in a part of the region with respect to the moving direction of the scale 104, and has a function of converging the light with respect to the moving direction of the scale 104.

The optical pattern 206 for monitoring the output has a high reflectance, and extends along the moving direction of the scale 104.

The encoder head 102 is provided with: a first light source 212 for irradiating the movement detecting optical pattern 202 with a coherence light beam; a second light source 214 for irradiating the reference position detecting optical pattern 204 and output monitoring optical pattern 206 with the light beams; photodetection means or a photodetector 216 for detecting the reflected light from the movement detecting optical pattern 202; a pair of photodetection means or photodetectors 218 for detecting the reflected light from the reference position detecting optical pattern 204; and a pair of photodetection means or photodetectors 220 for detecting the reflected light from the output monitoring optical pattern 206.

These elements are all held by a substrate 210.

The first and second light sources 212 and 214 are, for example, surface emitting lasers, and these are fixed to the substrate 210 by means such as adhesion.

The substrate 210 is, for example, a semiconductor substrate, and the photodetectors 216, 218, 220 are formed in the semiconductor substrate 210 through a semiconductor process.

The photodetector 216 for detecting the movement has a plurality of light receiving areas arranged along the moving direction of the scale 104 at a constant pitch. These light receiving areas surround the surface emitting laser 212 and spread.

Each of the pair of photodetectors 218 for detecting the reference position is provided with a single elongated light receiving area in a direction crossing at right angles to the moving direction of the scale 104. These pair of light receiving areas are disposed on opposite sides of the surface emitting laser 214 with respect to the direction crossing at right angles to the moving direction of the scale 104.

Each of the pair of photodetectors 220 for monitoring the output is provided with a single relatively large square light receiving area. These pair of light receiving areas are disposed on opposite sides outside the pair of reference position detecting photodetectors 218 with respect to the direction crossing at right angles to the moving direction of the scale 104.

The optical pattern 202 for detecting the movement of the scale 104 is irradiated with the light beam emitted from the surface emitting laser 212, and the photodetector 216 for detecting the movement is irradiated with the diffraction pattern formed by the optical pattern 202.

The diffraction pattern is formed by the whose predetermined region excluding the main axis of the light beam emitted from the surface emitting laser 212, and most of the pattern is detected by the photodetector 216 for detecting the movement. Therefore, the linear encoder 100 has a high resistance to the attachment of rubbish and dust to the scale 104 and the distortion and scratch of the optical pattern 202.

The optical pattern 206 for monitoring the output is always irradiated with a part of the light beam emitted from the surface emitting laser 212, and the optical pattern 204 for detecting the reference position of the scale 104 is irradiated with another part of the light beam when the scale 104 is in the reference position.

The photodetector 220 for monitoring the output is irradiated with the light reflected by the optical pattern 206 for monitoring the output, and the photodetector 220 outputs a signal reflecting an output of the surface emitting laser 214.

When the driving of the surface emitting laser 214 is controlled in response to the signal from the photodetector 220, the light beam emitted from the surface emitting laser 212 is stabilized.

Moreover, the light reflected by the optical pattern 204 for detecting the reference position when the scale 104 is in the reference position is constricted in size in the direction parallel to the moving direction of the scale 104. Then, the photodetector 218 for detecting the reference position is irradiated with the light, and it is detected in accordance with the output of the photodetector 218 that the scale 104 is in the reference position.

(Thirteenth Embodiment)

Figure 27:
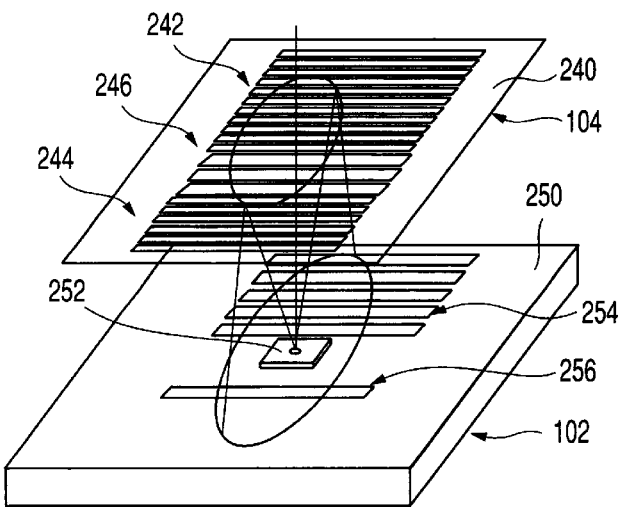
FIG. 27 is a perspective view showing a schematic constitution of the optical linear encoder according to a thirteenth embodiment of the present invention.

As shown in FIG. 27, the optical linear encoder 100 of the thirteenth embodiment is provided with the encoder head 102 including the optical system for detecting the movement, and the movable scale 104 which can move in parallel with the encoder head 102.

Figure 28:
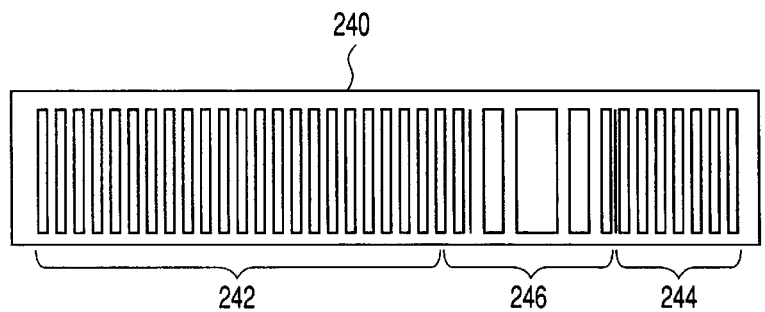
FIG. 28 is a plan view of the movable scale shown in FIG. 27.

As shown in FIG. 28, the movable scale 104 is provided with: an optical pattern 242 for detecting the movement of the scale; an optical pattern 244 having the same structure as that of the movement detecting optical pattern; and an optical pattern 246 for detecting the reference position, which are formed on the surface of an optically transparent substrate 240.

These optical patterns 242, 244, 246 are arranged along the moving direction of the scale 104, and the optical pattern 246 is positioned between the optical patterns 242 and 244.

The optical pattern 242 has a reflectance which changes along the moving direction of the scale 104 at the constant period p1.

The optical pattern 246 has a function of converging the light with respect to the moving direction of the scale 104, and is, for example, a holographic pattern of the cylindrical hologram lens or the like.

As shown in FIG. 27, the encoder head 102 is provided with a light source 252 for radiating a coherence light beam, photodetection means or a photodetector 254 for detecting the movement of the scale 104, and photodetection means or a photodetector 256 for detecting the reference position of the scale 104.

The light source 252 and photodetectors 254 and 256 are arranged along the moving direction of the scale 104, and the light source 252 is positioned between the photodetectors 254 and 256.

The coherence light source 252 is, for example, a single surface emitting laser, the photodetectors 254 and 256 are integrally formed in a semiconductor substrate 250, and the surface emitting laser 252 is fixed to the substrate 250 by means such as adhesion.

That is, the light source 252 and photodetectors 254 and 256 are disposed on the substrate 250 in the hybrid manner.

The photodetector 254 is provided with a plurality of elongated light receiving areas in a direction crossing at right angles to the moving direction of the scale 104. These light receiving areas are arranged at a constant pitch p2 about twice the period p1 of the optical pattern 242 along the moving direction of the scale 104.

Moreover, the photodetector 256 is provided with a single elongated light receiving area in a direction crossing at right angles to the moving direction of the scale 104.

The scale 104 is irradiated with the light beam emitted from the surface emitting laser 252, and the diffraction pattern formed by the optical pattern 242 for detecting the movement is projected onto the photodetector 254 for detecting the movement.

Moreover, when the scale 104 is in the reference position, the light beam reflected by the optical pattern 246 for detecting the reference position is constricted in size in the moving direction of the scale 104. Then, the photodetector 256 for detecting the reference position is irradiated with the light.

Additionally, the optical pattern 244 has the same structure as that of the optical pattern 242 for detecting the movement, and this pattern is utilized for detecting the movement after passing the optical pattern.

Similarly as the photodetector 124 shown in FIG. 14, the photodetector 254 for detecting the movement is provided with a plurality of light receiving areas including the first to fourth light receiving area groups.

Therefore, the A and B phase signals can be obtained based on the outputs of the respective light receiving area groups, and the movement of the scale 104 can be detected based on the signals.

In the present embodiment, the encoder head 102 has a hybrid constitution in which the single surface emitting laser 252 is attached to the semiconductor substrate 250 with the photodetectors 254 and 256 integrally formed therein, but the constitution of the encoder head 102 is not limited to this constitution.

Figure 29:
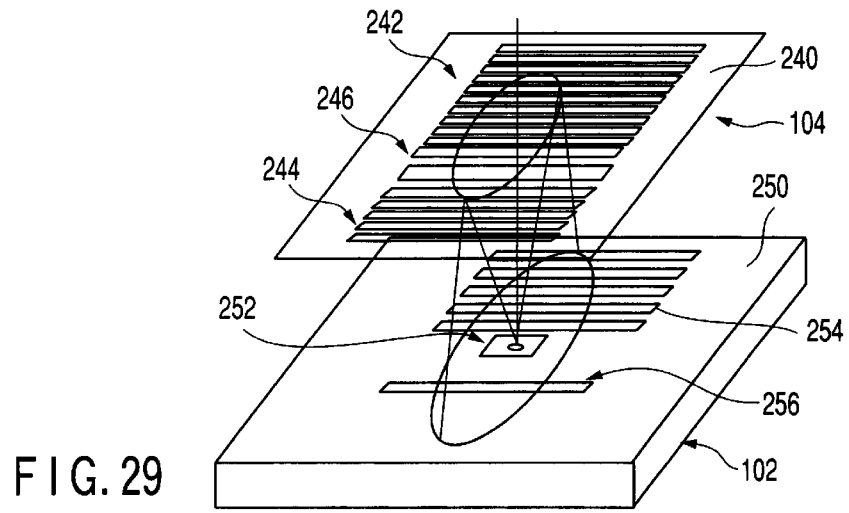
FIG. 29 is a diagram showing a modification example of the encoder head in the thirteenth embodiment.

For example, as shown in FIG. 29, the encoder head 102 may have a monolithic constitution in which the surface emitting laser 252 and photodetectors 254 and 256 are integrally integrated in the semiconductor substrate 250 through the semiconductor manufacturing process.

Figure 30:
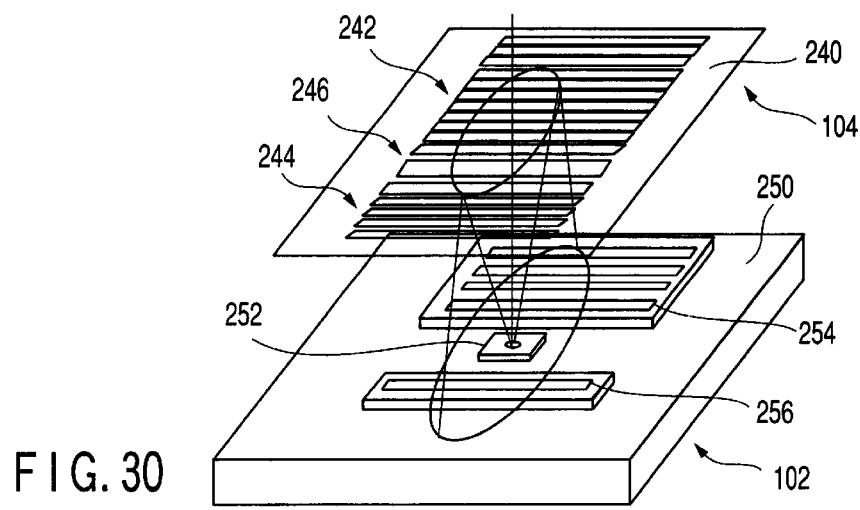
FIG. 30 is a diagram showing a modification example of the encoder head in the thirteenth embodiment.

Alternatively, as shown in FIG. 30, the encoder head 102 may have a hybrid constitution in which the single surface emitting laser 252, single photodetector 254 and single photodetector 256 are all attached to the substrate 250.

In the tenth to thirteenth embodiments described above, the optical pattern of the scale 104 may variously be modified.

Modification examples of the optical pattern of the scale 104 are shown in FIG. 31 to FIG. 34.

In application of the optical patterns of these modification examples, layout of the photodetection means of photodetectors of the encoder head 102 should of course be changed in accordance with the layout of the optical pattern.

Figure 31:
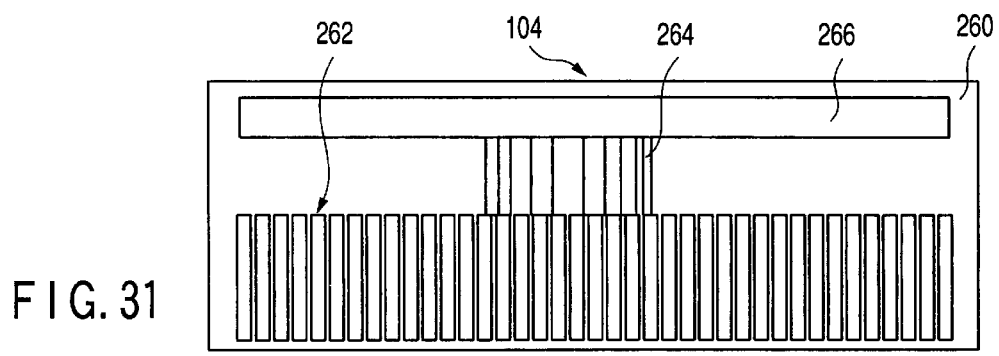
FIG. 31 is a diagram showing a constitution of the movable scale which can be applied to the tenth to thirteenth embodiments.
Figure 34:
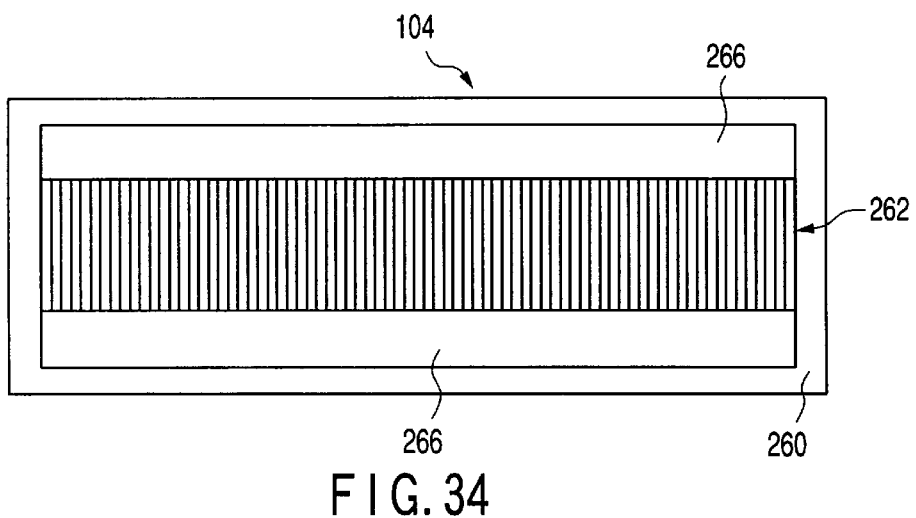
FIG. 34 is a diagram showing a constitution of further movable scale which can be applied to the tenth to thirteenth embodiments.

Moreover, in the application of the scale 104 shown in FIGS. 31 and 34, the encoder head 102 may be provided with the ¼ wavelength plate for preventing the light emitted from the light source from interfering with the light returned to the light source.

The scale 104 shown in FIG. 31 is provided with an optical pattern 262 for detecting the movement, optical pattern 264 for detecting the reference position and optical pattern 266 for monitoring the output, and these optical patterns are all formed in a transparent substrate 260.

The optical pattern 262 for detecting the movement extends along the moving direction of the scale 104, and has a reflectance which changes along the moving direction of the scale 104 at the constant period.

The optical pattern 264 for detecting the reference position exists in a part of the region with respect to the moving direction of the scale 104, and has a function of converging the light with respect to the moving direction of the scale 104.

The optical pattern 266 for monitoring the output has a constant high reflectance, and extends along the moving direction of the scale 104 in the strip shape.

The optical pattern 262 for detecting the movement spreads over substantially half of the surface of the scale 104, and the optical pattern 262 for detecting the movement, optical pattern 264 for detecting the reference position and optical pattern 266 for monitoring the output are arranged in the direction crossing at right angles to the moving direction of the scale 104.

Figure 32:
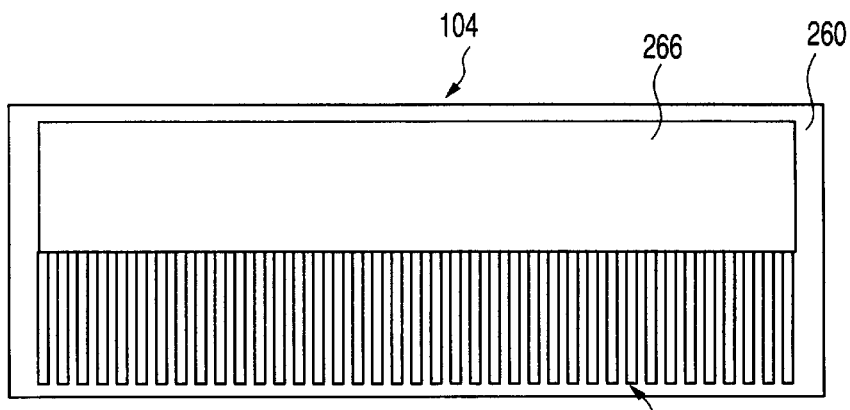
FIG. 32 is a diagram showing a constitution of another movable scale which can be applied to the tenth to thirteenth embodiments.

The scale 104 shown in FIG. 32 is provided with the optical pattern 262 for detecting the movement and optical pattern 266 for monitoring the output.

The optical pattern 262 for detecting the movement extends along the moving direction of the scale 104, and has a reflectance which changes along the moving direction of the scale 104 at the constant period.

The optical pattern 266 for monitoring the output has a constant high reflectance, and extends along the moving direction of the scale 104 in the strip shape.

The optical pattern 262 for detecting the movement spreads substantially over the half surface of the scale 104, and the optical pattern 266 for monitoring the output spreads substantially over the other half surface of the scale 104.

Figure 33:
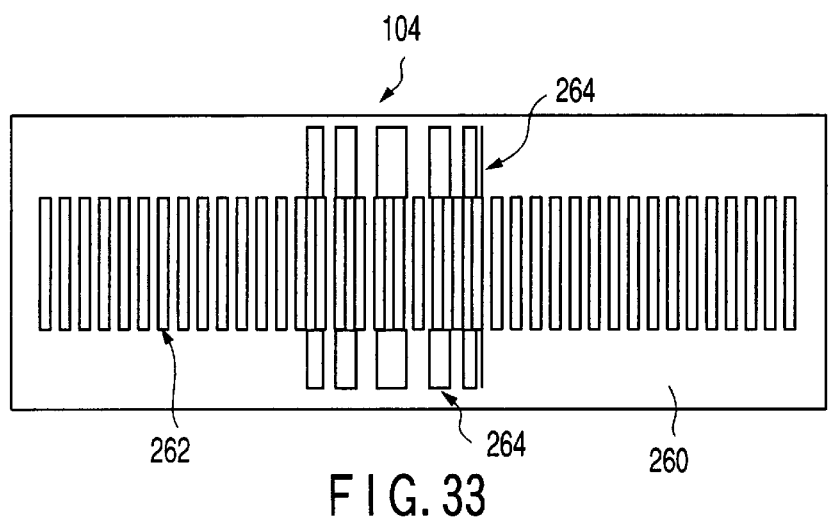
FIG. 33 is a diagram showing a constitution of another movable scale which can be applied to the tenth to thirteenth embodiments.

The scale 104 shown in FIG. 33 has the optical pattern 262 for detecting the movement, and a pair of optical patterns 264 for detecting the reference position.

The optical pattern 262 for detecting the movement extends along the moving direction of the scale 104, and has a reflectance which changes along the moving direction of the scale 104 at the constant period.

The optical pattern 264 for detecting the reference position exists in a part of the region with respect to the moving direction of the scale 104, and has a function of converging the light with respect to the moving direction of the scale 104.

Here, the optical pattern 262 for detecting the movement spreads in a middle portion of the scale 104, and the optical patterns for detecting the reference position are positioned on opposite sides of the scale 104.

The scale 104 shown in FIG. 34 is provided with the optical pattern 262 for detecting the movement and optical pattern 266 for monitoring the output.

The optical pattern 262 for detecting the movement extends along the moving direction of the scale 104, and has a reflectance which changes along the moving direction of the scale 104 at the constant period.

The optical pattern 266 for monitoring the output has a constant high reflectance, and extends along the moving direction of the scale 104 in the strip shape.

The optical pattern 262 for detecting the movement spreads in the middle portion of the scale 104.

Moreover, the optical patterns 266 for monitoring the output spread on opposite sides of the scale 104.

Moreover, the photodetector for detecting the movement may variously be modified.

Figure 35:
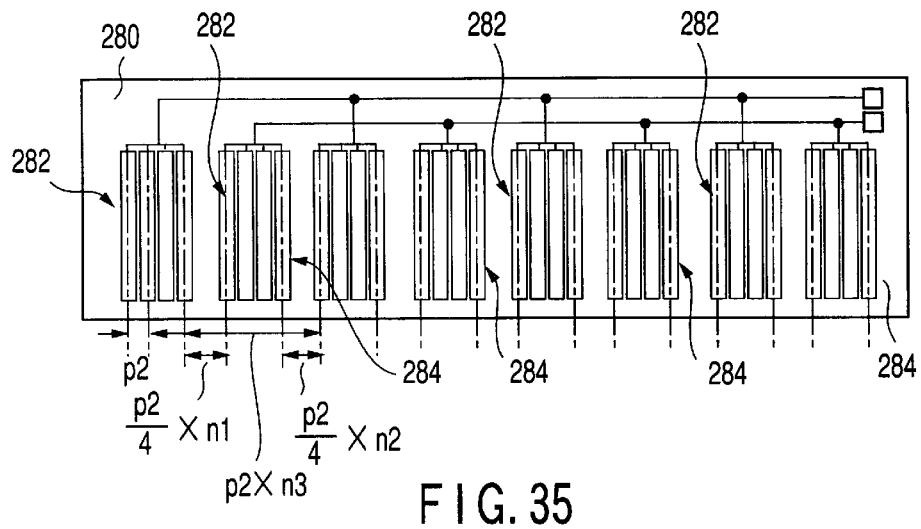
FIG. 35 is a diagram showing a constitution of the movement detecting photodetector which can be applied to the tenth to thirteenth embodiments.
Figure 36:
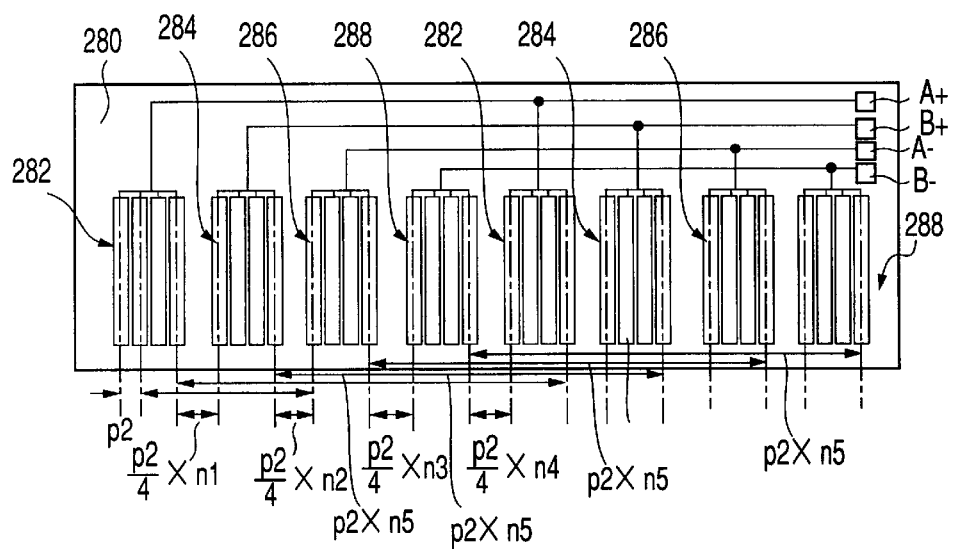
FIG. 36 is a diagram showing a constitution of another movement detecting photodetector which can be applied to the tenth to thirteenth embodiments.
Figure 37:
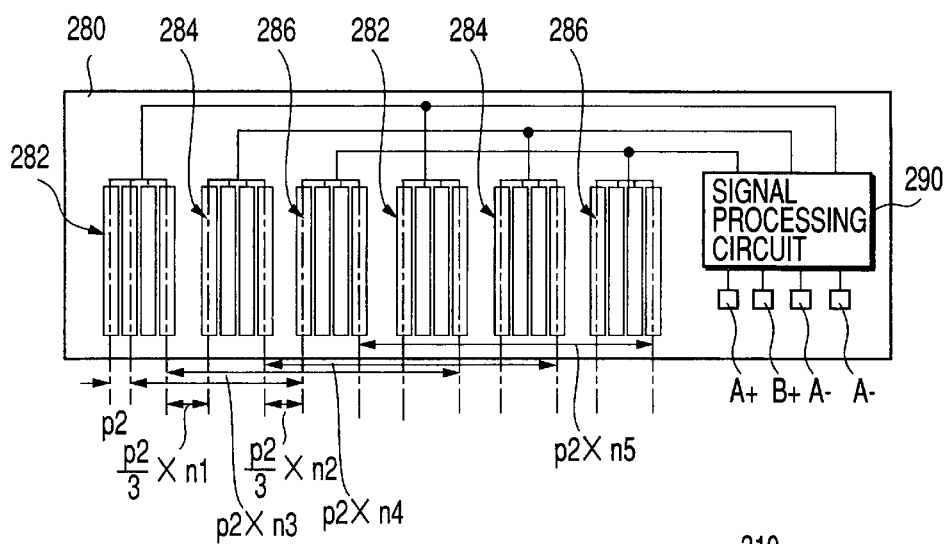
FIG. 37 is a diagram showing a constitution of another movement detecting photodetector which can be applied to the tenth to thirteenth embodiments.

Modification examples of the photodetector for detecting the movement are shown in FIG. 35 to FIG. 37.

A movement detecting photodetector 280 shown in FIG. 35 has two types of light receiving area groups, that is, a first light receiving area group 282 and second light receiving area group 284.

The first and second light receiving area groups 282 and 284 are alternately arranged along the moving direction of the scale.

Each of the first and second light receiving area groups 282 and 284 has four light receiving areas arranged at a constant pitch p2.

Two adjacent light receiving areas of the first and second light receiving area groups 282 and 284 have an interval of p2/4×n (n is a natural number).

The movement detecting photodetector 280 shown in FIG. 36 has four types of light receiving area groups, that is, the first light receiving area group 282, the second light receiving area group 284, a third light receiving area group 286, and a fourth light receiving area group 288.

The first, second, third, and fourth light receiving area groups 282, 284, 286, 288 are alternately arranged along the moving direction of the scale.

Each of the first, second, third, and fourth light receiving area groups 282, 284, 286, 288 has four light receiving areas arranged at the constant pitch p2.

Two adjacent light receiving areas of two adjacent light receiving area groups have an interval of p2/4×n (n is a natural number).

The movement detecting photodetector 280 shown in FIG. 37 has three types of light receiving area groups, that is, the first light receiving area group 282, second light receiving area group 284, and third light receiving area group 286, and a signal processing circuit 290 for producing four phase signals from the signals obtained by the three light receiving area groups.

The first, second, and third light receiving area groups 282, 284, 286 are alternately arranged along the moving direction of the scale.

Each of the first, second, and third light receiving area groups 282, 284, 286 has four light receiving areas arranged at the constant pitch p2.

Two adjacent light receiving areas of two adjacent light receiving area groups have an interval of p2/4×n (n is a natural number).

The aforementioned tenth to thirteenth embodiments relate to a reflective linear encoder, but the application of the present invention is not limited to this, and the present invention may be applied to a transmission type linear encoder.

(Fourteenth Embodiment)

A fourteenth embodiment provides a reflective optical rotary encoder. The embodiment will be described with reference to FIG. 38 to FIG. 42.

Figure 38:
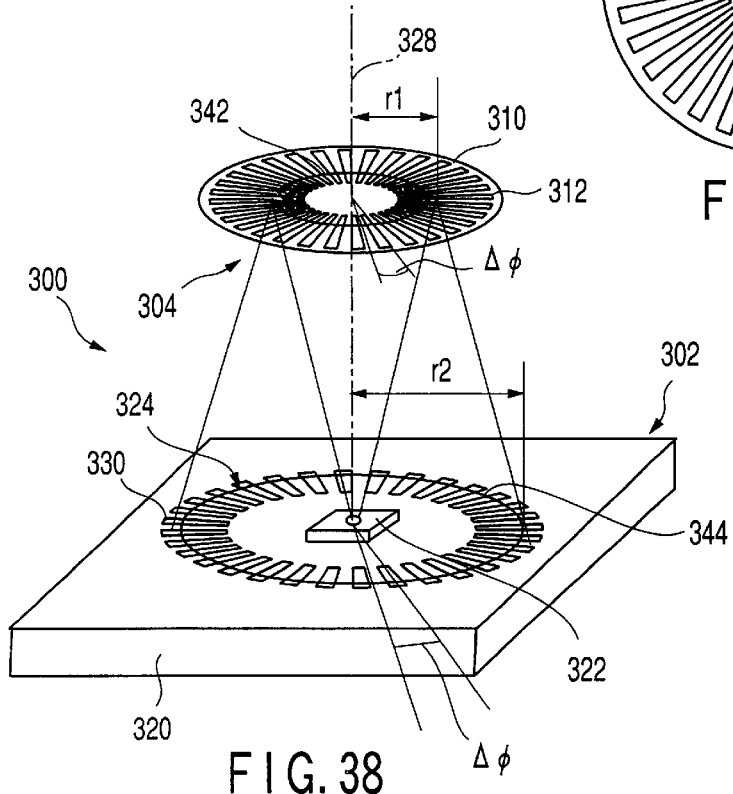
FIG. 38 is a perspective view showing a schematic constitution of the optical rotary encoder according to a fourteenth embodiment of the present invention.

As shown in FIG. 38, an optical rotary encoder 300 of the present embodiment includes an encoder head 302 including an optical system for detecting the movement, and a rotary scale 304 which can rotate or revolve with respect to the encoder head 302.

The rotary scale 304 is provided with an optical pattern for detecting rotation of the scale 304 or a diffraction lattice pattern 312 which is formed on the surface of a circular, optically transparent substrate 310.

Figure 39:
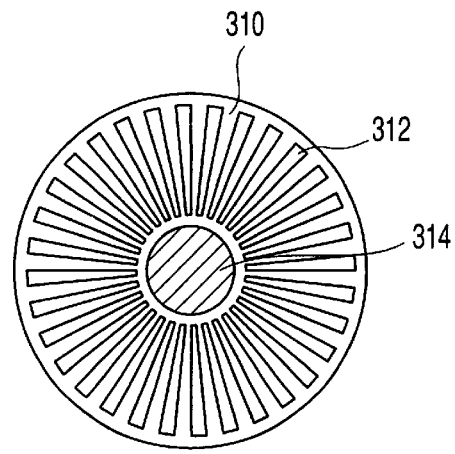
FIG. 39 is a plan view of the rotary scale shown in FIG. 38.

As shown in FIG. 39, the diffraction lattice pattern 312 has a large number of fan-shaped reflection portions arranged in a radial shape, and the reflection portions are arranged via fan-shaped gaps each having the same size as that of the portion.

In other words, the fan-shaped reflection and non-reflection portions having the same size are alternately arranged along a circumference, and a ratio of an area of the reflection portion to the area of the non-reflection portion is 1:1.

Moreover, as shown in FIG. 39, the rotary scale 304 is provided with a low-reflection region 314 in a center portion of the transparent substrate 310, that is, in the vicinity of a rotation center.

In other words, the scale 304 has the region 314 whose reflectance is low or substantially equal to 0 in a portion irradiated with a portion of the light beam emitted from the light source in the vicinity of the main axis of the beam.

The encoder head 302 is provided with a light source for radiating a coherence light, that is, a coherence light source 322, and photodetection means or a photodetector 324 for detecting the rotation of the scale.

The photodetector 324 is provided with a plurality of light receiving areas, in other words, light receiving elements such as photodiodes.

These light receiving areas 330 are arranged at a constant angle pitch on a circumference centering on the light source 322.

The coherence light source 322 is, for example, a single surface emitting laser, the photodetector 324 is integrally formed in a semiconductor substrate 320 through the semiconductor manufacturing process, and the light source is fixed to the substrate 320 by means such as adhesion.

That is, the light source 322 and photodetector 324 are disposed on the substrate 320 in the hybrid manner.

Since the surface emitting laser 322 is fixed to the flat substrate 320, the laser is easily attached.

The encoder head 302 and rotary scale 304 are arranged in parallel with each other at a constant interval in such a manner that the rotation axis of the rotary scale 304 substantially agrees with a main axis 328 of the light beam emitted from the encoder head 302.

Therefore, the surface of the scale 304 is substantially vertically irradiated with the light beam emitted from the surface emitting laser 322.

That is, the main axis 328 of the light beam emitted from the surface emitting laser 322 is substantially vertical to the rotary scale 304.

The constitution shown in FIG. 17 is preferably applied to the encoder head 302.

That is, the surface emitting laser 322 is a surface emitting laser for emitting lights via opposite surfaces. The encoder head 302 is further provided with a light receiving portion for detecting the light beam emitted from the lower surface of the surface emitting laser 322. The strength of the light beam emitted from the surface emitting laser is controlled by the processing circuit (not shown) in accordance with the output from the light receiving portion.

Moreover, a circumference 344 with a radius r2 in the surface of the encoder head 302 is irradiated with a light incident upon a circumference 342 with a radius r1 in the surface of the rotary scale 304.

Here, the radii r1 and r2 satisfy a relation of $r2=r1(z1+z2)/z1$, z1 denotes an interval between the surface emitting laser 322 and scale 304, and z2 denote an interval between the scale 304 and photodetector 324.

The light receiving area 330 on the encoder head 302 has a relatively long dimension in a radius direction substantially centering on the surface emitting laser 322.

Preferably, the light receiving area 330 of the photodetector 324 extends between $rmin(z1+z2)/z1$ and $rmax(z1+z2)/z1$ from the surface emitting laser 322 with respect to a distance rmin from the rotation center of the rotary scale 304 to an inner end of the diffraction lattice pattern 312 and a distance rmax to an outer end of the pattern.

The light receiving area 330 can detect an arbitrary light incident upon the diffraction lattice pattern 312.

The light receiving area 330 further preferably extends beyond the range. Even when z1 (=z2) extends, the area can detect the arbitrary light incident upon the diffraction lattice pattern 312.

The rotary scale 304 is vertically irradiated with the light beam emitted from the surface emitting laser 322 and having a predetermined spread.

A part of the vicinity of the main axis of the light beam lights the low-reflection region 314 formed in the vicinity of the center of the rotary scale 304, and a part outside the main axis lights the optical pattern 312 positioned outside the low-reflection region 314.

Since the light beam of the portion for lighting the low-reflection region 314 is absorbed by the region, the light hardly returns to the surface emitting laser 322.

As a result, this prevents occurrence of an undesirable phenomenon in which the light beam emitted from the surface emitting laser 322 is reflected by the surface of the rotary scale 304 and reenters the surface emitting laser 322 and the light source output property becomes unstable.

In other words, the so-called composite resonator is prevented from being formed between the surface emitting laser 322 and the scale 304.

As a result, the light beam emitted from the surface emitting laser 322 is stabilized.

As described above, since the diffraction lattice pattern 312 of the rotary scale 304 has a large number of fan-shaped reflection portions arranged in the radial shape as shown in FIG. 39, the pitch of the diffraction lattice pattern 312 differs in the radius direction of the rotary scale 304.

Since the number of reflection portions is the same as that of non-reflection portions on the circumference of the arbitrary radius on the diffraction lattice pattern 312, the pitch p1 of the diffraction lattice pattern continuously changes in the radius direction of the rotary scale 304.

Therefore, the light beam of the portion for lighting the optical pattern 312 is reflected/diffracted by the optical pattern 312, and the diffraction pattern formed by a range in which the pitch p1 substantially satisfies the aforementioned equation (1) is projected on the photodetector 324.

The diffraction pattern has interference fringes extending in the radial shape.

In other words, the diffraction pattern has a bright/dark pattern along the circumference.

The bright/dark pattern rotates with rotation of the rotary scale 304.

In FIG. 38, when the thickness of the surface emitting laser 322 is sufficiently smaller than an interval z1 between the surface emitting laser 322 and scale 304, and an interval z2 between the scale 304 and photodetector 324, z1=z2 can be approximated. From the aforementioned equation (2), $p2=2\times(p1)$ results. The bright/dark pattern projected on the light receiving surface of the encoder head 302 has the pitch p2 about twice the pitch p1 of the diffraction lattice pattern of the rotary scale 304.

Figure 40:
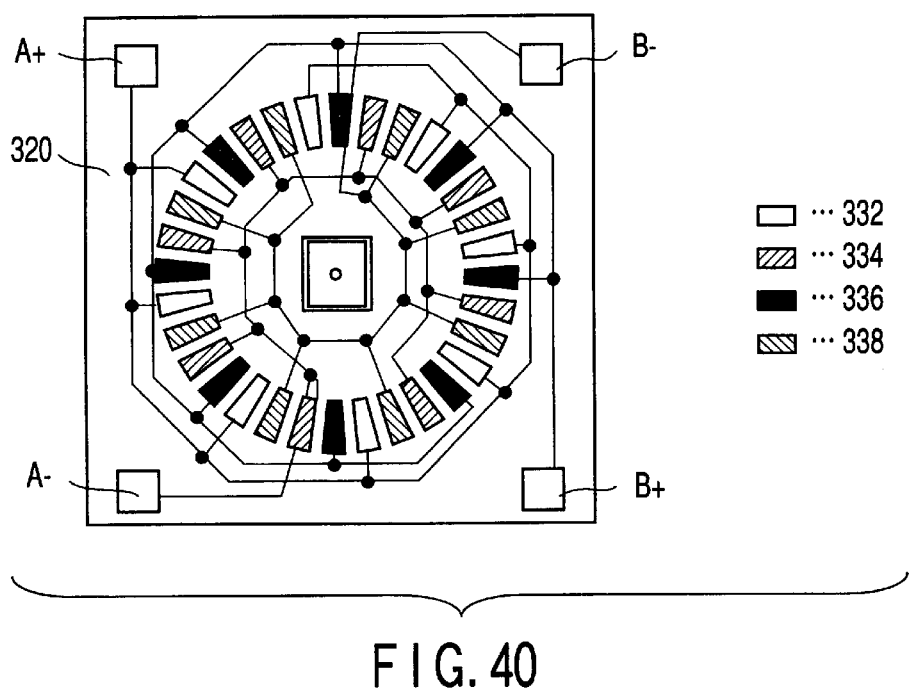
FIG. 40 is a plan view of the encoder head applied to the optical rotary encoder of FIG. 38.
Figure 41:
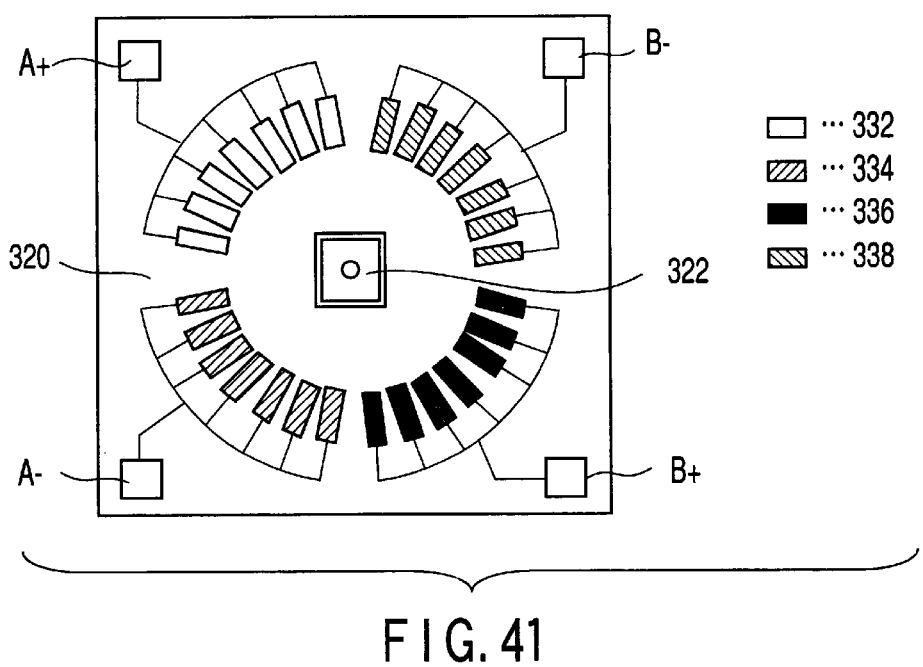
FIG. 41 is a plan view of another encoder head applied to the optical rotary encoder of FIG. 38.
Figure 42:
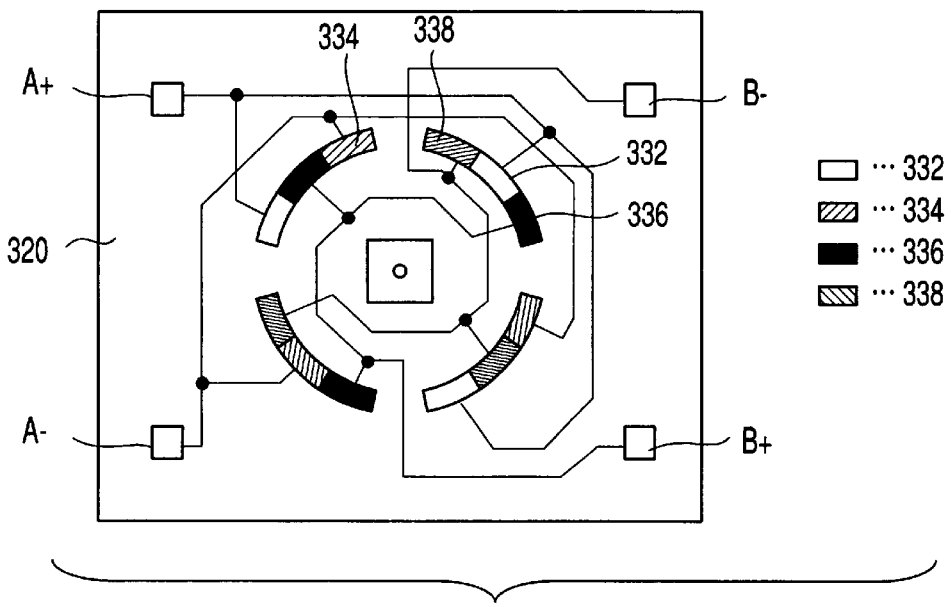
FIG. 42 is a plan view of another encoder head applied to the optical rotary encoder of FIG. 38.

Some examples of the encoder head 302 are shown in FIG. 40 to FIG. 42.

In any encoder head 302, the light receiving area 330 includes a first light receiving area group 332, second light receiving area group 334, third light receiving area group 336, and fourth light receiving area group 338. The light receiving areas of the same light receiving area group are electrically connected to one another.

The first light receiving area group 332 outputs an $A^+$ signal, the second light receiving area group 334 outputs an $A^-$ signal, the third light receiving area group 336 outputs a $B^+$ signal, and the fourth light receiving area group 338 outputs a $B^-$ signal.

These signals are processed by the signal processing circuit (not shown), the A phase signal is generated by subtraction of the $A^+$ signal and $A^-$ signal, and the B phase signal is generated by subtraction of the $B^+$ signal and $B^-$ signal.

Here, for example, similarly as the photodetector 324, the signal processing circuit may be formed in the semiconductor substrate 320.

Furthermore, a rotation amount and direction of the scale are precisely obtained based on the Lissajous's figure obtained from the A and B phase signals.

In the encoder head 302 shown in FIG. 40, the light receiving areas included in the first, second, third, and fourth light receiving area groups 332, 334, 336, 338 are arranged in order on the circumference.

According to the layout, any one of the A+, A−, B+, B− signals is detected over the whole circumference. Therefore, even when there is an external light, there are a defect, scratch, and the like in the diffraction lattice of the scale 304, or the reflectance or the like is non-uniform, a stable signal can be detected.

In the encoder head 302 shown in FIG. 41, the light receiving areas belonging to the same light receiving area group are disposed adjacent to each other.

According to the layout, the photodetector can be miniaturized, and electric wiring can be minimized.

Moreover, the size of the light receiving area can be set to be ideal, and a signal strength or the like can be set to be sufficient.

In the encoder head 302 shown in FIG. 42, the same light receiving area group is further divided into three small groups, and the respective small groups of the first to fourth light receiving area groups are arranged in order along the circumference.

That is, the small groups of the light receiving area group are arranged at an angle interval of about 120 degrees.

Moreover, according to the layout, influences of the defect and scratch of the diffraction lattice of the scale 304 and non-uniformity of the reflectance or the like can be minimized.

In the present embodiment, the photodetector detects four different phases of the diffraction pattern, but if necessary, only one phase, or two or three different phases may be detected, or more phases may be detected.

According to the present embodiment, there is provided a microminiature, high-performance rotary encoder which is not easily influenced by the scratch, dust, and the like, whose distance between the scale and the light source or the photodetector is easily adjusted, and which requires neither expensive assembly component nor special assembly process.

(Fifteenth Embodiment)

A fifteenth embodiment provides a reflective optical rotary encoder. The embodiment will be described with reference to FIG. 43.

The fifteenth embodiment is similar to the fourteenth embodiment. Members denoted with the same reference numerals indicate equivalent members, and detailed description thereof will be omitted hereinafter.

Figure 43:
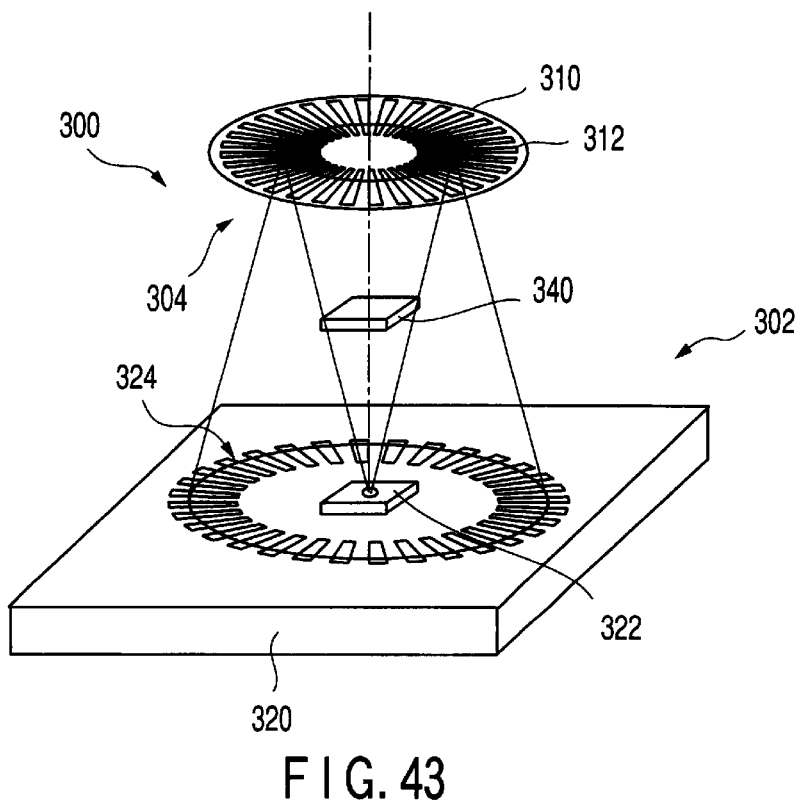
FIG. 43 is a perspective view showing a schematic constitution of the optical rotary encoder according to a fifteenth embodiment of the present invention.

As shown in FIG. 43, the optical rotary encoder 300 of the present embodiment includes the encoder head 302 including an optical system for detecting the movement, and the rotary scale 304 which can rotate or revolve with respect to the encoder head 302.

The rotary scale 304 is provided with an optical pattern for detecting the rotation of the scale 304 or the diffraction lattice pattern 312 which is formed on the surface of the circular, optically transparent substrate 310.

Different from the rotary scale of the fourteenth embodiment, the rotary scale 304 of the present embodiment is not provided with the low-reflection region 314 in the vicinity of the rotation center as shown in FIG. 39.

The encoder head 302 is provided with a light source for radiating the coherence light, that is, the coherence light source 322, and photodetection means or the photodetector 324 for detecting the rotation of the scale.

The photodetector 324 is provided with a plurality of light receiving areas 330 arranged at a constant angle pitch on the circumference centering on the light source 322.

For example, the coherence light source 322 is, for example, a single surface emitting laser for emitting the light via one surface, the photodetector 324 is integrally formed in the semiconductor substrate 320 through the semiconductor manufacturing process, and the light source is fixed to the substrate 320 by means such as adhesion.

The encoder head 302 and rotary scale 304 are arranged in parallel with each other at the constant interval in such a manner that the rotation axis of the rotary scale 304 substantially agrees with the main axis 328 of the light beam emitted from the encoder head 302.

The encoder head 302 is further provided with a ¼ wavelength plate 340 for rotating the deflection or polarization plane of the light beam by 45 degrees on the main axis of the light beam emitted from the surface emitting laser 322.

The ¼ wavelength plate 340 may be disposed in any point on the main axis of the light beam emitted from the surface emitting laser 322.

The ¼ wavelength plate 340 is attached, for example, to the emitting window of the surface emitting laser 322.

Since the reentering light to the surface emitting laser 322 is transmitted through the ¼ wavelength plate 340 twice, the light has a deflection or polarization plane rotated by 90 degrees with respect to the deflection or polarization plane of the light just emitted from the surface emitting laser 322.

Therefore, the reentering light does not interfere with the just emitted, and the light emitted from the surface emitting laser 322 is not influenced.

Therefore, the stable light beam is emitted from the surface emitting laser 322.

The ¼ wavelength plate 340 may be disposed on the surface of the scale 304.

In this case, in the encoder in which no countermeasure against the returned light to the surface emitting laser 322 is made, the scale is replaced with a scale including the ¼ wavelength plate 340. In this case, while the encoder head is used as it is, the problem of the light returned to the surface emitting laser can be solved.

According to the present embodiment, there is provided an optical rotary encoder including a stable light source which does not influence the size or performance of the encoder head and which is not influenced by the returned light.

(Sixteenth Embodiment)

FIG. 44A is a perspective view showing a constitution of an optical rotary encoder 400 according to a sixteenth embodiment.

In the encoder 400, a reflective scale 404 is irradiated with a laser beam emitted from a coherence light source, for example, a semiconductor laser 402, and a reflected light pattern is generated on the light receiving surface of a photodetector 406.

Here, the scale 404 is a disc-shaped rotary scale which rotates around a circle center 408 as a rotation axis to cross the light beam emitted from the light source, and in which a radial optical pattern 410 with a predetermined angle period is formed to be irradiated with the light beam.

Moreover, the photodetector 406 has a plurality of light receiving areas 412, disposed in the radial shape from the circle center 408, for receiving the light beam transmitted via the optical pattern 410 and detecting the bright/dark pattern generated by the optical pattern 410.

Additionally, the semiconductor laser 402 is also disposed in the circle center.

Moreover, the rotary scale 404 is irradiated with the laser beam emitted from the semiconductor laser 402 as a circular pattern 414, and the beam is reflected by the optical pattern 410 on the rotary scale 404 to form an image forming pattern 416 on the light receiving surface of the photodetector 406.

Figure 64A:
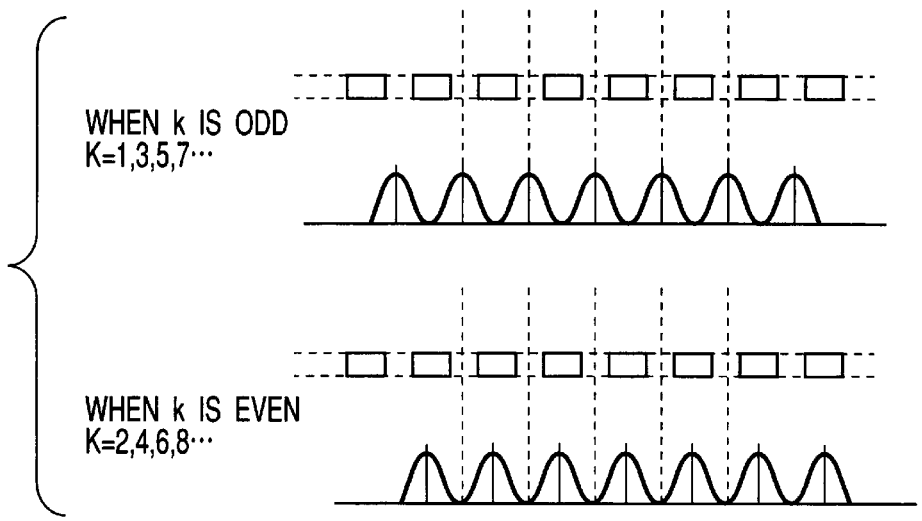
FIG. 64A is an explanatory view of reverse of light/shade of the image forming pattern.
Figure 64B:
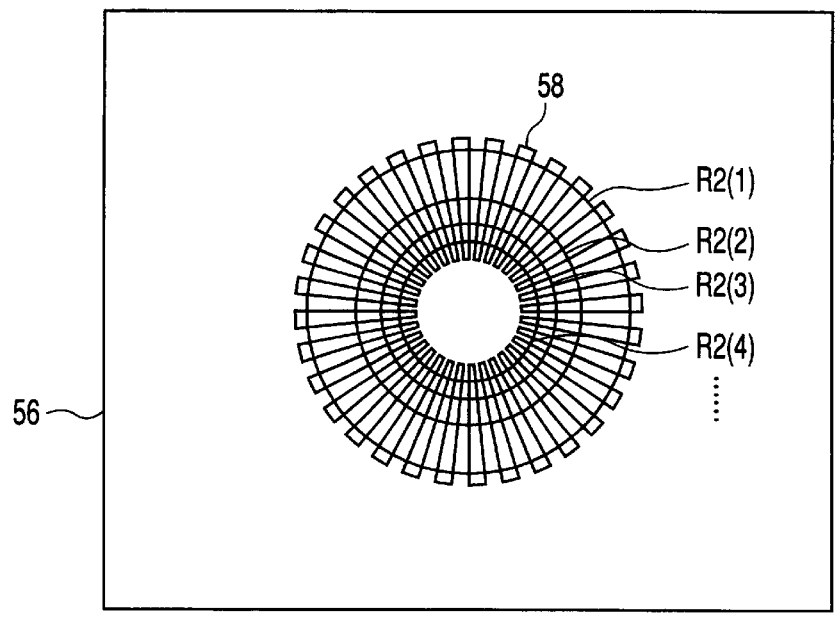
FIG. 64B is an explanatory view of the image forming pattern.

As shown in FIGS. 64A and 64B, in the image forming pattern 416, the light and shade are reversed when k denotes odd and even numbers.

That is, the scale pitch p1 of the plurality of optical patterns 414 of the rotary scales 404 continuously changes in a radius direction of the scales 404.

Therefore, when the parameters λ, z1, z2 have fixed values in the above equation (1) (usually, these have the fixed values when the encoder is prepared), and p1 changes, k denotes a natural number, and therefore n satisfying the above equation (1) exists in p1 at intervals.

In this case, when k denotes an odd number and even number, as shown in FIG. 64A, light and shade of an image forming pattern projected on the light receiving surface is reversed.

In the present sixteenth embodiment, as shown in FIG. 44B, a region 418 with a low or no light receiving sensitivity is disposed in the plurality of light receiving areas 412 of the photodetector 406 not to receive an image forming portion in which k denotes the even number.

That is, the effective light receiving sensitivity of the image forming portion with k of the even number is lowered or eliminated (additionally, conversely, the effective light receiving sensitivity of the image forming portion with k of the odd number may of course be lowered or eliminated so that the image forming portion with k of the odd number is prevented from being received).

That is, it is assumed that an interval between the semiconductor laser 402 and the rotary scale 404 is z1, an interval between the rotary scale 404 and the photodetector 406 is z2, the period of the optical pattern 410 on the arbitrary circumference of the rotary scale 404 is p1, the number of optical patterns for one rotation of the rotary scale is n, a wavelength of the semiconductor laser 402 is λ, and the period of the bright/dark pattern on the circumference on the light receiving area 412 corresponding to the period p1 of the optical pattern 410 is p2. In this case, when a position of the light receiving area 412 from the circle center 408 is R2, on the light receiving area 412 of the photodetector 406 in the optical rotary encoder 400, the bright/dark pattern is formed in a portion satisfying R2=(n×p2)/2π (here, p2=p1 (z1+z2)/z1). The effective light receiving sensitivity of the plurality of light receiving areas 412 in the vicinity of a portion in which a distance R2 from the circle center 408 satisfies the following equation and corresponds to a distance with k of the odd number (or the even number) is higher than that of other portions in this arrangement.

$$R2 = \frac{n \times \sqrt{\frac{\lambda z2}{k} \times \frac{z1+z2}{z1}}}{2\pi}$$

(k is a natural number)

Here, assuming that the distance of the light receiving area 412 from the circle center 408 is L1, the region 418 having low or no light receiving sensitivity is disposed in such a manner that the effective light receiving area of he photodetector 406 is positioned so as to satisfy the following, that is, R2(k+1)<L1<R2(k−1).

$$\frac{n \times \sqrt{\frac{\lambda z2}{(k-1)} \times \frac{z1+z2}{z1}}}{2\pi} > L1 > \frac{n \times \sqrt{\frac{\lambda z2}{(k+1)} \times \frac{z1+z2}{z1}}}{2\pi}$$

That is, a gap between adjacent images by k is used as the light receiving area, so that the length of the light receiving area 412 in the radius direction is shortened, and only the image by a specific k is received.

Moreover, as shown in FIG. 45A, for the light receiving area 412 of the photodetector 406, assuming that the distance of the light receiving area from the circle center 408 is L1, the region 418 having low or no light receiving sensitivity may be disposed in such a manner that the effective light receiving sensitivity of the range satisfying the following, that is, {R2(k−1)+R2(k)}/2>L1>{R2(k)+R2 (k+1)}/2 is higher than that of any other portion of the light receiving area.

$$\frac{n \times \sqrt{\frac{\lambda z2}{(k-1)} \times \frac{z1+z2}{z1}}}{2\pi} + \frac{n \times \sqrt{\frac{\lambda z2}{k} \times \frac{z1+z2}{z1}}}{2\pi} >$$

$$L1 > \frac{\frac{n \times \sqrt{\frac{\lambda z2}{k} \times \frac{z1+z2}{z1}}}{2\pi} + \frac{n \times \sqrt{\frac{\lambda z2}{(k+1)} \times \frac{z1+z2}{z1}}}{2\pi}}{2}$$

That is, a gap to a midpoint to the adjacent image forming portion by k is used as the light receiving area, so that the length of the light receiving area 412 in the radius direction is shortened, and only the image by the specific k is received.

Additionally, instead of arranging a plurality of light receiving areas 412 with k of the even (odd) number in a concentric shape, only one area may be disposed as shown in FIG. 45B.

Moreover, as shown in FIG. 46A, a light receiving area 420 for detecting the reference position is disposed in the region 418 having low or no effective light receiving sensitivity in the photodetector 406, and the reference position or the output of the semiconductor laser 402 may be detected by the light receiving area 420 for detecting the reference position.

Additionally, for light receiving sensitivity adjustment means for adjusting the effective sensitivity of the effective light receiving area of the photodetector 406, that is, a technique for forming the region 418 having low or no effective light receiving sensitivity in the photodetector 406, as shown in FIG. 46B, a shielding portion 422 of a metal is disposed. As shown in FIG. 47A, the light receiving area 412 is formed in the concentric shape, and various other techniques can be considered.

Moreover, the light receiving area 412 does not have to be disposed over the whole circumference, and as shown in FIG. 47B the area may be disposed on a part of the circumference.

(Seventeenth Embodiment)

In the sixteenth embodiment, the optical pattern 410 of the rotary scale 404 is used as it is, and the constitution of the light receiving area 412 of the photodetector 406 is changed. Conversely, in a seventeenth embodiment, while the light receiving area 412 of the photodetector 406 is used as it is, the constitution of the optical pattern 410 of the rotary scale 404 is changed.

That is, the rotary scale 404 is irradiated with the laser beam emitted from the semiconductor laser 402 as the circular pattern 414, the beam is reflected by the optical pattern 410 on the rotary scale 404, and the image forming pattern 416 is formed on the light receiving surface of the photodetector 406.

As described above with reference to FIG. 64B, the image forming pattern 416 is a pattern in which the light and shade are reversed with k of the odd and even numbers.

Figure 48A:
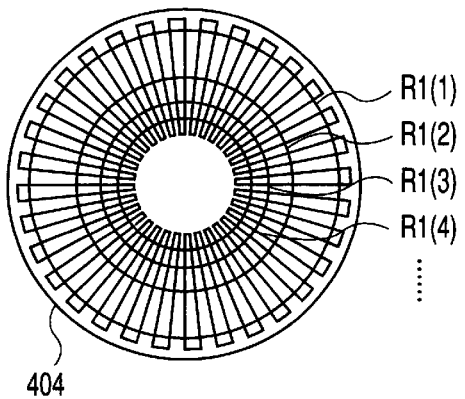
FIG. 48A is an explanatory view of a circular pattern on the rotary scale corresponding to an image forming pattern.

In this case, the position corresponding to k in the circular pattern 414 on the rotary scale 404 is as shown in FIG. 48A.

Figure 48B:
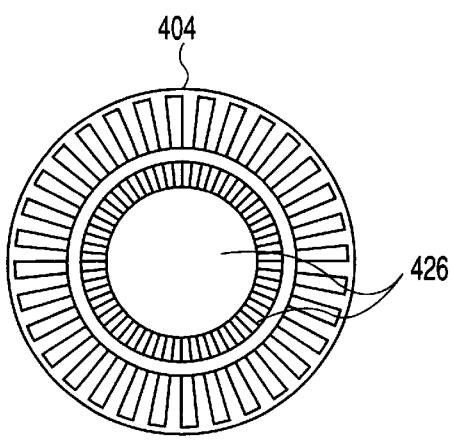
FIG. 48B is a plan view of the rotary scale of the optical rotary encoder according to a seventeenth embodiment of the present invention.

In the present embodiment, as shown in FIG. 48B, the optical pattern 410 is formed only in the corresponding portion of the rotary scale 404 not to receive the image forming portion in which k denotes the even number, in the plurality of light receiving areas 412 of the photodetector 406.

That is, the position corresponding to the image forming portion with k of the odd number is used as a portion 424 in which no optical pattern is formed.

Additionally, conversely, the optical pattern 410 is formed in the position corresponding to the image forming portion with k of the odd number. That is, the position corresponding to the image forming portion with k of the even number may of course be used as the portion 124 with no optical pattern formed therein.

Here, it is assumed that: the interval between the semiconductor laser 402 and the rotary scale 404 is z1;

the interval between the rotary scale 404 and the photodetector 406 is z2;

the period of the optical pattern 410 on the arbitrary circumference of the rotary scale 404 is p1;

the number of optical patterns for one rotation of the rotary scale is n;

the wavelength of the semiconductor laser 402 is X1 and the period of the bright/dark pattern on the circumference on the light receiving area corresponding to the period p1 of the optical pattern 410 is p2.

Moreover, when the position of the light receiving area 412 from the circle center 408 is R2, on the light receiving area 412 of the photodetector 406 in the optical rotary encoder 400, the bright/dark pattern is formed in the portion satisfying R2=(n×p1)/2π (here, p2=p1(z1+z2)/z1). The optical pattern 410 of the rotary scale 404 is disposed only in the vicinity of the portion in which the distance R1 from the scale circle center satisfies the following equation and corresponds to a distance with k of the even number (or the odd number). To achieve this, the portion 424 with no optical pattern formed therein is disposed.

$$R1 = \frac{n \times \sqrt{\frac{\lambda}{k} \times \frac{z1z2}{z1+z2}}}{2\pi}$$

(k is a natural number)

Figure 48C:
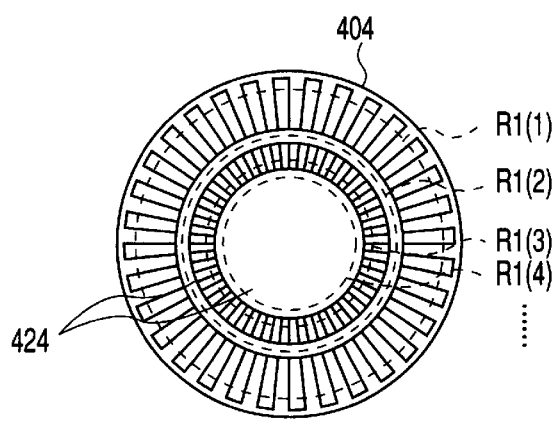
Figure 48D:
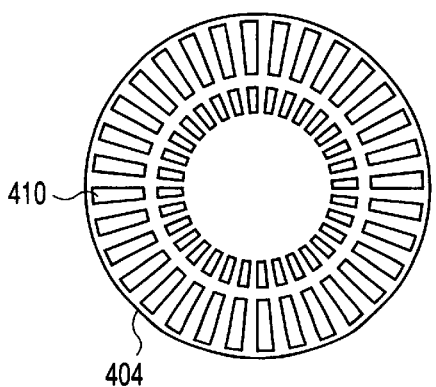
FIG. 48D is a plan view of the rotary scale in which the portion with no optical pattern formed therein is disposed by forming the optical pattern in the concentric shape.

Additionally, for the portion 424 with no optical pattern formed therein, as shown in FIG. 48C, a total-reflection pattern of a metal or a non-reflection patter 426 of a resin is disposed. As shown in 48D, the optical pattern 410 is formed in the concentric shape. Various other constitutions can be considered.

Figure 49A:
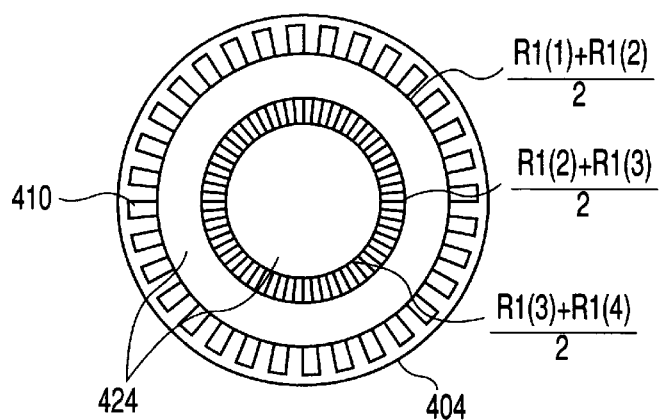
FIG. 49A is an explanatory view of a size of the portion with no optical pattern formed therein.

As shown in FIG. 49A, when the distance of the optical pattern 410 from the circle center 408 is L2, the portion 424 with no optical pattern formed therein is preferably disposed in a range satisfying the following.

$$\frac{R1(k-1) + R1(k)}{2} > L2 > \frac{R1(k) + R1(k+1)}{2}$$

Figure 49B:
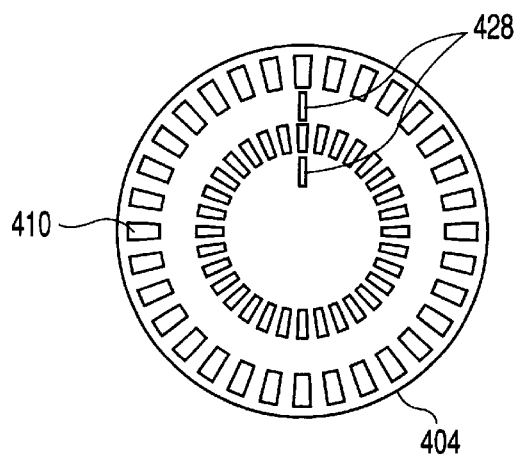
FIG. 49B is a plan view showing a modification example of the rotary scale.

Furthermore, as shown in FIG. 49B, an optical pattern 428 for detecting the reference position is disposed in the portion 424 used for detecting a movement amount and having no optical pattern 410 formed therein. The reference position may be detected by the optical pattern 428 for detecting the reference position.

Moreover, the output of the semiconductor laser 402 may be detected by the total-reflection pattern which is disposed instead of the reference position detecting optical pattern 428.

Figure 49C:
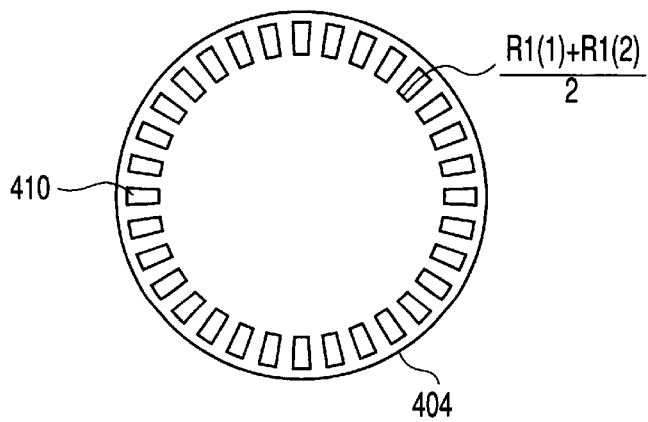
FIG. 49C is a plan view showing another modification example of the rotary scale.

Additionally, even in the rotary scale 404, it is unnecessary to arrange a plurality of optical patterns 410 in the concentric shape. As shown in FIG. 49C, one optical pattern may be disposed.

(Eighteenth Embodiment)

An eighteenth embodiment relates to electric wiring in the case in which the constitution of the light receiving area 412 of the photodetector 406 is changed as described in the sixteenth embodiment.

Figure 50A:
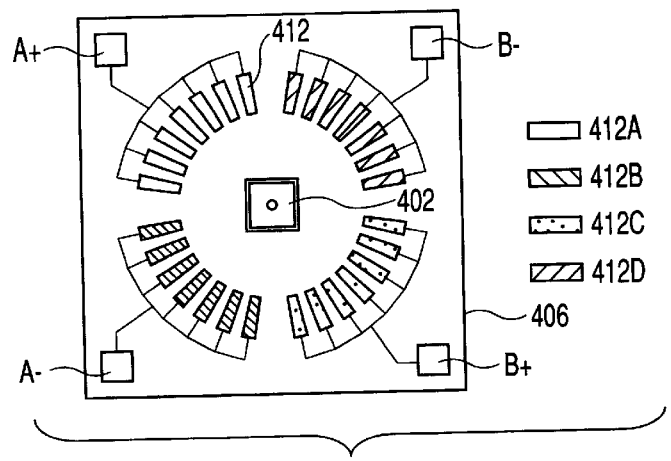
FIG. 50A is a plan view showing a constitution of the encoder head in the optical rotary encoder according to an eighteenth embodiment of the present invention.

That is, as shown in FIG. 50A, for example, the plurality of light receiving areas 412 for k=1 are divided into a plurality of light receiving area groups 412A, 412B, 412C, 412D.

Moreover, the light receiving areas of the same light receiving area group are electrically connected to one another. The first light receiving area group 412A outputs the $A^+$ signal, the second light receiving area group 412B outputs the $A^-$ signal, the third light receiving area group 412C outputs the $B^+$ signal, and the fourth light receiving area group 412D outputs the $B^-$ signal.

Here, the $A^-$ signal is a reverse signal of the $A^+$ signal, that is, the signal whose phase deviates by 180 degrees.

This also applies to a relation between the $B^-$ signal and the $B^+$ signal.

These signals are processed by the signal processing circuit (not shown), the A phase signal is generated by subtraction of the $A^+$ signal and $A^-$ signal, and the B phase signal is generated by subtraction of the $B^+$ signal and $B^-$ signal.

Moreover, the rotation amount and direction of the scale are precisely obtained based on the Lissajous's figure obtained from the A and B phase signals.

Figure 50B:
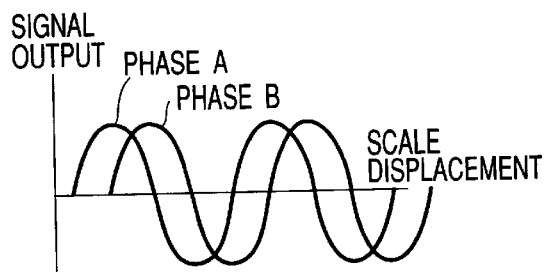
FIG. 50B is a diagram showing the A and B phase signals obtained by the photodetector.

That is, as shown in FIG. 50B, the A and B phase signals reflect the phase of the image forming pattern 416 in the specific position. The signals deviate from each other by ¼ of the period p of the image forming pattern 416, that is, by 90 degrees in the phase.

Figure 50C:
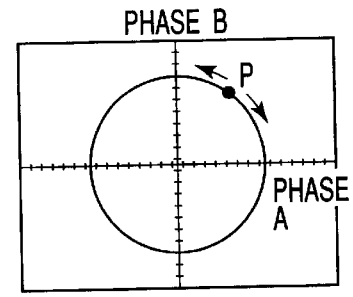
FIG. 50C is a diagram showing a Lissajous's figure obtained based on the A and B phase signals.

As shown in FIG. 50C, the Lissajous's figure is obtained from the A and B phase signals.

When the A and B phase signals approximate to sine waves, the Lissajous's figure becomes circular.

The point P of FIG. 50C indicates the relative position of the rotary scale 404 with respect to the photodetector 406 at a certain time, and moves on the circumference of the Lissajous's figure with the rotation of the rotary scale 404.

Furthermore, the speed and direction of movement of the point P depend on the speed and direction of rotation of the rotary scale 404.

Therefore, the rotation speed and direction of the rotary scale 404 can be detected based on the movement speed and direction of the point P on the Lissajous's figure.

As described above, when the respective light receiving area groups receive the pattern groups different in the bright/dark pattern, the rotation speed and direction of the rotary scale 404 can be detected.

Figure 50D:
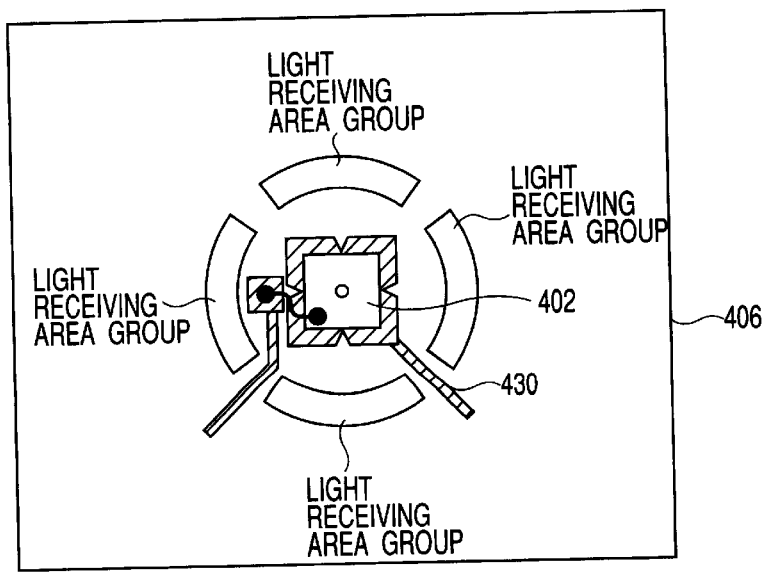
FIG. 50D is a diagram showing a constitution of electric wiring for a semiconductor laser.

Moreover, when the respective light receiving area groups are separated from one another as shown in FIG. 50A, as shown in FIG. 50D, an electric wiring 430 for the semiconductor laser 402 can be drawn.

In the constitution shown in FIG. 50A, since the light receiving areas belonging to the same light receiving area group are disposed adjacent to each other, the photodetector 406 can be miniaturized, and the electric wiring can be minimized.

Moreover, the size of the light receiving area can be ideal, and the signal strength or the like can be sufficient.

Additionally, in this case, four light receiving area groups are preferably constituted to have the same area. Moreover, the number of light receiving area groups is not limited to four, and the even number of groups may be disposed.

Figures 51A, 51B, 51C:
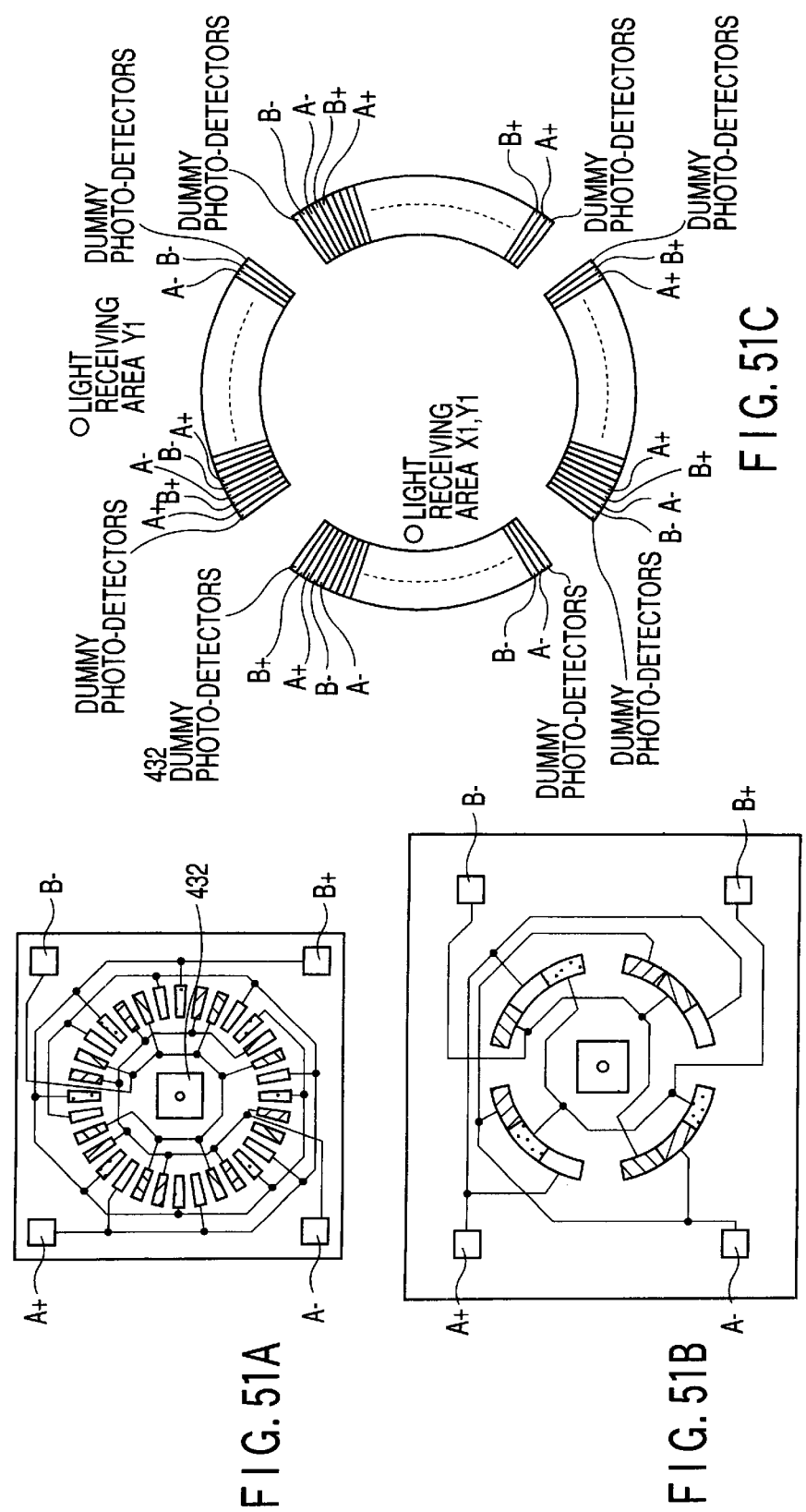
FIGS. 51A, 51B, 51C are plan views showing respective modification examples of the photodetector.

Furthermore, a constitution shown in FIG. 51A is also possible.

In this constitution, the light receiving areas included in the first, second, third, and fourth light receiving area groups 412A, 412B, 412C, 412D are arranged in order on the circumference.

According to the layout, any one of the A+, A−, B+, B− signals is detected over the whole circumference. Therefore, even when there is an external light, there are a defect, scratch, and the like in the optical pattern 410 of the rotary scale 404, or the reflectance or the like is non-uniform, the stable signal can be detected.

Moreover, also in this case, as shown in FIG. 51B, two, four, or another even number of (four in this example) areas X1, X2, Y1, Y2 are arranged, and the electric wiring 430 of the semiconductor laser 402 may be passed through the gap between the areas.

In this case, four areas may preferably be constituted to have the same area.

Furthermore, in each light receiving area disposed on each area end, a dummy photodetectors 432 with no electric wiring drawn therein is formed. Stable reading can be performed by not using the end.

Furthermore, the light receiving areas adjacent to the absorption dummies 432 on the ends receive different-phase light beams. Additionally, with an equal number of light receiving areas for receiving each phase, an output difference for each phase can be eliminated.

Moreover, as shown in FIG. 51C, the same light receiving area group is further divided into three small groups. The respective small groups of the first to fourth light receiving area groups may be constituted to be arranged in order along the circumference.

That is, the small groups of the light receiving area group are arranged at the angle interval of about 120 degrees.

According to the layout, the influences of the defect and scratch of the optical pattern 410 of the rotary scale 404 and non-uniformity of the reflectance or the like can be minimized without complicating the electric wiring.

(Nineteenth Embodiment)

In the sixteenth to eighteenth embodiments, the light receiving area or the optical pattern for k of the even or odd number is disposed. In a nineteenth embodiment, the light receiving area or the optical pattern for both the even and odd numbers is disposed.

Figure 52A:
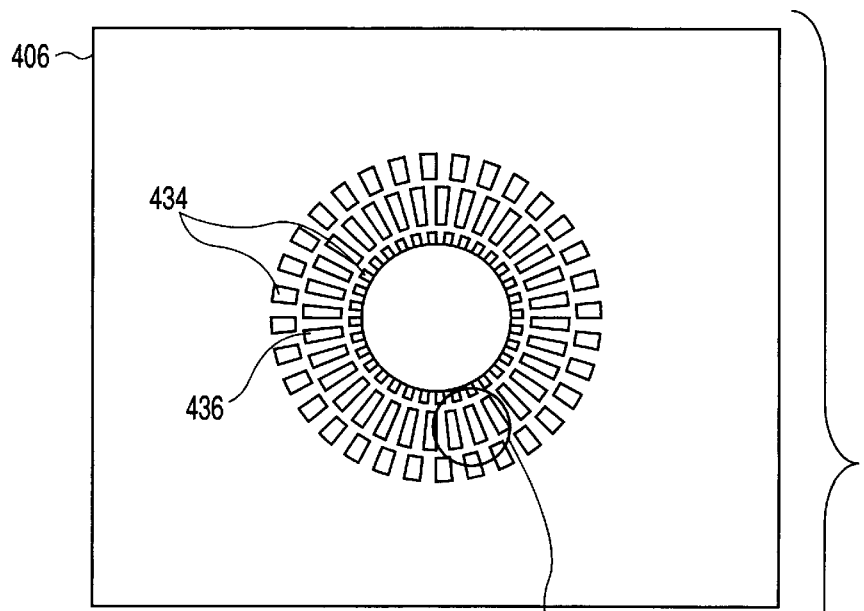
FIG. 52A is a plan view showing a constitution of the photodetector in the optical rotary encoder according to a nineteenth embodiment of the present invention.

That is, as shown in FIG. 52A, a light receiving area 434 disposed on the circumference for forming an image with k of the even number is disposed to deviate from a light receiving area 436 disposed on the circumference for forming the image with k of the odd number by 180 degrees in phase.

In this constitution, it is possible to more efficiently use a light amount.

Figure 52B:
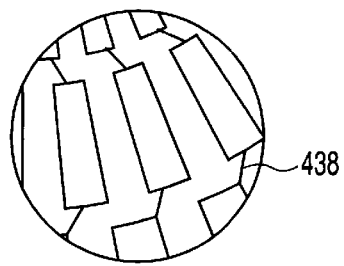
FIG. 52B is an explanatory view of an electric connection constitution of the light receiving area.

In this case, for electric connection, as shown in FIG. 52B, only bright portions are connected to one another via a wiring 438.

A connecting method is arbitrary in accordance with objects.

Moreover, when only the light receiving area on the same circumference is electrically connected, connection to another light receiving area on another circumference with a different radius (i.e., the light receiving area on the circumference with different k) may be performed in a later stage.

In this case, it is possible to change an amplification gain for improving a signal processing, that is, for improving an output difference by a received light amount difference.

Figure 52C:
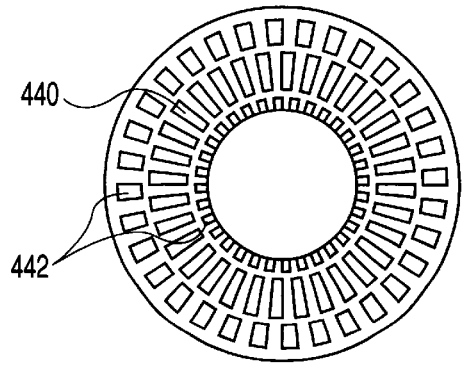
FIG. 52C is a plan view showing a constitution of the rotary scale in a modification example of the optical rotary encoder according to the nineteenth embodiment.

Alternatively, as shown in FIG. 52C, an optical pattern 440 corresponding to the circumference for forming the image with k of the even number is disposed to deviate from an optical pattern 442 corresponding to the circumference for forming the image with k of the odd number by 180 degrees in phase. Even in this case, an effect similar to that of FIG. 52A can be produced.

Additionally, in FIG. 52A and FIG. 52C, an example of a triple circle is shown, but a double circle, fourfold circle, and the like may be formed.

(Twentieth Embodiment)

Figure 53A:
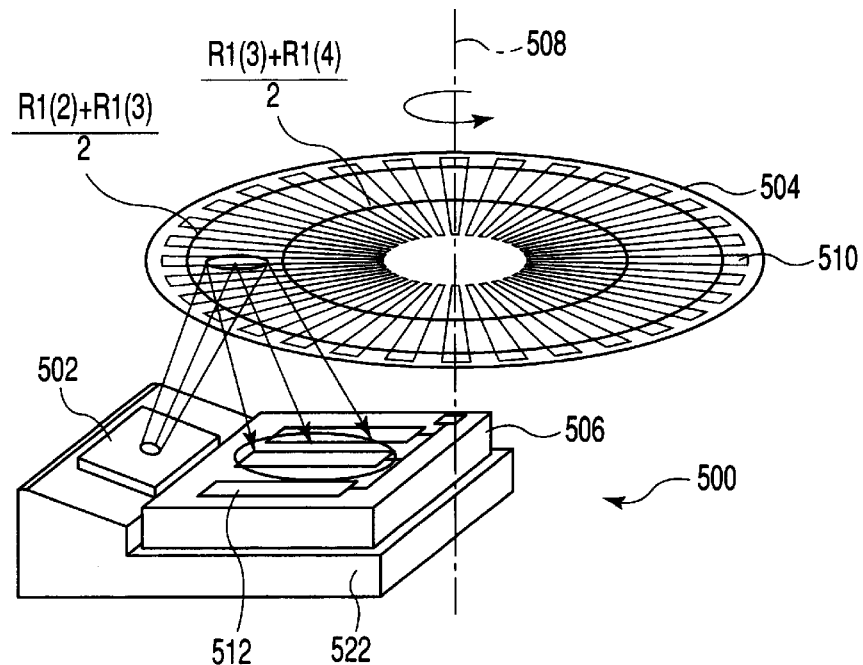
FIGS. 53A, 53B are perspective views showing respective examples of the optical rotary encoder according to the nineteenth embodiment of the present invention.
Figure 53B:
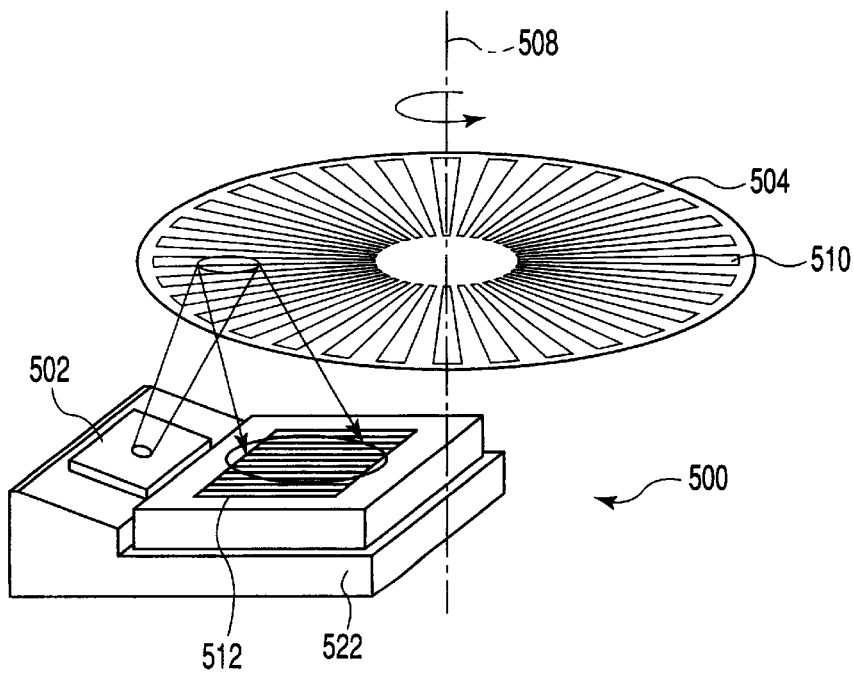

FIGS. 53A, 53B are diagrams showing an optical rotary encoder 500 according to a twentieth embodiment of the present invention.

That is, in the twentieth embodiment, for a bright/dark pattern generated by an optical pattern 510 of a rotary scale 504, a plurality of patterns are formed in such a manner that bright portions are formed every identical angles on circumferences having different distances from a circle center 508. The pattern is constituted of first and second bright/dark pattern groups in which the bright portions are formed at different angles in a circumferential direction. A light beam emitted from a semiconductor laser 502 is constituted to be incident only upon the vicinity of a portion either one of the first and second bright/dark pattern groups is formed.

Here, it is assumed that: the interval between the semiconductor laser 502 and the rotary scale 504 is z1;

the interval between the rotary scale 504 and the photodetector 506 is z2;

the period of the optical pattern 510 on the arbitrary circumference of the rotary scale 504 is p1;

the number of optical patterns for one rotation of the scale is n;

the wavelength of the semiconductor laser 502 is λ; and the period of the bright/dark pattern on the circumference on the light receiving area corresponding to the period p1 of the optical pattern 510 is p2.

Moreover, when the position of the light receiving area from the circle center is R2, on the light receiving area of the photodetector 506 in the optical rotary encoder 500, the bright/dark pattern is formed in the portion satisfying R2= (n×p2)/2π (here, p2=p1(z1+z2)/z1). In the constitution, the light beam emitted from the semiconductor laser 502 is incident only upon the vicinity of the portion in which the distance R2 from the circle center satisfies the following equation and corresponds to a distance with k of the even number (or the odd number).

$$R2 = \frac{n \times \sqrt{\frac{\lambda z2}{k} \times \frac{z1+z2}{z1}}}{2\pi}$$

(k is a natural number)

Additionally, in the example of FIGS. 53A, 53B, a light receiving area 512 of the photodetector 506 mounted on a sensor head 522 can be regarded as a part of the radial pattern having an infinitely far circle center, and the light receiving area is substantially rectangular.

Moreover, FIG. 53A shows a state in which the light receiving areas in a plurality of light receiving area groups are arranged apart from one another, and FIG. 53B shows that the areas are arranged with no gap therebetween.

Figure 54A:
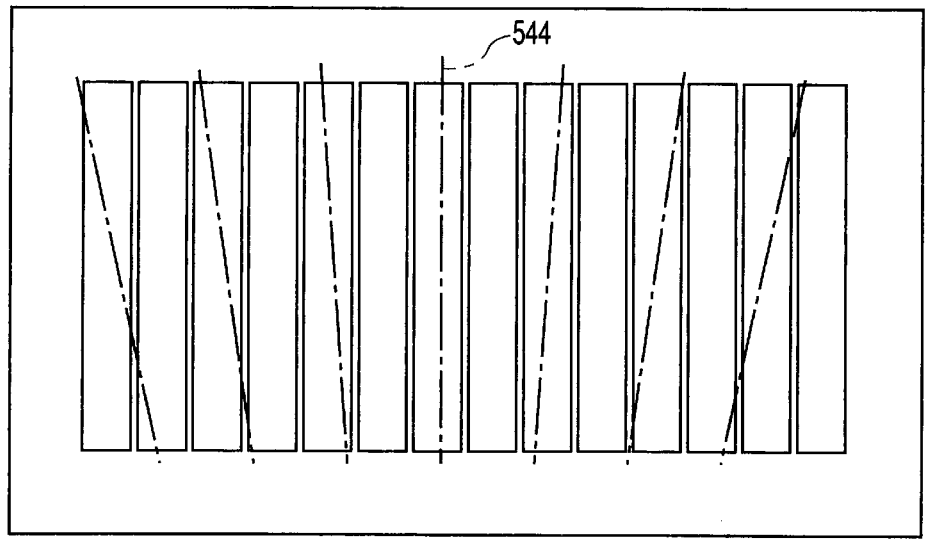
FIG. 54A is an explanatory view of a bright portion of an image projected on the light receiving surface of the light receiving area.

When the shape of the light receiving area is substantially rectangular in this manner, as shown in FIG. 54A, bright portions 544 of the image projected on the light receiving surface are formed at different angles in the circumferential direction.

Figure 54B:
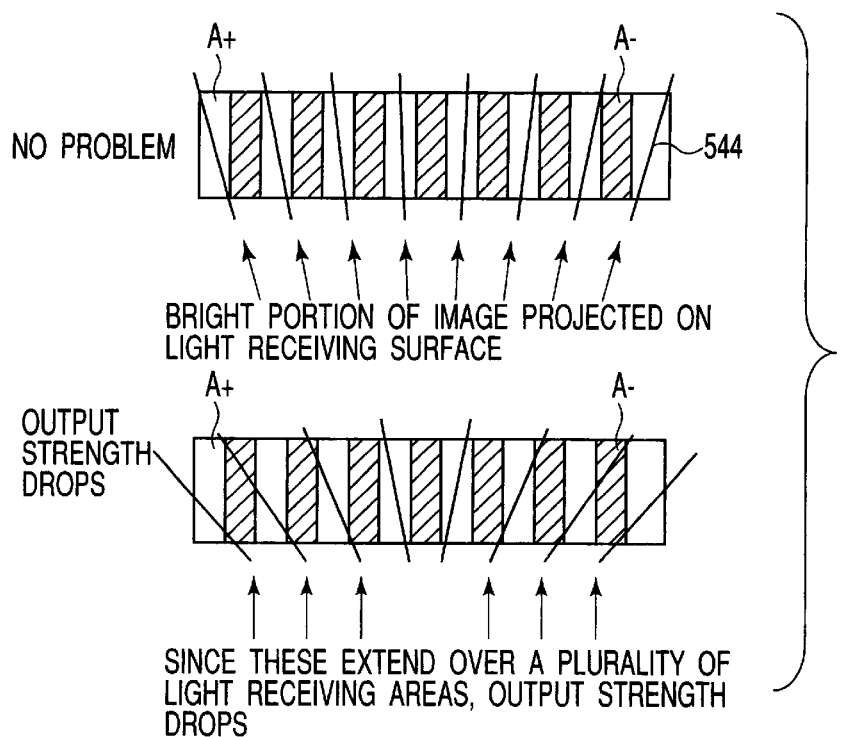
FIG. 54B is an explanatory view of presence/absence of a problem caused by a positional relation between the bright portion and the light receiving area.

In this case, as shown in FIG. 54B, when the bright portion (light intensity peak) 544 does not enter the adjacent light receiving area 512, no problem occurs. However, when the portion extends over a plurality of light receiving areas 512, an output strength disadvantageously drops.

Here, an inclination angle $\theta$ of the image projected by the rotary scale 504 in the light receiving area end is defined as follows.

That is, inclination angles of the image from a line parallel to the light receiving area are defined as $\theta 1$, $\theta 2$ as shown in FIG. 55A, and a larger inclination angle is set to $\theta$ as shown in FIG. 55B.

A fan-shaped spread angle depends on the spread angle of the portion of the optical pattern 510 of the rotary scale 504 irradiated with the light beam emitted from the semiconductor laser 502 (irrespective of a distance between the rotation axis (circle center 508) and the light receiving area).

Therefore, the inclination angle $\theta$ is determined by the portion of the rotary scale 504 from which the image is to be read.

When the size of the light receiving area is defined as shown in FIG. 55C, it is necessary to satisfy the following conditions.

That is, when the photodetector 506 has a light receiving area for receiving two different phases $A^+$ and $A^-$ in the pitch p2, the problem is solved by satisfying the following.

$$\tan \theta \leq (p2/2)/L \qquad (3)$$

Moreover, when the photodetector 506 has a light receiving area for receiving four different phases $A^+$, $A^-$, $B^+$, and $B^-$ in the pitch p2, the problem is solved by satisfying the following.

$$\tan \theta \leq (p2/4)/L \qquad (4)$$

Therefore, in general, when the photodetector 506 has a light receiving area for receiving m different phases in the pitch p2, the problem is solved by satisfying the following.

$$\tan \theta \leq (p2/m)/L \qquad (5)$$

Therefore, the problem is solved by employing a total width W of the light receiving areas in a range which satisfies the above equations.

Figure 56A:
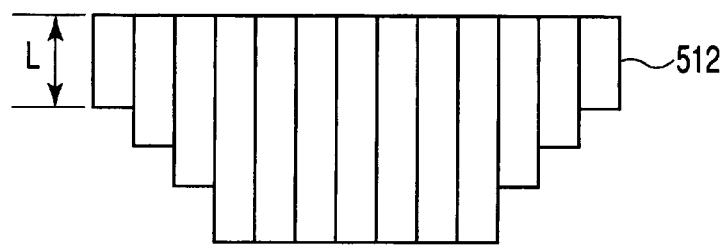
FIGS. 56A, 56B, 56C are diagrams showing respective modification examples of the light receiving area.
Figure 56B:
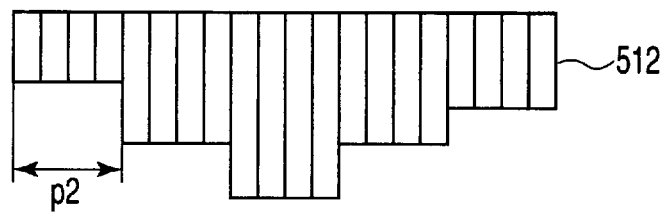
Figure 56C:
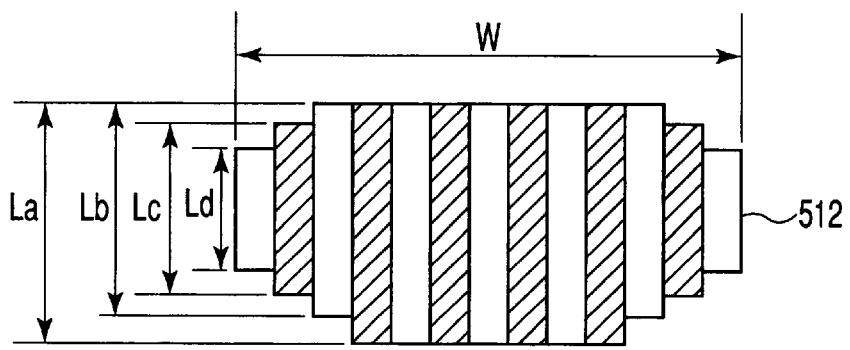

Additionally, for lengths L of the plurality of light receiving areas, as shown in FIGS. 56A, 56B, 56C, the length of the light receiving area 512 in each of opposite ends of the photodetector 506 may be shorter than the length of the light receiving area 512 of a middle portion.

When the length L of the effective light receiving portion of the light receiving area of the photodetector 506 differs with each light receiving area group, $\theta$ is calculated for each of individual light receiving areas, and a largest value needs to be employed as the inclination angle $\theta$.

Additionally, the case in which the photodetector 506 has the light receiving area for receiving four different phases $A^+$, $A^-$, $B^+$, $B^-$ in the pitch p2 means a case in which the plurality of light receiving areas 512 are electrically connected to form four sets for receiving four pattern groups (four different phases $A^+$, $A^-$, $B^+$, $B^-$) of the bright/dark pattern.

Figure 57A:
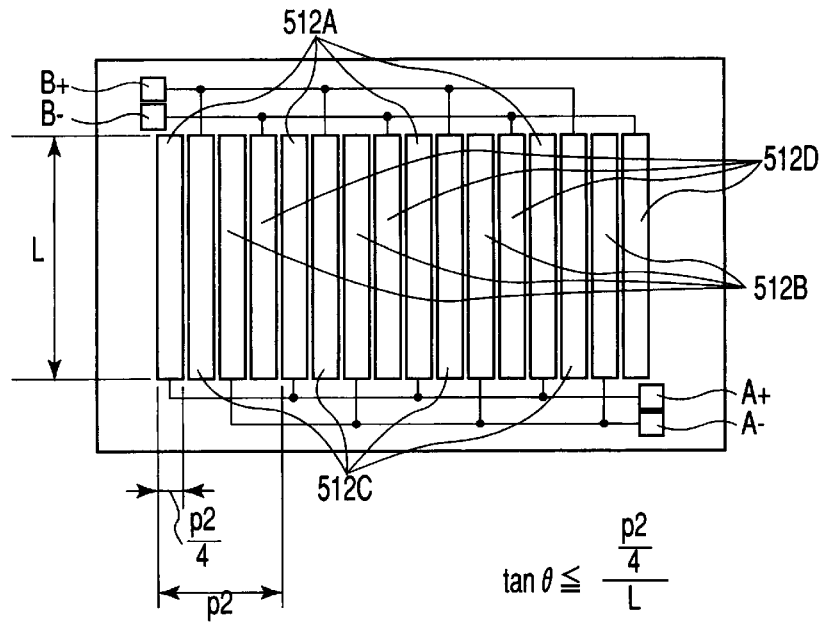
FIGS. 57A, 57B are diagrams showing respective modification examples of the light receiving area.

This is, for example, a constitution shown in FIG. 57A.

That is, the plurality of light receiving areas 512 include a first light receiving area group 512A, second light receiving area group 512B, third light receiving area group 512C, and fourth light receiving area group 512D.

The light receiving areas belonging to the same light receiving area group are arranged at the pitch p2. Therefore, two adjacent light receiving areas are arranged at the pitch p2/4.

The light receiving areas of the light receiving area group are arranged like comb teeth, and are disposed to mesh with the light receiving areas of the other light receiving area group.

Moreover, the light receiving areas of the same light receiving area group are electrically connected to one another. The first light receiving area group 512A outputs the $A^+$ signal, the second light receiving area group 512B outputs the $A^-$ signal, the third light receiving area group 512C outputs the $B^+$ signal, and the fourth light receiving area group 512D outputs the $B^-$ signal.

Figure 57B:
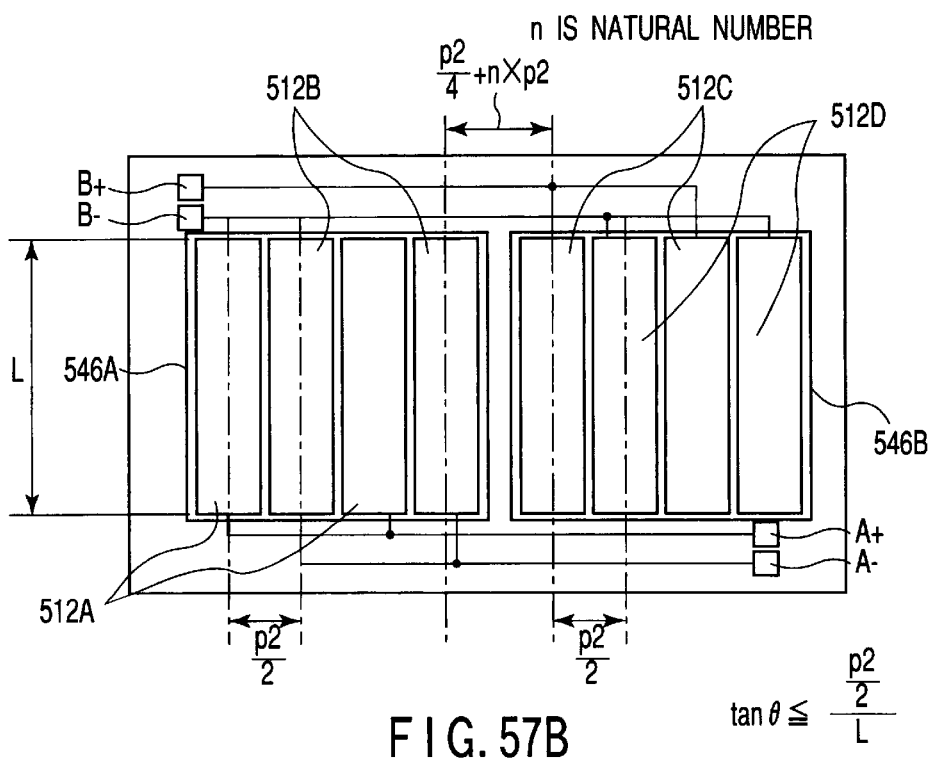

Moreover, as shown in FIG. 57B, the light receiving areas may be constituted to form two sets each of which receives two pattern groups among four pattern groups.

That is, the photodetector 506 has a first group 546A including the first and second light receiving area groups 512A and 512B, and a second group 546B including third and fourth light receiving area groups 512C and 512D.

The light receiving area of the first light receiving area group 512A and the light receiving area of the second light receiving area group 512B are alternately arranged at a pitch p2/2.

Similarly, the light receiving area of the third light receiving area group 512C and the light receiving area of the fourth light receiving area group 512D are alternately arranged at the pitch p2/2.

Two adjacent light receiving areas of the first and second groups 546A and 546B have an interval of $(p2/4)+p2\times n$ (n is a natural number).

The photodetector constituted as described above needs to satisfy the above equation (3).

Since the pitch of the adjacent light receiving areas is p2/2, the photodetector can easily be manufactured as compared with the photodetector with the pitch of p2/4 shown in FIG. 57A.

Moreover, since each light receiving area can be broad, a rotation detection ratio S/N of the rotary scale 504 is enhanced.

Furthermore, for the requirement of very small pitch p2, it is expected in the photodetector shown in FIG. 57A that manufacture becomes difficult and cost considerably rises. However, even for the same requirement, the photodetector shown in FIG. 57B can relatively easily be manufactured.

Figure 58A:
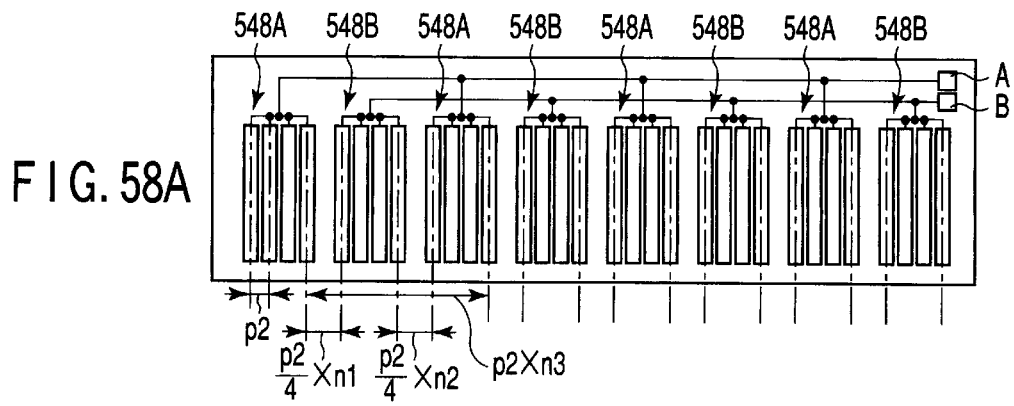
FIGS. 58A, 58B, 58C are diagrams showing respective modification examples of the light receiving area.

Moreover, the photodetector may be constituted as shown in FIG. 58A.

That is, the photodetector is provided with two light receiving area groups, that is, first and second groups 548A and 548B.

The first and second groups 548A and 548B are alternately arranged.

Each of the first and second groups 548A and 548B has four light receiving areas 512 arranged at a constant pitch p2.

Two adjacent groups of the first and second groups 548A and 548B have an interval of $(p2/4)\times n$ (n is a natural number).

Figure 58B:
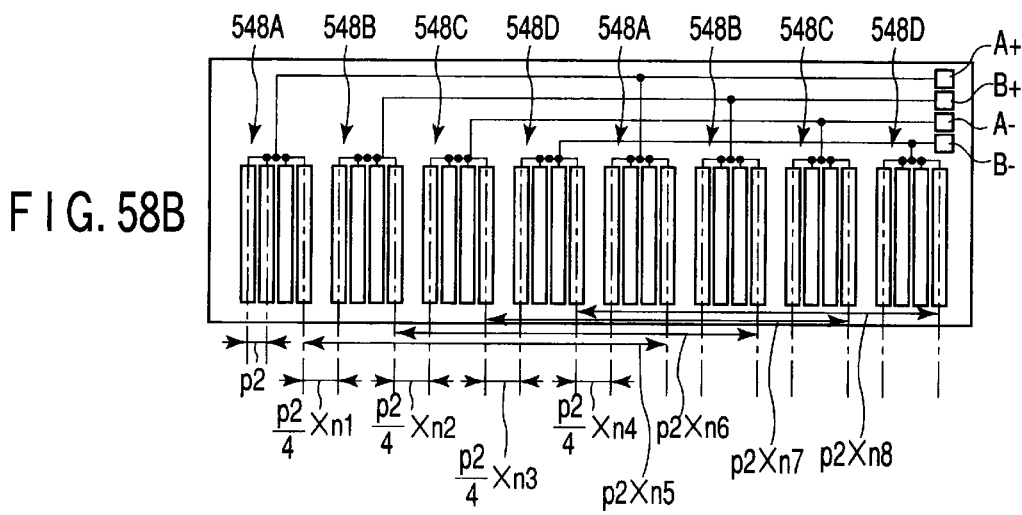

Moreover, the photodetector shown in FIG. 58B is provided with four light receiving area groups, that is, first, second, third, and fourth groups 548A, 548B, 548C, 548D.

The first, second, third, and fourth groups 548A, 548B, 548C, 548D are alternately arranged.

Each of the first, second, third, and fourth groups 548A, 548B, 548C, 548D has four light receiving areas 512 arranged at the constant pitch p2.

Two adjacent light receiving areas of two adjacent groups have an interval of (p2/4)×n (n is a natural number).

Figure 58C:
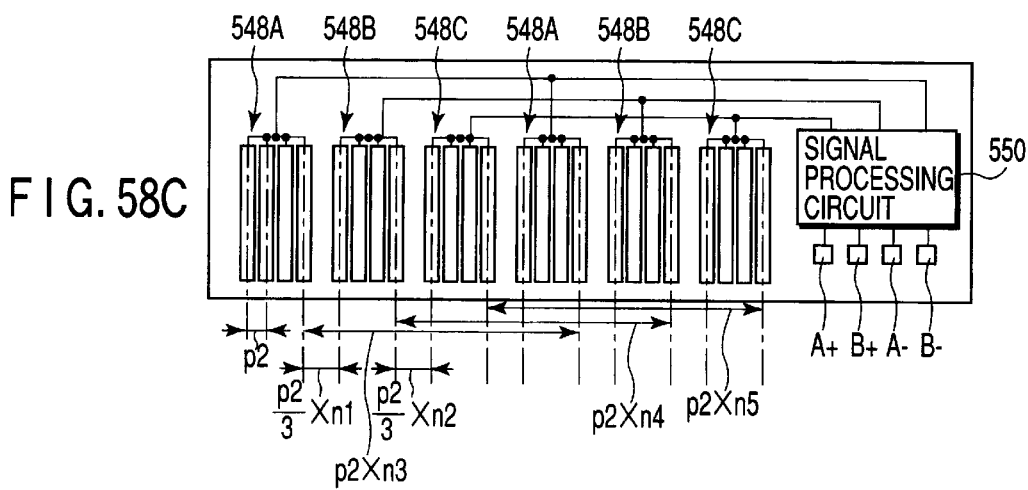
Figures 59A, 59B:
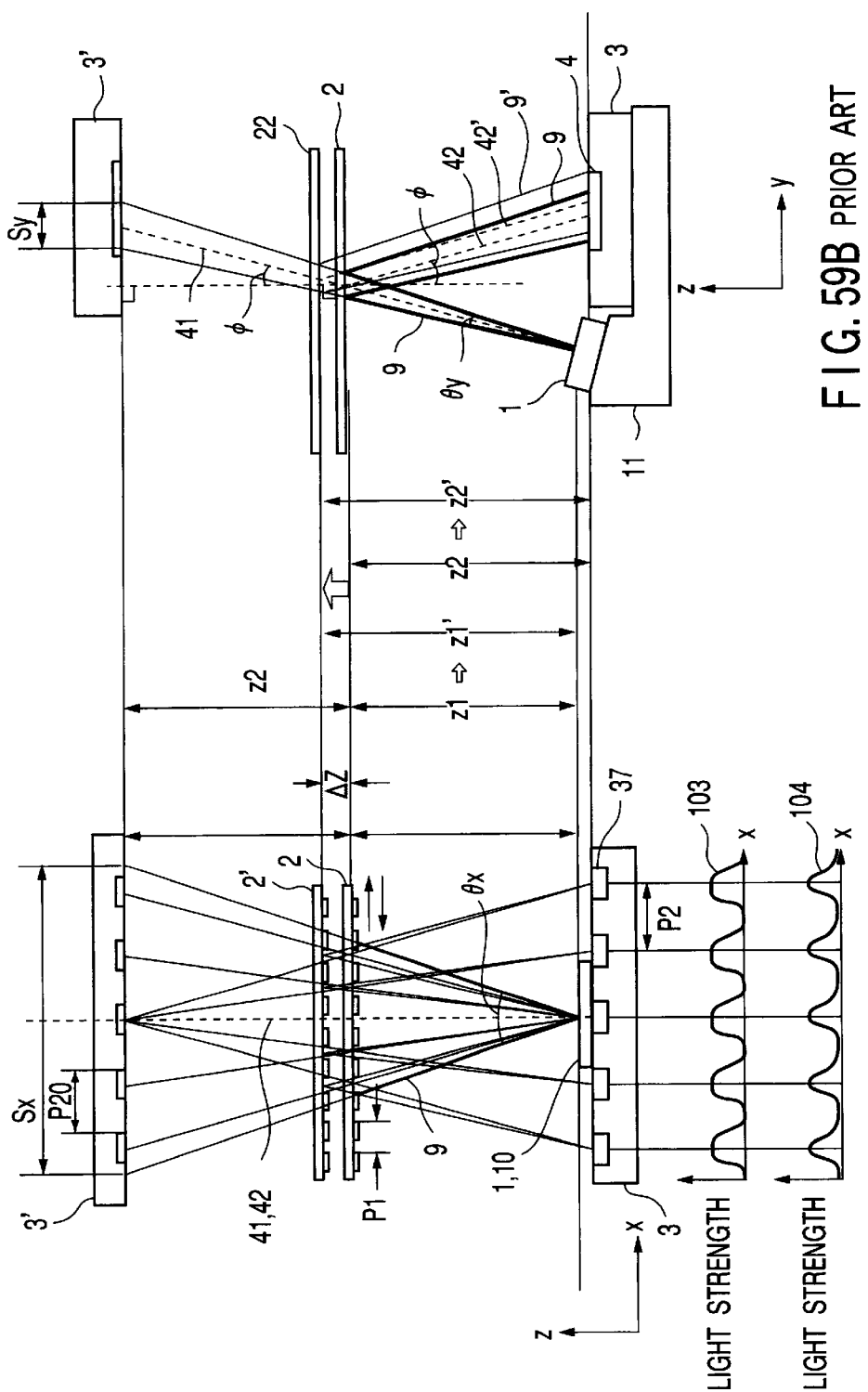
FIGS. 59A, 59B are diagrams showing a constitution of a first prior example (Jpn. Pat. Appln. KOKAI Publication No. 2000-205819) by the present inventor et al. as a prior art of the optical encoder constitution.
Figure 60:
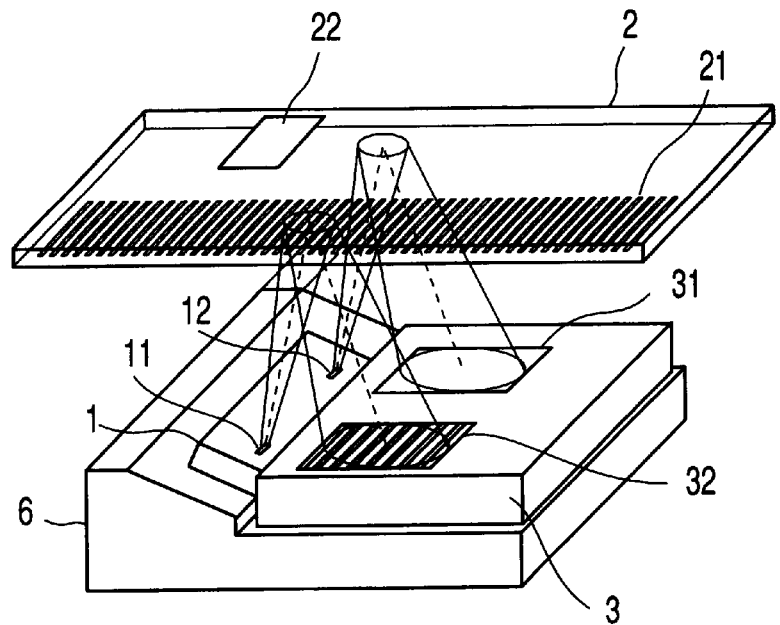
FIG. 60 is a diagram showing a constitution of a second prior example disclosed in the Jpn. Pat. Appln. KOKAI Publication No. 2000-205819 by the present inventor et al. as the prior art of the optical encoder constitution.
Figure 61:
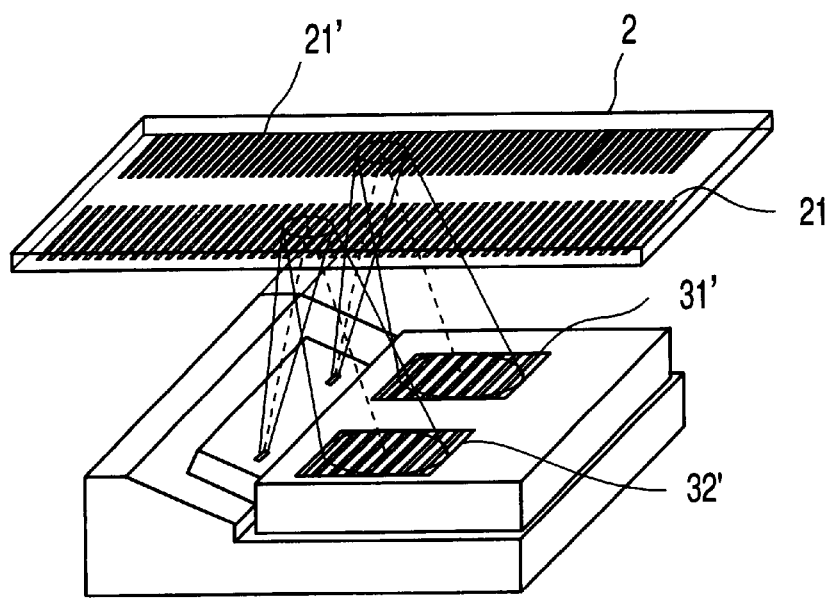
FIG. 61 is a diagram showing a constitution of the second prior example disclosed in the Jpn. Pat. Appln. KOKAI Publication No. 2000-205819 by the present inventor et al. as the prior art of the optical encoder constitution.
Figure 62:
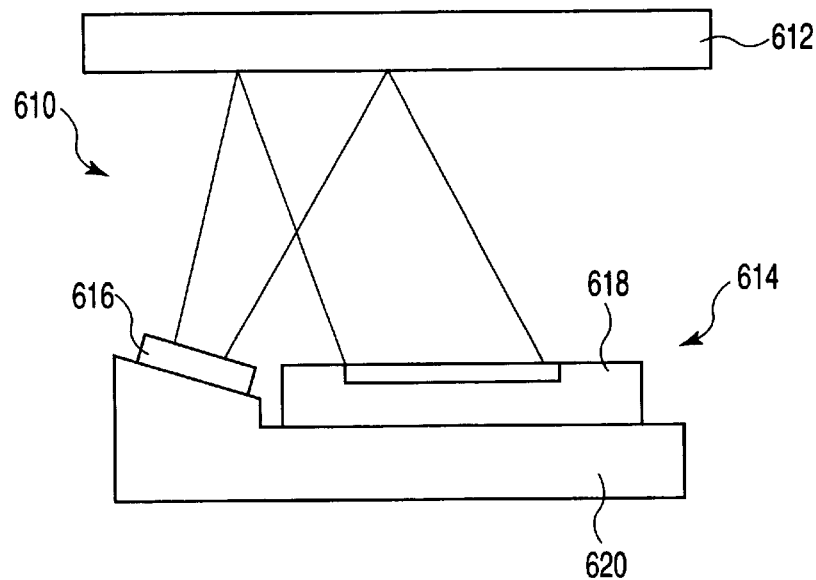
FIG. 62 is a diagram showing a reflective optical encoder as a third prior example.
Figure 63:
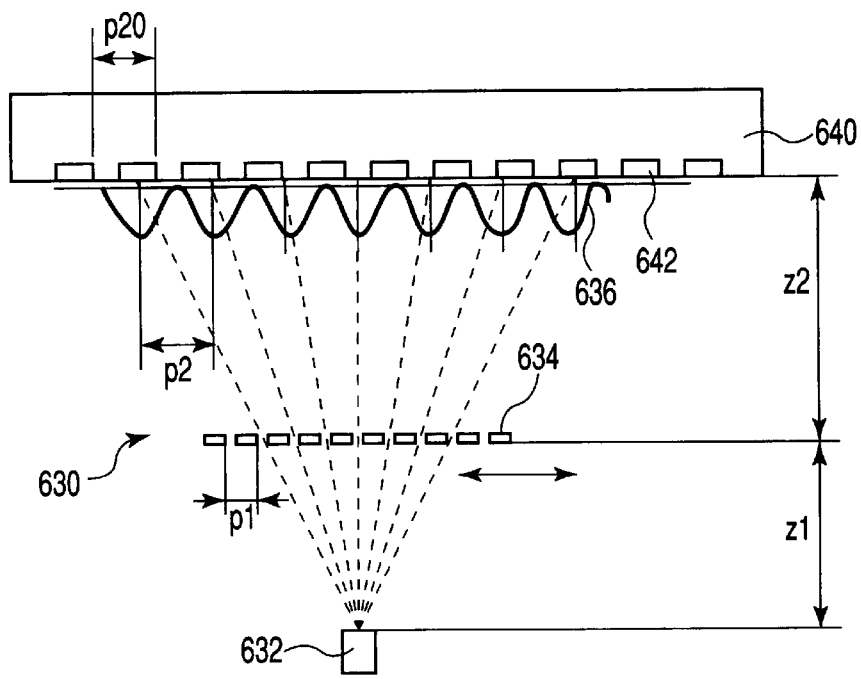
FIG. 63 is a diagram showing a transmission type optical encoder as a fourth prior example.

Moreover, the photodetector shown in FIG. 58C is provided with three light receiving area groups, that is, first, second, and third groups 548A, 548B, 548C, and a signal processing circuit 550 for generating four phase signals from the signals obtained by the three groups.

The first, second, and third groups 548A, 548B, 548C are alternately arranged.

Each of the first, second, and third groups 548A, 548B, 548C has four light receiving areas 512 arranged at the constant pitch p2.

Two adjacent light receiving areas of two adjacent groups have an interval of (p2/4)×n (n is a natural number).

These photodetectors shown in FIGS. 58A, 58B, 58C need to satisfy the above equation (5).

The present invention has been described based on the aforementioned embodiments, but is not limited to the aforementioned embodiments, and various modifications and applications are of course possible in the scope of the present invention.

For example, the sixteenth to twentieth embodiments all relate to the reflective rotary encoder, but the present invention is not limited to these embodiments, and may be applied to the transmission type rotary encoder.

The sixteenth to twentieth embodiments include the inventions described later in claims 75 to 92.

Moreover, according to the invention of claim 75 described later, for the effective detection sensitivity of each light receiving area of the photodetector, the effective light receiving sensitivity of the portion in which the bright portion of either one of the first and second bright/dark pattern groups is formed is constituted to be higher than the light receiving sensitivity of the other portion of the light receiving area. Thereby, there can be provided an optical rotary encoder in which only the bright portion of either the first bright/dark pattern group or the second bright/dark pattern group can be detected, and output drop is not caused.

Furthermore, according to the invention of claim 76 described later, the effective detection sensitivity of the plurality of light receiving areas in the vicinity of the portion in which the distance R2 of the photodetector light receiving area from the circle center satisfies the above equation, and corresponds to the distance for k of the even or odd number is constituted to be higher than that of the other portion. Thereby, there can be provided an optical rotary encoder in which only the bright portion formed for k of the even or odd number can be detected, and the output drop is not caused.

Moreover, according to the invention of claim 81 described later, the scale optical pattern is disposed only in a portion corresponding to either the first bright/dark pattern group or the second bright/dark pattern group of the bright/dark patterns on the photodetector. As a result, there can be provided an optical rotary encoder in which the photodetector can detect only the first bright/dark pattern group or only the second bright/dark pattern group of the bright/dark patterns, and the output drop is not caused.

Furthermore, according to the invention of claim 82 described later, the scale optical pattern is disposed only in the vicinity of the portion in which the distance R1 of the scale from the circle center satisfies the above equation, and corresponds to the distance for k of the even or odd number.

As a result, there can be provided an optical rotary encoder in which the photodetector can detect only the bright portion formed for k of the even or odd number, and the output drop is not caused.

Additionally, according to the invention of claim 83 described later, the light beam emitted from the coherence light source is constituted to be incident upon only the vicinity of the portion in which either the first bright/dark pattern group or the second bright/dark pattern group is formed. Thereby, there can be provided an optical rotary encoder in which the photodetector can detect only one of the first and second bright/dark pattern groups, and the output drop is not caused.

Moreover, according to the invention of claim 84 described later, the light beam emitted from the light source is constituted to be incident upon only the vicinity of the portion in which the distance R2 of the light receiving area of the photodetector from the circle center satisfies the above equation, and corresponds to the distance for k of either the even or odd number. Thereby, there can be provided an optical rotary encoder in which only one of the bright portion formed for k of the even number and the bright portion formed for k of the odd number can be detected, and the output drop is not caused.

Consequently, as described above in detail, according to the sixteenth to twentieth embodiments of the present invention, there can be provided an optical rotary encoder which does not cause the output drop.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical encoder comprising:
    a first coherence light source for emitting a first light beam;
    a scale which can be displaced to cross the first light beam emitted from said first light source, and which has a first light modulation region formed of a predetermined-period optical pattern irradiated with said first light beam to generate a diffraction pattern;
    first photodetection means comprising a light receiving surface for receiving said first light beam transmitted via the first light modulation region of said scale, and a single light receiving element group or a plurality of light receiving element groups formed at a predetermined interval so as to detect a predetermined portion of said diffraction pattern generated by irradiating the first light modulation region of said scale with said first light beam in the light receiving surface;
    a second light source for emitting a second light beam;
    a second light modulation region for modulating an optical property of said second light beam emitted from said second light source; and
    second photodetection means for receiving said second light beam with the optical property modulated by said second light modulation region,
    wherein said first light modulation region and said second light modulation region are positioned in series in a moving direction of said scale, and said second light modulation region moves integrally with said first light modulation region with movement of said scale, said first light source and said first photodetection means are disposed on the same side with respect to said scale, the surface with the predetermined-period optical pattern formed therein in said first light modulation region is disposed in parallel with the light receiving surface of said second photodetection means, and the main axis of said first light beam is disposed to be inclined with respect to the surface with the predetermined-period optical pattern formed therein in said first light modulation region only in plane vertical to a predetermined period direction of said first light modulation region.

2. An optical encoder comprising:

a first coherence light source for emitting a first light beam;

a scale which can be displaced to cross the first light beam emitted from said first light source, and which has a first light modulation region formed of a predetermined-period optical pattern irradiated with said first light beam to generate a diffraction pattern;

first photodetection means comprising a light receiving surface for receiving said first light beam transmitted via the first light modulation region of said scale, and a single light receiving element group or a plurality of light receiving element groups formed at a predetermined interval so as to detect a predetermined portion of said diffraction pattern generated by irradiating the first light modulation region of said scale with said first light beam in the light receiving surface;

a second light source for emitting a second light beam;

a second light modulation region for modulating an optical property of said second light beam emitted from said second light source; and second photodetection means for receiving said second light beam with the optical property modulated by said second light modulation region, wherein said first light modulation region and said second light modulation region are positioned in series in a moving direction of said scale, and said second light modulation region moves integrally with said first light modulation region with movement of said scale, when an optical distance extending to the surface with said first light modulation region formed therein from an emitting surface of said first light source along a main axis of the first light beam is z 1, an optical distance extending to the light receiving surface of said first photodetection means from the surface with said first light modulation region formed therein along the main axis of the first light beam is z2, a space period of said first light modulation region is p1, k is a natural number, and each of the single light receiving element group or the plurality of light receiving element groups formed in the light receiving surface of said first photodetection means is constituted by the plurality of the light receiving elements arranged with intervals kp 1 (z 1 z2)/z 1, respectively.

3. The optical encoder according to claim 2, wherein said first light source and said first photodetection means are disposed on the same side with respect to said scale in which said first light modulation region is formed, the surface with the predetermined-period optical pattern formed therein in said first light modulation region is disposed in parallel with the light receiving surface of said second photodetection means, and the main axis of said first light beam is disposed to be inclined with respect to the surface with the predetermined-period optical pattern formed therein in said first light modulation region only in a plane vertical to a predetermined period direction of said first light modulation region.

4. An optical encoder comprising:

a coherence light source which can emit at least first and second light beams, the first light beam being a divergent light beam;

a scale which is displaced to cross the first light beam emitted from said coherence light source, and in which a first light modulation region is formed of a predetermined-period optical pattern for generating a diffraction pattern by the first light beam emitted from said coherence light source, the diffraction pattern generated by the first light beam having a period greater than a period of the predetermined-period optical pattern;

first photodetection means comprising a single light receiving element group or a plurality of light receiving element groups formed at a predetermined interval in a space period direction of said diffraction pattern and which is constituted to receive a predetermined portion of said diffraction pattern; and second photodetection means in which at least a second light modulation region modulating an optical property of the second light beam emitted from said coherence light source in the vicinity of a predetermined reference position and being integrally displaced with said first light modulation region is disposed in series with said first light modulation region on or adjacent to said scale, and which detects the optical property of said second light beam modulated by said second light modulation region.

5. An optical encoder comprising:

a coherence light source which can emit at least first and second light beams;

a scale which is displaced to cross the first light beam emitted from said coherence light source, and in which a first light modulation region is formed of a predetermined-period optical pattern for generating a diffraction pattern by the first light beam emitted from said coherence light source;

first photodetection means comprising a single light receiving element group or a plurality of light receiving element groups formed at a predetermined interval in a space period direction of said diffraction pattern and which is constituted to receive a predetermined portion of said diffraction pattern; and second photodetection means in which at least a second light modulation region modulating an optical property of the second light beam emitted from said coherence light source in the vicinity of a predetermined reference position and being integrally displaced with said first light modulation region is disposed in series with said first modulation region on or adjacent to said scale, and which detects the optical property of said second light beam modulated by said second light modulation region, wherein when an optical distance measured along a main axis of the first light beam extending to the surface with said first light modulation region formed therein from a light beam emitting surface of said coherence light source is z 1, an optical distance measured along the main axis of said first light beam extending to the light receiving surface of said first photodetection means from the surface with said first light modulation region formed therein is z2, a space period of said first light modulation region is p1, and k is a natural number, said first photodetection means comprises the single light receiving element group or the plurality of light receiving element groups formed at intervals of kp1(z1+z2)/z1 in the space period direction of said diffraction pattern and is constituted to receive a predetermined portion of said diffraction pattern.

6. The optical encoder according to anyone of claims 2 or 5, wherein the coherence light source which can emit said first and second light beams is a light beam integrated type surface emitting laser.

7. The optical encoder according to claim 5, wherein said coherence light source and said first photodetection means are disposed on the same space side with respect to said scale in which said first light modulation region is formed, the surface with the predetermined-period optical pattern formed therein in said first light modulation region is disposed in parallel with the light receiving surface of said first photodetection means, and the main axis of said first light beam is disposed to be inclined with respect to the surface with the predetermined-period optical pattern formed therein in said first light modulation region only in a plane vertical to a predetermined period direction of said first light modulation region.

8. The optical encoder according to claim 5, wherein said second light modulation region is formed by a uniform reflecting, scattering or transmitting pattern having a specific width in a displacement direction of said scale.

9. The optical encoder according to claim 5, wherein said second light modulation region is constituted of light beam bending means having a function of bending a reflection or transmission direction of said second light beam.

10. The optical encoder according to claim 9, wherein said second photodetection means comprises a photodetector disposed in a position in which a strength of said second light beam bent by said light beam bending means can be detected, and another photodetector disposed in a position in which a strength of said second light beam not bent by said light beam bending means can be detected, and has a function of outputting outputs of said two photodetectors subjected to a predetermined calculation.

11. The optical encoder according to claim 5, wherein said second light modulation region is constituted of a hologram pattern.

12. The optical encoder according to claim 11, wherein said first photodetection means has an effective light receiving region limited to p1(z1+z2)/z1 or less with respect to the displacement direction of said scale.

13. The optical encoder according to claim 5, further comprising:

the coherence light source which can emit a third light beam;

a third light modulation region which modulates the optical property of the third light beam emitted from said coherence light source in the vicinity of a second reference position different from said predetermined reference position, and which is integrally displaced with said first light modulation region, said second and third light modulation regions being disposed in series and adjacent to each other on opposite sides of said first light modulation region; and third photodetection means for detecting the optical property of said third light beam modulated by said third light modulation region.

14. The optical encoder according to claim 2 or 5, wherein the coherence light source can emit a third light beam, said scale comprises a third light modulation region formed of the predetermined-period optical pattern for generating a diffraction pattern by the third light beam emitted from the coherence light source, and third photodetection means for receiving the diffraction pattern by said third light beam, when an optical distance measured along a main axis of the third light beam extending to a surface with said third light modulation region formed therein from a light beam emitting surface of said coherence light source is z1, an optical distance measured along the main axis of said third light beam extending to a light receiving surface of said third photodetection means from the surface with said third light modulation region formed therein is z2, a space period of said third light modulation region is p1, and k is a natural number, said third photodetection means comprises a single light receiving area or a plurality of light receiving areas formed at an interval of kp1(z1+z2)/z1 in the space period direction of said diffraction pattern and is constituted to receive the predetermined portion of said diffraction pattern, and said first, second, and third light modulation regions are disposed in random order in series, and are integrally displaced.

15. The optical encoder according to claim 5, wherein a light beam split optical element is disposed on a light axis of said second light beam extending to said second light modulation region from an emitting portion of said second light beam, the beam split optical element splits a part of the second light beam, and third photodetection means detects a strength of the second light beam.

16. The optical encoder according to claim 15, wherein said beam split optical element is a transmission window member itself of said coherence light source, or a semi-transmission optical member disposed in the vicinity of the transmission window member.

17. The optical encoder according to claim 15, wherein said beam split optical element is a hologram or a prism.

18. The optical encoder according to claim 2 or 5, wherein at least said first and second beams emitted from said coherence light source are obtained by splitting a single light beam by a beam split optical element.

19. The optical encoder according to claim 18, wherein said first and second light beams are constituted by splitting a single light beam by a beam split optical element, both or either of the first and second light beams are transmitted through a beam bending element, both or either of first and second light beam light axes are adjusted to be vertical with respect to a scale pitch direction, and the scale is irradiated with both or either of the first and second light beams.

20. An optical encoder comprising:

a movable scale in which a predetermined-period optical pattern is formed;

a coherence light source for substantially vertically irradiating an optical pattern surface of said movable scale with a light beam having a predetermined shape; and photodetection means for receiving the light beam emitted from said light source and reflected by said optical pattern, and detecting a diffraction pattern generated by said optical pattern on a light receiving surface, wherein a holographic pattern having a function of reflecting and converging the light beam is also formed in said movable scale.

21. The optical encoder according to claim 20, wherein said holographic pattern is used to detect a reference position.

22. An optical encoder comprising:

a movable scale in which a predetermined-period optical pattern is formed;

a coherence light source for substantially vertically irradiating an optical pattern surface of said movable scale with a light beam having a predetermined shape;

photodetection means for receiving the light beam emitted from said light source and reflected by said optical pattern, and detecting a diffraction pattern generated by said optical pattern on a light receiving surface; and means for inhibiting said light beam reflected by said movable scale from being returned to said light source.

23. The optical encoder according to claim 22, wherein a reflectance of the surface of said scale in a portion in which a main axis of said light beam intersects said scale surface is lower than the reflectance of the portion of said optical pattern.

24. The optical encoder according to claim 22, further comprising means provided between said light source and said movable scale for rotating a polarization plane of said light beam emitted from said light source such that said polarization plane is perpendicular to a polarization plane of said light beam reflected by said movable scale and returned to said light source.

25. The optical encoder according to claim 24, wherein said means for rotating the polarization plane is a ¼ wavelength plate.

26. An optical encoder comprising:

a movable scale in which a predetermined-period optical pattern is formed;

a coherence light source for substantially vertically irradiating an optical pattern surface of said movable scale with a light beam having a predetermined shape; and photodetection means for receiving the light beam emitted from said light source and reflected by said optical pattern, and detecting a diffraction pattern generated by said optical pattern on a light receiving surface, said photodetection means including a plurality of light receiving areas formed on a single base plate;

wherein when a length of a main axis of the light beam extending to said optical pattern from said coherence light source is z1, a length of the main axis of the light beam extending to the light receiving surface of said photodetection means from said optical pattern is z2, a pitch of a predetermined portion of said optical pattern is p1, and k is a natural number, the light receiving area of said photodetection means is constituted of a light receiving area group having the light receiving area in a position of kp1(z1+z2)/z1 in a pitch direction of the predetermined portion of said diffraction pattern formed on said light receiving surface.

27. The optical encoder according to claim 26, wherein said light source and said photodetection means are disposed on the same substrate in a hybrid or monolithic manner.

28. The optical encoder according to claim 26, wherein said coherence light source is a surface emitting laser.

29. The optical encoder according to claim 28, wherein said coherence light source also emits the light beam from a surface opposite to the surface for emitting the light beam to said optical pattern, and further comprises strength detection means for receiving the light beam emitted from the opposite surface and detecting a strength of the light beam, and means for using a detection result of said strength detection means to control the light beam intensity of said coherence light source.

30. An optical encoder comprising:

a rotatable scale having a surface in which a predetermined-period optical pattern is formed in a rotating circumference direction;

a coherence light source for substantially vertically irradiating the surface of said scale with the optical pattern formed therein with a light beam having a predetermined shape; and photodetection means for receiving the light beam emitted from said light source and transmitted through the surface of said scale with the optical pattern formed therein, and detecting a diffraction pattern generated by said optical pattern on a light receiving surface, wherein when a length of a main axis of the light beam extending to said optical pattern from said coherence light source is z 1, a length of the main axis of the light beam extending to the light receiving surface of said photodetection means from said optical pattern is z2, a pitch of a predetermined portion of said optical pattern is p1, and k is a natural number, a light receiving area of said photodetection means is constituted of a light receiving area group having the light receiving area in a position of kp 1 (z 1+z2)/z 1 in a pitch direction of the predetermined portion of said diffraction pattern formed on said light receiving surface.

31. An optical encoder comprising:

a rotatable scale having a surface in which a predetermined-period optical pattern is formed in a rotating circumference direction;

a coherence light source for substantially vertically irradiating the surface of said scale with the optical pattern formed therein with a light beam having a predetermined shape; and photodetection means for receiving the light beam emitted from said light source and transmitted through the surface of said scale with the optical pattern formed therein, and detecting a diffraction pattern generated by said optical pattern on a light receiving surface, wherein said optical encoder uses reflective light beam by said scale.

32. The optical encoder according to claim 31, wherein said coherence light source is positioned on a rotation axis.

33. An optical encoder comprising:

a rotatable scale having a surface in which a predetermined-period optical pattern is formed in a rotating circumference direction;

a coherence light source for substantially vertically irradiating the surface of said scale with the optical pattern formed therein with a light beam having a predetermined shape; and photodetection means for receiving the light beam emitted from said light source and transmitted through the surface of said scale with the optical pattern formed therein, and detecting a diffraction pattern generated by said optical pattern on a light receiving surface, wherein said diffraction pattern is generated on said light receiving surface in a whole circumference circle shape.

34. The optical encoder according to claim 31, further comprising means for inhibiting said light beam reflected by said scale from being returned to said light source.

35. The optical encoder according to claim 31, wherein a reflectance of the surface of said scale in a portion in which a main axis of said light beam intersects said scale surface is lower than the reflectance of the portion of said optical pattern.

36. The optical encoder according to claim 31, further comprising means provided between said light source and said rotatable scale for rotating a polarization plane of said light beam emitted from said light source such that said polarization plane is perpendicular to a polarization plane of said light beam reflected by said movable scale and returned to said light source.

37. The optical encoder according to claim 36, wherein said means for rotating the polarization plane is a ¼ wavelength plate.

38. An optical encoder comprising:
a movable scale having a surface in which a predetermined-period optical pattern is formed;
a coherence light source for irradiating the surface of said movable scale with the optical pattern formed therein with a light beam having a predetermined shape; and
photodetection means for receiving the light beam emitted from said light source and transmitted through the surface of said movable scale with the optical pattern formed therein, and detecting a diffraction pattern generated by said optical pattern on a light receiving surface,
wherein said photodetection means is constituted to be prevented from receiving a light of a main axis of said light beam.

39. An optical encoder comprising:
a coherence light source for emitting a light beam having a predetermined shape;
a scale which is relatively displaced to cross the light beam emitted from said coherence light source, and in which a predetermined-period optical pattern for generating a diffraction pattern by said light beam is formed;
a photodetector for detecting a specific portion of the diffraction pattern generated by said optical pattern; and
photodetection means in which when a length of a main axis of the light beam directed to said optical pattern formed on said scale from said coherence light source is z1, a length of the main axis of the light beam directed to a light receiving area of said photodetector from the optical pattern formed on said scale is z2, a pitch of a predetermined portion of the optical pattern formed on said scale is p1, and k is a natural number, the light receiving area of said photodetector is constituted of a light receiving area group having the light receiving area in a position of $kp1(z1+z2)/z1$ in a pitch direction of the predetermined portion of said diffraction pattern formed on said light receiving area,
wherein the light receiving area group of said photodetector has no effective photodetection sensitivity or is shielded in the vicinity of the main axis of said light beam with respect to said diffraction pattern formed on said light receiving area.

40. The optical encoder according to claim 39, wherein the main axis of the light beam emitted from said light source is vertically incident upon the pattern surface of said scale.

41. The optical encoder according to claim 40, wherein a predetermined region on said scale irradiated with the main axis of the light beam emitted from said light source is a low reflection region constituted to decrease a reflection light intensity of the light beam emitted from said light source.

42. The optical encoder according to claim 40, wherein said scale has a plurality of optical patterns, a predetermined region of the light beam emitted from said coherence light source is irradiated with the plurality of optical patterns formed on said scale, and the optical encoder further comprises a plurality of photodetectors for receiving a predetermined portion of a reflection light, a transmission light or a diffraction light by the plurality of optical patterns.

43. The optical encoder according to claim 34, wherein said light source is a coherence light source integrated on the same substrate as that of said photodetector in a hybrid or monolithic manner.

44. The optical encoder according to claim 43, wherein said coherence light source is a surface emitting laser.

45. The optical encoder according to claim 39, wherein the light receiving area group of said photodetector comprises at least first and second light receiving area groups in a scale moving direction, the first light receiving area group detects a first phase region of the diffraction pattern by the optical pattern on said scale, and the second light receiving area group detects a second phase region different from said first phase region.

46. The optical encoder according to claim 45, wherein the light receiving area group of said photodetector comprises first to fourth light receiving area groups in order in the scale moving direction, the first light receiving area group detects the first phase region of the diffraction pattern formed by the optical pattern on said scale, the second light receiving area group detects the second phase region different from said first phase region, the third light receiving area group detects a third phase region different from said first and second phase regions, and the fourth light receiving area group detects a fourth phase region different from said first, second, and third phase regions.

47. The optical encoder according to claim 44, wherein said surface emitting laser can emit the light beam forward and backward, a light receiving area for measuring a light output is disposed in a predetermined portion with said surface emitting laser disposed thereon on said photodetector, and the surface emitting laser is disposed in such a manner that said scale is irradiated with the light beam emitted forward from said light source and the light beam emitted backward from said light source can be incident upon the light output measuring light receiving area on said photodetector.

48. The optical encoder according to claim 47, wherein an output of said surface emitting laser can be controlled by an output strength of the light beam emitted backward from said surface emitting laser to be incident upon said light output measuring light receiving area of said photodetector.

49. The optical encoder according to claim 42, wherein at least one of the plurality of optical patterns of said scale is a hologram lens having a function of converging a predetermined region of the light beam emitted from said light source in a scale moving direction.

50. The optical encoder according to claim 49, wherein in at least one of the light receiving areas of said photodetector for detecting the light beam converged by said hologram lens, a width of said scale moving direction is shorter than $p1(z1+z2)/z1$.

51. The optical encoder according to claim 40, wherein an optical element in which an angle formed by a polarization plane of the light beam emitted from said coherence light source with the polarization plane of the light beam emitted from said coherence light source, transmitted through the pattern surface of said scale and directed to the light source is 90 degrees in the vicinity of an emitting window of said coherence light source is disposed on the main axis of the light beam transmitted to said scale from said coherence light source.

52. The optical encoder according to claim 51, wherein said optical element is a ¼ wavelength plate.

53. The optical encoder according to claim 44, wherein the light receiving area group of said photodetector is disposed at a predetermined interval on a circumference centering on said surface emitting laser light source.

54. An optical rotary encoder comprising:

a coherence light source;

a disc-shaped scale which rotates to cross a light beam emitted from said coherence light source, and in which a radial optical pattern with a predetermined angle period to be irradiated with said light beam is formed; and a photodetector having a plurality of light receiving areas, arranged in a radial shape from a circle center, for receiving said light beam transmitted through said optical pattern and detecting a bright/dark pattern generated by said optical pattern, wherein for said bright/dark pattern, a plurality of patterns are formed such that bright portions are formed at the same angle on circumferences having different distances from the circle center, and the bright/dark pattern comprises a first bright/dark pattern group and a second bright/dark pattern group in which the bright portions are formed at different angles in a circumferential direction, and for an effective detection sensitivity of each light receiving area of said photodetector, an effective light receiving sensitivity of a portion with the bright portion of either said first bright/dark pattern group or said second bright/dark pattern group formed therein is higher than the light receiving sensitivity of the other portion of the light receiving area.

55. An optical rotary encoder comprising:

a coherence light source;

a disc-shaped scale which rotates to cross a light beam emitted from said coherence light source, and in which a radial optical pattern with a predetermined angle period to be irradiated with said light beam is formed; and a photodetector having a plurality of light receiving areas arranged in radial positions from a circle center, for receiving said light beam transmitted through said optical pattern and detecting a bright/dark pattern generated by said optical pattern, wherein when an interval between said coherence light source and the optical pattern on said scale is z1, an interval between the optical pattern formed on said scale and said photodetector is z2, the period of the optical pattern on an arbitrary circumference of said scale is p1, the number of optical patterns for one rotation of the scale is n, a wavelength of said light source is λ, and a period of a bright/dark pattern on the circumference on said light receiving area corresponding to the period p1 of said optical pattern is p2, and when a position of said light receiving area from the circle center is R2, on the light receiving area of said photodetector, the bright/dark pattern is formed in a portion satisfying R2=(n×p2)/2π (here, p2=p1(z1+z2)/z1), and the optical rotary encoder is disposed in such a manner that an effective light receiving sensitivity of said plurality of light receiving areas in the vicinity of a portion at a distance R2 from the circle center satisfying the following equation and corresponding to a distance with k of an odd number or an even number is higher than that of the other portion.

$$R2 = \frac{n \times \sqrt{\frac{\lambda z2}{k} \times \frac{z1+z2}{z1}}}{2\pi}$$

(k is a natural number).

56. The optical rotary encoder according to claim 55, wherein when the distance of the light receiving area from the circle center is L1, an effective light receiving area of said photodetector is disposed in a position satisfying the following.

$$\frac{n \times \sqrt{\frac{\lambda z2}{(k-1)} \times \frac{z1+z2}{z1}}}{2\pi} > L1 > \frac{n \times \sqrt{\frac{\lambda z2}{(k+1)} \times \frac{z1+z2}{z1}}}{2\pi}.$$

57. The optical rotary encoder according to claim 55, wherein when the distance of the light receiving area from the circle center is L1 in the light receiving area of said photodetector, the effective light receiving sensitivity of a range satisfying the following is higher than that of the other portion of the light receiving area.

$$\frac{\frac{n \times \sqrt{\frac{\lambda z2}{(k-1)} \times \frac{z1+z2}{z1}}}{2\pi} + \frac{n \times \sqrt{\frac{\lambda z2}{k} \times \frac{z1+z2}{z1}}}{2\pi}}{2} >$$

$$L1 > \frac{\frac{n \times \sqrt{\frac{\lambda z2}{k} \times \frac{z1+z2}{z1}}}{2\pi} + \frac{n \times \sqrt{\frac{\lambda z2}{(k+1)} \times \frac{z1+z2}{z1}}}{2\pi}}{2}$$

58. The optical rotary encoder according to any one of claims 54 to 57, further comprising light receiving sensitivity adjustment means for adjusting an effective sensitivity of an effective light receiving area of said photodetector in accordance with a shape of said bright/dark pattern.

59. The optical rotary encoder according to any one of claims 54 to 57, further comprising a second photodetector, disposed in a portion in which the effective light receiving sensitivity of said photodetector is set to zero, for detecting a reference position or detecting a light source output.

60. An optical rotary encoder comprising:

a coherence light source;

a disc-shaped scale which rotates to cross a light beam emitted from said coherence light source, and in which an optical pattern with a predetermined angle period to be irradiated with said light beam is formed; and a photodetector having a plurality of light receiving areas, arranged in a radial shape from a circle center, for receiving said light beam transmitted through said optical pattern and detecting a bright/dark pattern generated by said optical pattern, wherein for said bright/dark pattern, a plurality of patterns are formed such that bright portions are formed at the same angle on circumferences having different distances from the circle center, and the bright/dark pattern comprises a first bright/dark pattern group and a second bright/dark pattern group in which the bright portions are formed at different angles in a circumferential direction, and the optical pattern of said scale is disposed only in a portion corresponding to either one of the first bright/dark pattern group and the second bright/dark pattern group of the bright/dark pattern on said photodetector.

61. An optical rotary encoder comprising:

a coherence light source;

a disc-shaped scale which rotates to cross a light beam emitted from said coherence light source, and in which a radial optical pattern with a predetermined angle period to be irradiated with said light beam is formed; and a photodetector having a plurality of light receiving areas, arranged in a radial shape from a circle center, for receiving said light beam transmitted through said optical pattern and detecting a bright/dark pattern generated by said optical pattern, wherein when an interval between said coherence light source and the optical pattern on said scale is z1, an interval between the optical pattern formed on said scale and said photodetector is z2, the period of the optical pattern on an arbitrary circumference of said scale is p1, the number of optical patterns for one rotation of the scale is n, a wavelength of said light source is λ, and a period of a bright/dark pattern on the circumference on said light receiving area corresponding to the period p1 of said optical pattern is p2, and when a position of said light receiving area from the circle center is R2, on the light receiving area of said photodetector of the optical rotary encoder, the bright/dark pattern is formed in a portion satisfying R2=(n× p1)/2π (here, p2=p1(z1+z2)/z1), and the optical pattern of said scale is disposed only in the vicinity of a portion in which a distance R1 from the circle center of said scale satisfies the following equation and corresponds to a distance with k of an odd number or an even number.

$$R1 = \frac{n \times \sqrt{\frac{\lambda}{k} \times \frac{z1z2}{z1+z2}}}{2\pi}$$

(k is a natural number).

62. An optical rotary encoder comprising:

a coherence light source;

a disc-shaped scale which rotates to cross a light beam emitted from said coherence light source, and in which a radial optical pattern with a predetermined angle period to be irradiated with said light beam is formed; and a photodetector having a plurality of light receiving areas, arranged in a radial shape from a circle center, for receiving said light beam transmitted through said optical pattern and detecting a bright/dark pattern generated by said optical pattern, wherein for said bright/dark pattern, a plurality of patterns are formed such that bright portions are formed at the same angle on circumferences having different distances from the circle center, and the bright/dark pattern comprises a first bright/dark pattern group and a second bright/dark pattern group in which the bright portions are formed at different angles in a circumferential direction, and the light beam emitted from said coherence light source is incident only upon the vicinity of a portion in which either one of the first bright/dark pattern group and the second bright/dark pattern group is formed.

63. An optical rotary encoder comprising:

a coherence light source;

a disc-shaped scale which rotates to cross a light beam emitted from said coherence light source, and in which a radial optical pattern with a predetermined angle period to be irradiated with said light beam is formed; and a photodetector having a plurality of light receiving areas, arranged in a radial shape from a circle center, for receiving said light beam transmitted through said optical pattern and detecting a bright/dark pattern generated by said optical pattern, wherein when an interval between said coherence light source and the optical pattern on said scale is z1, an interval between the optical pattern formed on said scale and said photodetector is z2, the period of the optical pattern on an arbitrary circumference of said scale is p1, the number of optical patterns for one rotation of the scale is n, a wavelength of said light source is λ, and a period of a bright/dark pattern on the circumference on said light receiving area corresponding to the period p1 of said optical pattern is p2, and when a position of said light receiving area from the circle center is R2, on the light receiving area of said photodetector of the optical rotary encoder, the bright/dark pattern is formed in a portion satisfying R2=(n× p2)/2π (here, p2=p1(z1+z2)/z1), and the light beam emitted from said light source is incident only upon the vicinity of a portion in which the distance R2 from the circle center satisfies the following equation and corresponds to a distance with k of an odd number or an even number.

$$R2 = \frac{n \times \sqrt{\frac{\lambda z2}{k} \times \frac{z1+z2}{z1}}}{2\pi}$$

(k is a natural number).

64. The optical rotary encoder according to claim 55, wherein a shape of the plurality of light receiving areas of said photodetector is rectangular, the plurality of light receiving areas are disposed in parallel at an interval of p2/m (m is an integer of 2 or more), and when the light receiving area receives every m patterns with the same phase of said bright/dark pattern group, a length of the light receiving area in a radius direction is L, and an angle formed by the length of the light receiving area in a longitudinal direction with the bright/dark pattern is θ, tan θ≦(p2/m)L is satisfied.

65. The optical rotary encoder according to claim 64, wherein for the length L of said plurality of light receiving areas, the length in opposite ends of the photodetector is shorter than that in a center portion.

66. The optical rotary encoder according to claim 54, wherein said plurality of light receiving areas form four sets for receiving four phases of said bright/dark pattern group.

67. The optical rotary encoder according to claim 54, wherein said plurality of light receiving areas form two sets for receiving two phases out of four phases.

68. The optical rotary encoder according to claim 54, wherein said plurality of light receiving areas are divided into a plurality of groups, and the respective light receiving area groups receive different phases of said bright/dark pattern.

69. The optical rotary encoder according to claim 54, wherein said light source and said photodetector are disposed on the same substrate, the light receiving area of said photodetector forms an even number of groups having circular arc shapes and having the same area to surround said light source, and the optical rotary encoder further comprises output difference detection means for detecting an output difference of the light receiving area selected from the light receiving area group.

70. The optical rotary encoder according to claim 69, wherein dummy photodetectors are disposed on opposite ends of said light receiving area group.

71. The optical rotary encoder according to claim 69, wherein end light receiving areas of said light receiving area group receive different phase light beams, and the number of light receiving areas for receiving one phase is equal to the number of light receiving areas for receiving the other phase.

* * * * *